US012639763B2

(12) United States Patent
Patton et al.

(10) Patent No.: US 12,639,763 B2
(45) **Date of Patent: *May 26, 2026**

(54) DATA RETRIEVAL AND VALIDATION FOR ONBOARDING PRIVATE CREDIT ASSETS AND DERIVING PRIVATE CREDIT ASSET CHARACTERISTICS

(71) Applicant: TRETE Inc., Prosper, TX (US)

(72) Inventors: Damien Patton, Plano, TX (US); Christian Gratton, Eaton Rapids, MI (US); Rish Mehta, Castro Valley, CA (US)

(73) Assignee: TRETE Inc., Prosper, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/349,469

(22) Filed: Oct. 3, 2025

(65) Prior Publication Data

US 2026/0087549 A1 Mar. 26, 2026

Related U.S. Application Data

(63) Continuation of application No. 19/259,042, filed on Jul. 3, 2025, now Pat. No. 12,469,080, which is a
(Continued)

(51) Int. Cl.
*G06F 16/215* (2019.01)
*G06F 16/23* (2019.01)
(Continued)

(52) U.S. Cl.
CPC .......... *G06Q 40/04* (2013.01); *G06F 16/215* (2019.01); *G06F 16/2358* (2019.01);
(Continued)

(58) Field of Classification Search
CPC .. G06Q 40/04; G06Q 20/363; G06Q 20/3674; G06Q 20/3829; G06Q 20/389;
(Continued)

(56) References Cited

U.S. PATENT DOCUMENTS

| 8,688,494 B2 | 4/2014 | Coon | |
| 11,989,776 B1 * | 5/2024 | Hepp | G06Q 30/0278 |

(Continued)

FOREIGN PATENT DOCUMENTS

| CA | 3062805 A1 | 5/2020 |
| CA | 3173084 A1 | 9/2021 |

(Continued)

OTHER PUBLICATIONS

Amoussou, Mandela, "What is a Cap Table, and Why are they Important?", from Digital Securities, Published Jan. 10, 2023.
(Continued)

*Primary Examiner* — Maher N Algibhah

(57) ABSTRACT

The present invention extends to methods, systems, and computer program products for data retrieval and validation for onboarding private credit assets and deriving private credit asset characteristics. A first set of data associated with a private credit asset is collected. Identifiers associated with the first set of data are created. A second set of data associated with the private credit asset is collected based on the identifiers. The first set of data set and the second set of data are compared based on the identifiers. The first set of data is validated based on the comparison. An artificial intelligence module is trained as part of a continuous training cycle in view of validation findings. Concurrently with artificial intelligence module training, one or more characteristics of the private credit asset are derived from the first set of data.

20 Claims, 15 Drawing Sheets

Related U.S. Application Data continuation of application No. 19/186,842, filed on Apr. 23, 2025, now Pat. No. 12,380,503, which is a continuation-in-part of application No. 18/963,508, filed on Nov. 28, 2024, now Pat. No. 12,299,743, and a continuation-in-part of application No. 18/616,179, filed on Mar. 26, 2024, now abandoned, and a continuation-in-part of application No. 18/616,164, filed on Mar. 25, 2024, now abandoned, said application No. 18/963,508 is a continuation of application No. 18/616,149, filed on Mar. 25, 2024, now Pat. No. 12,190,384.

(60) Provisional application No. 63/756,735, filed on Feb. 10, 2025, provisional application No. 63/741,200, filed on Jan. 2, 2025, provisional application No. 63/615,128, filed on Dec. 27, 2023, provisional application No. 63/615,108, filed on Dec. 27, 2023, provisional application No. 63/615,145, filed on Dec. 27, 2023, provisional application No. 63/615,136, filed on Dec. 27, 2023, provisional application No. 63/600,381, filed on Nov. 17, 2023, provisional application No. 63/596,471, filed on Nov. 6, 2023, provisional application No. 63/515,337, filed on Jul. 24, 2023, provisional application No. 63/509,257, filed on Jun. 20, 2023, provisional application No. 63/509,266, filed on Jun. 20, 2023, provisional application No. 63/509,264, filed on Jun. 20, 2023, provisional application No. 63/509,261, filed on Jun. 20, 2023, provisional application No. 63/454,622, filed on Mar. 24, 2023.

(51) Int. Cl.

| | |
|---|---|
| *G06F 16/27* | (2019.01) |
| *G06Q 20/36* | (2012.01) |
| *G06Q 20/38* | (2012.01) |
| *G06Q 20/40* | (2012.01) |
| *G06Q 20/42* | (2012.01) |
| *G06Q 30/0601* | (2023.01) |
| *G06Q 40/04* | (2012.01) |
| *G06Q 40/06* | (2012.01) |
| *H04L 9/00* | (2022.01) |
| *H04L 67/1097* | (2022.01) |

(52) U.S. Cl.
CPC ........ *G06F 16/2379* (2019.01); *G06F 16/275* (2019.01); *G06Q 20/363* (2013.01); *G06Q 20/3674* (2013.01); *G06Q 20/3829* (2013.01); *G06Q 20/389* (2013.01); *G06Q 20/401* (2013.01); *G06Q 20/42* (2013.01); *G06Q 30/0613* (2013.01); *G06Q 40/06* (2013.01); *H04L 9/50* (2022.05); *H04L 67/1097* (2013.01); *G06Q 2220/00* (2013.01)

(58) Field of Classification Search
CPC .. G06Q 20/401; G06Q 20/42; G06Q 30/0613; G06Q 40/06; G06Q 2220/00; G06F 16/215; G06F 16/2358; G06F 16/2379; G06F 16/275; H04L 9/50; H04L 67/1097
See application file for complete search history.

(56) References Cited

U.S. PATENT DOCUMENTS

| | | | |
|---|---|---|---|
| 2014/0279386 A1 | 9/2014 | Meyer | |
| 2016/0275626 A1 | 9/2016 | Lee | |
| 2016/0281607 A1* | 9/2016 | Asati | F02C 7/26 |
| 2017/0161758 A1* | 6/2017 | Towriss | G06Q 30/0201 |
| 2019/0171428 A1 | 6/2019 | Patton | |
| 2019/0304104 A1* | 10/2019 | Amer | G06T 13/80 |
| 2021/0034960 A1 | 2/2021 | Khapall | |
| 2022/0067738 A1 | 3/2022 | Fang | |
| 2022/0207349 A1 | 6/2022 | Fusco | |
| 2022/0222657 A1 | 7/2022 | Nichani | |
| 2022/0398337 A1* | 12/2022 | Franquin | G06F 16/287 |
| 2023/0049167 A1 | 2/2023 | Wilson | |
| 2023/0097897 A1 | 3/2023 | Campos | |
| 2023/0148321 A1 | 5/2023 | Hall | |
| 2023/0162088 A1 | 5/2023 | Woodward | |
| 2023/0297831 A1 | 9/2023 | Saadi | |
| 2024/0202339 A1 | 6/2024 | Fitzgerald | |
| 2024/0220824 A1 | 7/2024 | Gilad | |
| 2024/0235921 A9* | 7/2024 | Naga | H04L 41/0893 |
| 2024/0249290 A1 | 7/2024 | Mikhael | |
| 2024/0257255 A1 | 8/2024 | Gupta | |
| 2024/0340314 A1 | 10/2024 | Radon | |
| 2024/0354436 A1 | 10/2024 | Mukherjee | |
| 2024/0362716 A1 | 10/2024 | Woiwood | |

FOREIGN PATENT DOCUMENTS

| | | |
|---|---|---|
| WO | 2019141984 A1 | 7/2019 |
| WO | 2023183494 A1 | 9/2023 |

OTHER PUBLICATIONS

Politou, E. et al., "Blockchain Mutability: Challenges and Proposed Solutions", from IEEE Transcations on Emerging Topics in Computing, Published Oct. 25, 2019.
Non-Final Office Action, U.S. Appl. No. 18/616,143, Mailing Date Aug. 8, 2024, 15 pages.
Notice of Allowance, U.S. Appl. No. 18/616,143, Maling Date Oct. 17, 2024, 8 pages.
Non-Final Office Action, U.S. Appl. No. 18/616,149, Mailing Date Jul. 17, 2024, 14 pages.
Final Office Action, U.S. Appl. No. 18/616,149, Mailing Date Oct. 15, 2024, 6 pages.
Notice of Allowance, U.S. Appl. No. 18/616,149, Mailing Date Nov. 12, 2024, 8 pages.
Non-Final Office Action, U.S. Appl. No. 18/620,299, Mailing Date Jul. 30, 2024, 13 pages.
Final Office Action, U.S. Appl. No. 18/620,299, Mailing Date Nov. 27, 2024, 21 pages.
Li et al.,. "TradingGPT: Multi-Agent System with Layered Memory and Distinct Characters for Enhanced Financial Trading Performance", Sep. 7, 2023, arXiv:2309.03736v1, pp. 1-7. (Year: 2023).
Romanko et al., "ChatGPT-based Investment Portfolio Seleciton", Aug. 11, 2023, arXiv:2308.06260, pp. 1-25. (Year: 2023).
Wu, Bingzhe "Is GPT4 a Good Trader?" Sep. 20, 2023, arXiv2309.10982v1, pp. 1-6. (Year: 2023).
Kang at al., "Deficiency of Large Language Models in Finance: An Emperical Examination of Hallucination", Nov. 27, 2023, arXiv:2311.15548v1, pp. 1-15. (Year: 2023).
Crall, Jon, "The MCC Approaches the Geometric Mean of Precision and Recall as True Negatives Approach Infinity", Jul. 9, 2023, arXiv: 2305.00594v2, pp. 1-4. (Year: 2023).
Kynkaaniemi et al., "Improved Precision and Recall For Assessing Generative Models", Oct. 30, 2019, arXiv: 1904.06991v3, pp. 1-16. (Year:2019).
Sajjadi et al., "Assessing Generative Models via Precision and Recall", Oct. 28, 2018, arXiv: 1806.00035v3. pp. 1-15. (Year: 2018).
Yang et al., "FinGPT: Open-Source Financial Large Language Models", Jun. 9, 2023, arXiv: 2306.06031v1, pp. 1-7. (Year: 2023).
Zhang et al., "Enhancing Financial Sentiment Analysis via Retrieval Augmented Large Language Models", Nov. 4, 2023, arXiv: 2310.04027v2, pp. 1-8. (Year: 2023).
Non-Final Office Action, U.S. Appl. No. 18/963,508, Mailing Date Feb. 5, 2025, 13 pages.
Notice of Allowance, U.S. Appl. No. 18/963,508, Mailing Date Apr. 2, 2025, 8 pages.

(56)     References Cited

OTHER PUBLICATIONS

Non-Final Office Action, U.S. Appl. No. 18/963,512, Mailing Date Jan. 28, 2025, 16 pages.
Notice of Allowance, U.S. Appl. No. 18/963,512, Mailing Date Mar. 24, 2025, 8 pages.
Notice of Allowance, U.S. Appl. No. 18/620,299, Mailing Date Apr. 9, 2025, 8 pages.
Notice of Allowance, U.S. Appl. No. 18/616,143, Mailing Date Oct. 17, 2024, 8 pages.
Non-Final Office Action, U.S. Appl. No. 18/924,100, Mailing Date Jan. 10, 2025, 6 pages.
Non-Final Office Action, U.S. Appl. No. 18/924,100, Mailing Date Feb. 11, 2025, 18 pages.
Non-Final Office Action, U.S. Appl. No. 18/924,100, Mailing Date Apr. 14, 2025, 25 pages.
Non-Final Office Action, U.S. Appl. No. 18/924,122, Mailing Date Jan. 24, 2025, 6 pages.
Non-Final Office Action, U.S. Appl. No. 18/924,122, Mailing Date Apr. 11, 2025, 11 pages.
Non-Final Office Action, U.S. Appl. No. 19/052,873, Mailing Date Apr. 15, 2025, 16 pages.
Non-Final Office Action, U.S. Appl. No. 18/616,164, Mailing Date May 22, 2024, 16 pages.
Final Office Action, U.S. Appl. No. 18/616,164, Mailing Date Aug. 23, 2024, 15 pages.
Non-Final Office Action, U.S. Appl. No. 18/616,164, Mailing Date Mar. 14, 2025, 16 pages.
Non-Final Office Action, U.S. Appl. No. 18/616,179, Mailing Date Jun. 4, 2024, 15 pages.
Final Office Action, U.S. Appl. No. 18/616,179, Mailing Date Sep. 25, 2024, 14 pages.
Non-Final Office Action, U.S. Appl. No. 18/616,179, Mailing Date Apr. 2, 2025, 15 pages.
Non-Final Office Action, U.S. Appl. No. 19/186,842, Mailing Date May 23, 2025, 6 pages.
Notice of Allowance, U.S. Appl. No. 19/186,842, Mailing Date Jun. 25, 2025, 11 pages.
Final Office Action, U.S. Appl. No. 19/052,873, Mailing Date May 30, 2025, 20 pages.
Non-Final Office Action, U.S. Appl. No. 19/259,014, Mailing Date Aug. 26, 2025, 9 pages.
Notice of Allowance, U.S. Appl. No. 19/259,014, Mailing Date Oct. 2, 2025, 8 pages.
Non-Final Office Action, U.S. Appl. No. 19/259,042, Mailing Date Aug. 26, 2025, 9 pages.
Notice of Allowance, U.S. Appl. No. 19/259,042, Mailing Date Oct. 3, 2025, 8 pages.

* cited by examiner

Phase I
"Information Collection"

Phase II
"Validation"

Phase III
"Approval, Reject, and Cure"

Work Product
901

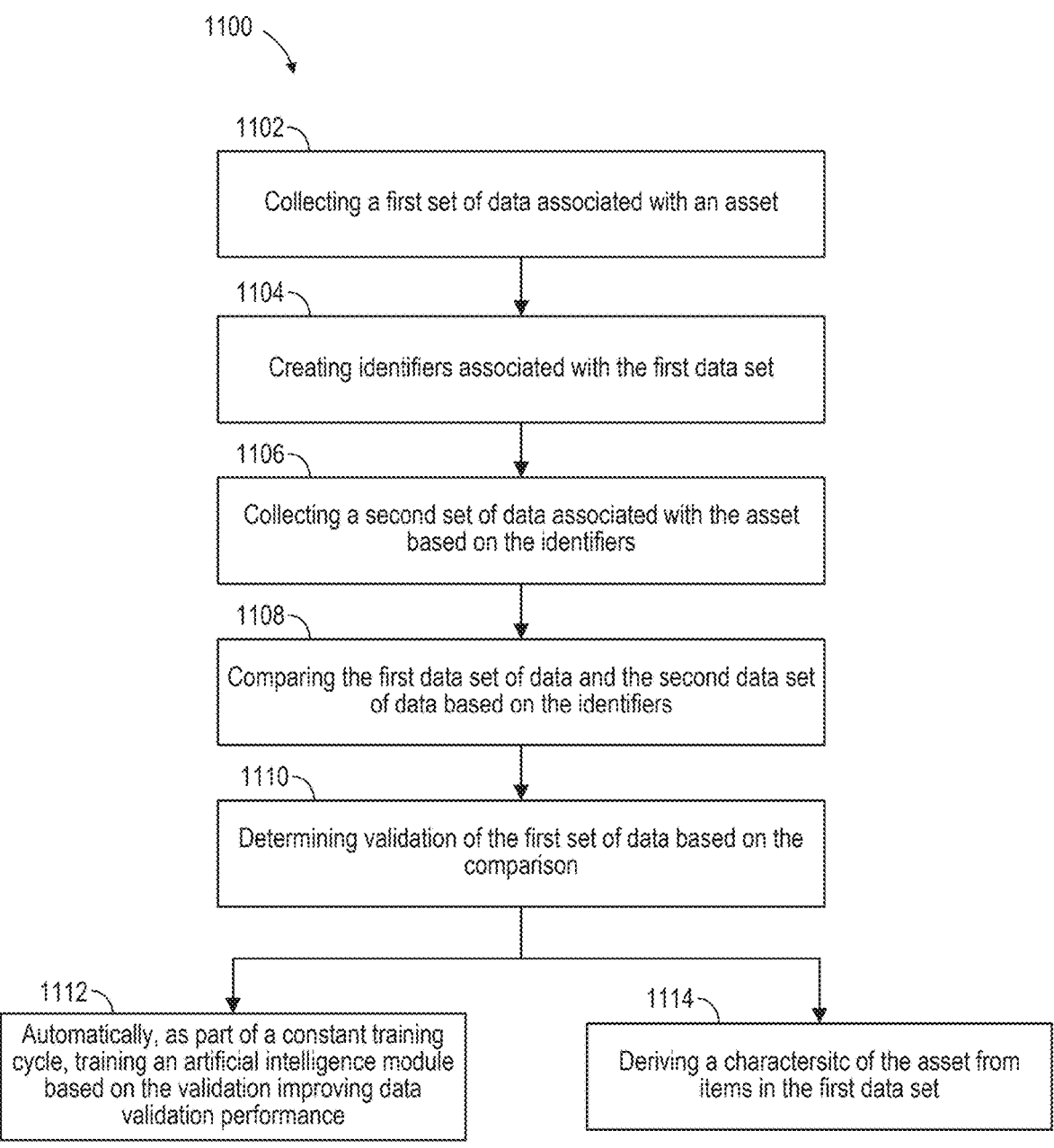

1100

1102
Collecting a first set of data associated with an asset

1104
Creating identifiers associated with the first data set

1106
Collecting a second set of data associated with the asset based on the identifiers 1108
Comparing the first data set of data and the second data set of data based on the identifiers 1110
Determining validation of the first set of data based on the comparison 1112
Automatically, as part of a constant training cycle, training an artificial intelligence module based on the validation improving data validation performance 1114
Deriving a charactersitc of the asset from items in the first data set

FIG. 11

DATA RETRIEVAL AND VALIDATION FOR ONBOARDING PRIVATE CREDIT ASSETS AND DERIVING PRIVATE CREDIT ASSET CHARACTERISTICS

CROSS REFERENCE TO RELATED APPLICATIONS

The present application is a continuation of U.S. patent application Ser. No. 19/259,042, entitled "Data Retrieval And Validation For Asset Onboarding And Deriving Asset Characteristics", filed Jul. 3, 2025, which is incorporated herein in its entirety.

U.S. patent application Ser. No. 19/259,042 is a continuation of U.S. patent application Ser. No. 19/186,842, now U.S. Pat. No. 12,380,503, entitled "Data Retrieval And Validation For Asset Onboarding And Deriving Asset Characteristics", filed Apr. 23, 2025, which is incorporated herein in its entirety.

U.S. patent application Ser. No. 19/186,842 is a continuation in part of U.S. patent application Ser. No. 18/963,508, now U.S. Pat. No. 12,299,743, entitled "Data Retrieval And Validation For Asset Onboarding", filed Nov. 28, 2024, which is incorporated herein in its entirety.

U.S. patent application Ser. No. 18/963,508, is a continuation of U.S. patent application Ser. No. 18/616,149, now U.S. Pat. No. 12,190,384, entitled "Data Retrieval And Validation For Asset Onboarding", filed Mar. 25, 2024, which is incorporated herein in its entirety.

U.S. patent application Ser. No. 18/616,149 claims the benefit of priority under 35 U.S.C. § 119 from U.S. Provisional Patent Application Ser. No. 63/454,622, entitled "Transaction Platform With Synchronized Semi-Redundant Ledgers," filed on Mar. 24, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/509,257, entitled "Data Retrieval and Validation for Asset Onboarding," filed on Jun. 20, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/509,261, entitled "Data Validation and Assessment Valuation," filed on Jun. 20, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/509,264, entitled "Secure Identifier Integration," filed on Jun. 20, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/509,266, entitled "Dual Ledger Syncing," filed on Jun. 20, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/515,337, entitled "Metadata Process, with Static and Evolving Attributes, Introduced into Tokenization Standards," filed on Jul. 24, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/596,471, entitled "Real Asset Fractionalization Algorithm," filed on Nov. 6, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/600,381, entitled "Settlement and Approval Service," filed on Nov. 17, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/615,108, entitled "Live Syncing Capitalization Table System," filed on Dec. 27, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/615,128, entitled "Transaction Flow with Master Account Ledger and Escrow Ledger Interaction," filed on Dec. 27, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/615,136, entitled "Regenerative Model-Continuous Evolution System ("RM-CES")," filed on Dec. 27, 2023, all of which is incorporated herein by reference in its entirety for all purposes. U.S. patent application Ser. No. 18/616,149 claims the benefit of priority under 35 U.S.C. § 119 from U.S. Provisional Patent Application Ser. No. 63/615,145, entitled "Transaction & Settlement Validation Service ("TSVS")," filed on Dec. 27, 2023, all of which is incorporated herein by reference in its entirety for all purposes.

The present application claims the benefit of priority under 35 U.S.C. § 119 from U.S. Provisional Patent Application Ser. No. 63/741,200, entitled "Model Selection And Training And AI Agent Coordination," filed on Jan. 2, 2025, all of which is incorporated herein by reference in its entirety for all purposes.

The present application claims the benefit of priority under 35 U.S.C. § 119 from U.S. Provisional Patent Application Ser. No. 63/756,735, entitled "Model Selection And Training And AI Agent Coordination," filed on Feb. 10, 2025, all of which is incorporated herein by reference in its entirety for all purposes.

U.S. patent application Ser. No. 19/186,842 is a continuation in part of U.S. patent application Ser. No. 18/616,164, entitled "Data Validation And Assessment Valuation", filed Mar. 25, 2024, which is incorporated herein in its entirety.

U.S. patent application Ser. No. 19/186,842 is a continuation in part of U.S. patent application Ser. No. 18/616,179, entitled "Live Syncing Capitalization Table", filed Mar. 26, 2024, which is incorporated herein in its entirety.

BACKGROUND

1. Background and Relevant Art

There is a need for a technology platform that can create digital securities out of what are known as "real assets" and can function as a secondary market platform or Financial Exchange for these types of assets as well as for other types of assets such as, but not limited to, investments in franchises, investments in business that generate dividends or returns based on performance of the business or underlying asset, investments in ventures that capture or mine natural resource such as, but not limited to uranium, timber, and other commodities, private credit, private debt, intangible assets, tradeable assets, and any other types of appropriate assets. Examples of real assets include office buildings, multi-family apartment buildings, car washes, private planes or yachts, antique cars, art, jewelry, insurance policies, and even structured products that are based on the performance of an underlying asset (e.g. a racehorse). It should be understood that the disclosed technology is not limited to creating digital securities.

Real estate, for example, has long been a preferred investment, offering competitive risk-adjusted returns and a hedge against inflation. Direct investments in industries, such as real estate, e.g., purchasing real estate directly, involves deploying and risking large initial and ongoing financial sums. In contrast, indirect investments, e.g., Real Estate Investment Trusts (REITs) and other deal structures and/or securities that pool sums of money from multiple investors together to purchase investments, facilitate individual investors deploying and risking smaller initial and ongoing financial sums. Such indirect investments also involve other costs and require compliance with relevant securities statutes and regulations.

SUMMARY

An exemplary aspect relates to an electronic and computer technology platform for facilitating a "closed" electronic secondary market exchange for tokens (e.g., cryptographic tokens that represent shares or other interests in real estate and/or other assets) which are created by and may be traded by participants registered and validated by a computer system integrated within the technology platform (as opposed to third party token marketplaces). The technology platform includes a novel specialized computer architecture and customized computer code adapted and programmed to implement novel functions that are not currently and have not previously been performed with prior asset exchange platforms. Novel aspects include semi-redundant ledgers that are automatically synchronized by the computer system and which overcome other technical limitations of prior transaction management systems. (possible to have third party market places)

An exemplary aspect relates to a pair of synchronized semi-redundant ledgers that maintain a public and/or private record of each transaction executed on the platform (for example, recorded on a blockchain), in which personally identifiable information (PII) of parties to the transaction are not disclosed and therefore not publicly accessible via the semi-redundant ledgers. In other aspects, the pair of synchronized semi-redundant ledgers maintain, instead, a private record of each transaction. An example can be a regular ledger of any type that is backed up and synchronized with a blockchain (public or private ledger). This automated auditing mechanism facilitates fraud, theft, and loss (if used for inventory instead of real assets). For example, a Consumer Packaged Goods ("CPG") company could keep their entire inventory system on the blockchain to audit stores to control shrinkage, loss prevention, and/or theft.

An exemplary aspect of the disclosed technology includes a computer system specially configured and programmed to perform functions of a transaction platform that includes a network-accessible computer server system with semi-redundant ledgers which are automatically synchronized by the computer system. The semi-redundant ledgers include a first ledger type that may include a database (e.g., centrally controlled by an operator of the computer system); a tokenization module configured to create and/or manage tokens as described herein and configured to interact with a second ledger (e.g., a blockchain); a digital wallet management module configured to receive, store, and transmit digital tokens; and a role-based access module configured to validate participants and their authorized roles as well as authorize and/or limit the participants' functional interactions with the computer system based on their approved roles. The transaction platform with semi-redundant ledgers may provide mechanisms by which investors may trade and/or exchange (e.g., acquire and/or transfer) tokenized portions of real estate/real properties while remaining anonymous (as described herein). The tokenized portions of real estate/real properties may be referred to herein as "asset tokens." The mechanisms by which the investors may trade and/or exchange tokenized portions of real estate/real properties may include tokenization and a dual ledger system. The transaction platform may facilitate a property owner to tokenize the property by generating multiple tokens collectively representing the value of the property. The transaction platform may facilitate investors to browse listed properties and tokens representing fractional shares of the value of one or more properties. The transaction platform may facilitate investors to acquire and transfer the tokens.

An exemplary aspect of the disclosed technology may include the transaction platform being specially configured and programmed to record token transactions in two semi-redundant ledgers on a computing network. One ledger, referred to herein as the "primary ledger," is configured to maintain data stored therein as confidential. The primary ledger may be internal to the transaction platform. In the primary ledger, asset token transactions may be recorded in association with personally identifiable information (PII) of the buyer and seller of the token. The transactions are also recorded in a public or private ledger, referred to herein as the "secondary ledger." The secondary ledger may be implemented as a blockchain. In certain aspects, the secondary ledger is configured to support immutable features. The secondary ledger may be configured to not store personally identifiable information (PII) of the buyer(s) or seller(s).

While exemplary aspects of the transaction platform are described herein with reference to an underlying real estate or real property asset, it should be understood that the technology disclosed herein may be applied to any type of underlying asset including, but not limited to, intangible assets.

An exemplary method of exchanging digital assets representing fractional interests in an asset includes receiving information regarding characteristics (e.g., size, location, calculated values, capitalization rate, capitalization table entries, capitalization tables, depreciation, etc.) of an asset and generating a plurality of digital assets representing fractional interests in the asset. The method also includes establishing a smart contract for exchanging at least one of the plurality of digital assets held by a first entity for trade proceeds from a second entity. The method additionally includes performing a transaction according to the smart contract, and updating a capitalization table based on the performed transaction. The method further includes recording data pertaining to the performed transaction on a blockchain.

Others may be notified of the information regarding characteristics of an asset. Others may be invited to propose an exchange for at least one of the plurality of digital assets representing fractional interests in the asset. A proposal of an exchange for at least one of the plurality of digital assets may be received. Establishing the smart contract for the exchange for at least one of the plurality of digital assets may be responsive to receiving the proposal of the exchange.

The method may further include waiting a predefined period of time after a current owner's acquisition of the asset prior to inviting others to propose an exchange for at least one of the plurality of digital assets representing fractional interests in the asset. Transaction fees may be collected from at least one of the first entity and the second entity, the transaction fees set according to the smart contract governing the performed transaction. At least some of the collected transaction fees may be distributed as license fees to a third entity. Settlement statements pertaining to the performed transaction may be distributed to at least one of the first entity and the second entity.

The method may additionally include recording transaction data pertaining to the performed transaction, including personally identifiable information of at least one of the first entity or the second entity, in a primary ledger configured to maintain the transaction data as confidential, and recording transaction data pertaining to the performed transaction, absent personally identifiable information of the first entity and the second entity, in a secondary ledger configured to make the transaction data publicly or privately available on a blockchain. The asset may include real estate, for example, and the digital assets representing fractional interests in the asset may include nonfungible tokens (NFTs), and/or, but is not limited to, fungible tokens, hybrid tokens, cryptocurrencies, crypto tokens, crypto coins, security token, and asset tokens, having metadata including identification information of the buyer of the NFTs. The smart contract may be established by a broker/dealer with at least one of the first entity or the second entity.

An exemplary non-transitory computer readable medium stores computer-readable instructions executable by a hardware computing processor to perform operations of a method for recording transactions with semi-redundant ledgers as described herein.

An exemplary system for recording transactions with semi-redundant ledgers includes at least one device including a hardware computing processor, the system being configured to perform operations of a method for recording transactions with semi-redundant ledgers as described herein. The system may include a non-transitory memory having stored thereon computing instructions, executable by the hardware computing processor, to perform operations of a method for recording transactions with semi-redundant ledgers as described herein.

An exemplary system for recording transactions with semi-redundant ledgers includes at least one device including a hardware circuit operable to perform a function, the system being configured to perform operations of a method for recording transactions with semi-redundant ledgers as described herein.

According to certain aspects of the present disclosure, a computer-implemented method is provided. The method includes receiving information regarding an asset. The method includes generating at least one digital asset representing fractional interests in the asset. The method includes facilitating establishment of a smart contract for exchanging the at least one digital asset held by a first entity for trade proceeds from a second entity. The method includes performing a transaction based on the smart contract. The method includes updating a capitalization table based on performing the transaction. The method includes recording data, pertaining to the transaction that is performed, on a primary ledger and a secondary ledger.

According to certain aspects of the present disclosure, a system is provided. The system includes one or more memories comprising instructions and one or more processors configured to execute the instructions which, when executed, cause the one or more processors to receive information regarding an asset. The one or more processors is configured to execute the instructions which, when executed, cause the one or more processors to generate at least one digital asset representing fractional interests in the asset.

The one or more processors is configured to execute the instructions which, when executed, cause the one or more processors to facilitate establishment of a smart contract for exchanging the at least one digital asset held by a first entity for trade proceeds from a second entity. The one or more processors is configured to execute the instructions which, when executed, cause the one or more processors to perform a transaction based on the smart contract. The one or more processors is configured to execute the instructions which, when executed, cause the one or more processors to update a capitalization table based on performing the transaction. The one or more processors is configured to execute the instructions which, when executed, cause the one or more processors to record data, pertaining to the transaction that is performed, on a primary ledger and a secondary ledger.

According to other aspects of the present disclosure, a non-transitory machine-readable storage medium comprising machine-readable instructions for causing a processor to execute a method is provided. The method includes receiving information regarding an asset. The method includes generating at least one digital asset representing fractional interests in the asset. The method includes facilitating establishment of a smart contract for exchanging the at least one digital asset held by a first entity for trade proceeds from a second entity. The method includes performing a transaction based on the smart contract. The method includes updating a capitalization table based on performing the transaction. The method includes recording data, pertaining to the transaction that is performed, on a primary ledger and a secondary ledger.

According to certain aspects of the present disclosure, a system is provided. The system includes one or more memories comprising instructions and one or more processors configured to execute the instructions, which, when executed, cause the one or more processors to collect, via an artificial intelligence module, a first set of data associated with an asset and create identifiers associated with the first set of data. The system includes one or more memories comprising instructions and one or more processors configured to execute the instructions, which, when executed, cause the one or more processors to collect a second set of data associated with the asset based on the identifiers and compare the first set of data and the second set of data based on the identifiers. The system includes one or more memories comprising instructions and one or more processors configured to execute the instructions, which, when executed, cause the one or more processors to validate the first set of data based on the comparison and generate a result of approval (e.g., data validated) or rejection (e.g., data not validated) based on the comparison. The system includes one or more memories comprising instructions and one or more processors configured to execute the instructions, which, when executed, cause the one or more processors to derive one or more characteristics of the asset from validated data (e.g., the first set of data).

According to other aspects of the present disclosure, a non-transitory machine-readable storage medium comprising machine-readable instructions for causing a processor to execute a method is provided. The method includes collecting, via an artificial intelligence module, a first set of data associated with an asset and creating identifiers associated with the first set of data. The method includes collecting a second set of data associated with the asset based on the identifiers and comparing the first set of data and the second set of data based on the identifiers. The method includes validating the first set of data based on the comparison and generating a result of approval (e.g., data validated) or rejection (e.g., data not validated) based on the comparison. The method includes deriving one or more characteristics of the asset from validated data (e.g., the first set of data).

BRIEF DESCRIPTION OF DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which:

FIG. 11 illustrates a flow chart of an example method for data retrieval and validation.

DETAILED DESCRIPTION

Figure 1:
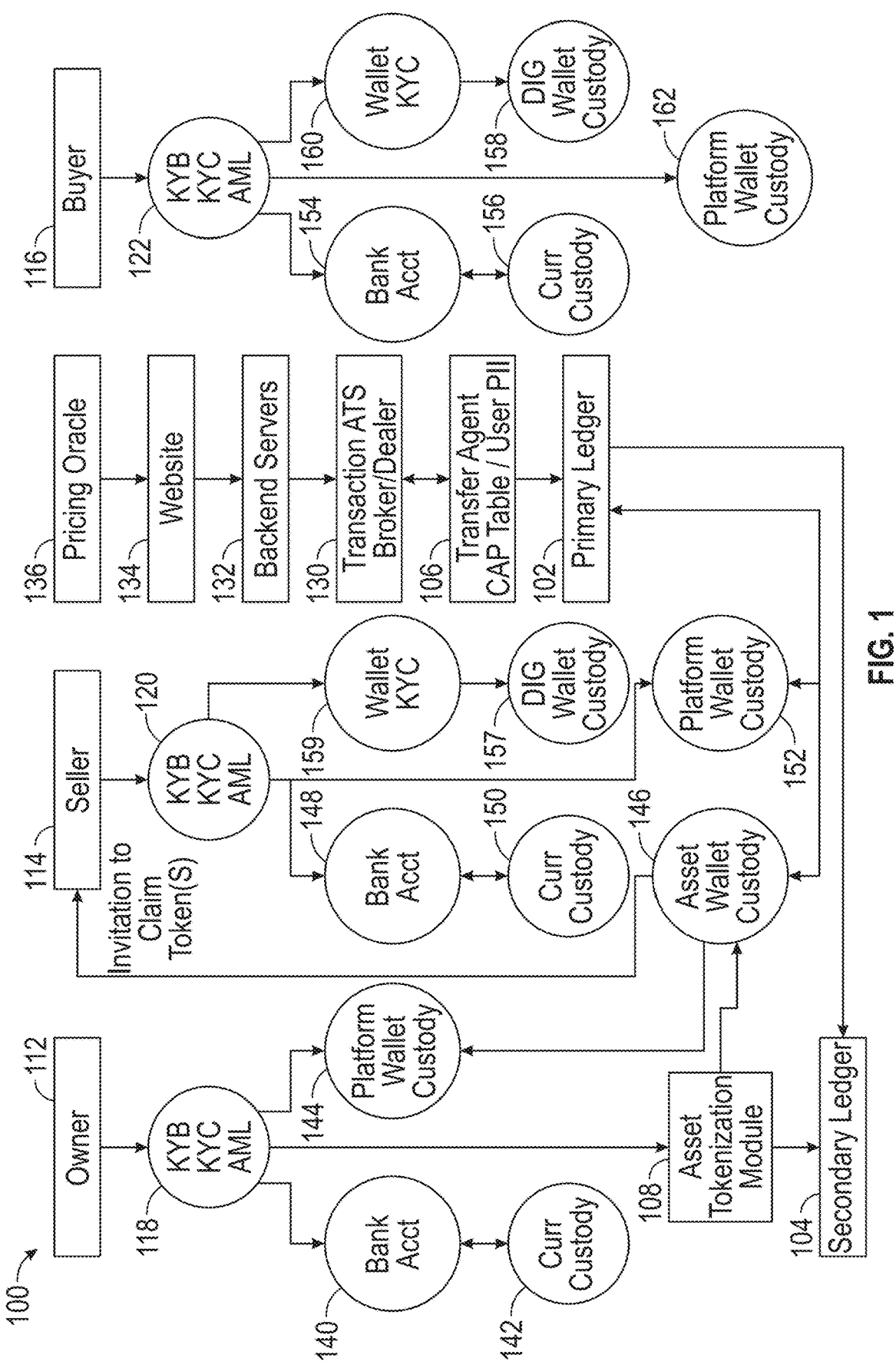
FIG. 1 illustrates an example transaction system including semi-redundant ledgers.

Examples extend to methods, systems, and computer program products for retrieving and validating data for asset onboarding and determining asset characteristics (e.g., from validated data).

In one aspect, a first data set pushed into a database is collected via an artificial intelligence module. The first data set is purported by user to correspond to an asset. Unique identifiers corresponding to each of a plurality of relevant items within the first data set are accessed. The artificial intelligence module is utilized to perform an approval/ rejection process on the first data set checking the validity of the plurality of relevant items from additional data sources.

The approval/rejection process includes electronically collecting a pulled second data set into the database using the unique identifiers. The second data set is considered as corresponding to the asset based on the unique identifiers. The approval/rejection process includes cross-referencing the first data set with the second data set. The approval/ rejection process includes generating first data set validation findings based on results of the cross-referencing. The approval/rejection process includes electronically notifying an administrative entity of the first data set validation findings. The approval/rejection process includes accessing a first data set rejection/approval decision of the administrative entity.

One or more characteristics of the asset (e.g., a capitalization rate, a valuation, a capitalization table entry, a capitalization table, etc.) are derived based on the plurality of relevant items. Automatically, as part of a constant training cycle, and potentially concurrently with the approval rejection process and/or asset characteristic derivation, the artificial intelligence module is trained based on the generated first data set validation findings and the accessed first data set rejection/approval decision. The training improves data searching performance and data validating performance of the artificial intelligence module.

In another aspect, a digital image purported to be an image of a real property asset is collected into a database. Unique identifiers corresponding to each of one or more property features depicted within the digital image are found. An artificial intelligence module is utilized to validate relevancy of the one or more depicted property features.

Validating relevancy of the one or more depicted property features includes electronically collecting a second data set into the database using the unique identifiers, the second data set considered as corresponding to the real property asset based on the unique identifiers. Validating relevancy of the one or more depicted property features includes cross-referencing the digital image with the second data set. Validating relevancy of the one or more depicted property features includes confirming the depicted one or more property features are features of the real property asset based on results of the cross-referencing.

One or more characteristics of the real property asset (e.g., a capitalization rate, a valuation, a capitalization table entry, a capitalization table, etc.) are derived based on the depicted one or more property features. Automatically, as part of a constant training cycle, and potentially concurrently with confirming the depicted one or more property features and/or asset characterization derivation, the artificial intelligence module is trained using the confirmation, the depicted one or more property features, and the second data set as training data. The training improves the data validating performance of the artificial intelligence module.

In a further aspect, a first data set is electronically collected into a database. The first data set purportedly corresponds to an asset. Unique identifiers corresponding to each of one or more items within the first data set are accessed. An object containing the one or more items is formulated. An additional unique identifier is assigned to the asset. A queue job containing the additional unique identifier and the object is crated. An artificial intelligence module is pinged there is the queue job.

The artificial intelligence module confirms relevancy of the one or more items to the asset. Confirming relevancy of the one or more items includes sending out an asynchronous search for matches on the one or more items contained in the object. Confirming relevancy of the one or more items includes electronically collecting a second data set into the database using the unique identifiers. The second data set is considered as corresponding to the asset based on the unique identifiers. Confirming relevancy of the one or more items includes cross-referencing the first data set with the second data set.

One or more characteristics of the asset (e.g., a capitalization rate, a valuation, a capitalization table entry, a capitalization table, etc.) are derived based on the one or more items. Automatically, as part of a constant training cycle, and potentially concurrently with confirming relevancy of the one or more items and asset characteristic derivation, the artificial intelligence module is trained based on confirming the relevancy of the one or more items. The training improves the data validating performance of the artificial intelligence module.

FIG. 1 illustrates an example transaction system 100 including semi-redundant ledgers (primary ledger 102 and secondary ledger 104).

In aspects, system 100 is an Alternative Trading System (ATS). System 100 may automatically create and dynamically update (e.g., maintain) capitalization tables of assets underlying exchanged tokens, thereby addressing a longstanding pain point in businesses having investors for whom such capitalization tables must be manually created and revised whenever ownership changes occur. The automatic creation and live syncing maintenance of capitalization tables may facilitate their being continually up to date, complete, verified, and audit-ready (e.g., dynamically updated).

For example, system 100 may provide owners with a list of new investors in a tokenized asset based on the updated capitalization table, reflecting every buyer of the investors' tokens representing an interest in the underlying asset. System 100 may also provide value to the transfer side via improved efficiency and the reduction of manual pain points in their business. The ease and simplicity with which the systems and methods described herein may be applied in practice may provide compelling inducements for industries traditionally slow to adopt new technology, e.g., commercial real estate, to adopt the technology disclosed herein for facilitating transaction processing for the benefit of buyers and sellers of digital assets representing fractional ownership in underlying assets, system 100, sponsors of investments in assets and/or owners of assets (e.g., real estate) may provide access to investments in such assets which may have previously been unavailable, for example, due to securities regulations and/or rules defining sophisticated and accredited investors.

Retail investors and buyers of assets have traditionally been locked out of participating in commercial real estate investments because they lack the minimum investment threshold and/or do not have sufficient qualifications as traditional investors to acquire an interest in an asset from a Seller of the interest in the asset. System 100 may establish a secondary exchange via which the asset tokens are exchanged in secondary trades, following any holding periods following the primary issuance of securities underlying the asset tokens as may be required by securities regulations (e.g., Rule 144), so the restrictions of the securities regulations pertaining to qualifications of the investors may not apply to the contemplated exchange of asset tokens. For example, system 100 may unlock real estate investment opportunities for retail buyers, not only facilitating retail buyers to capture return on investment, but also to take advantage of potential tax savings, for example, via write-offs of depreciation of the underlying assets on tax returns.

The disclosed technology platform can create digital securities out of what are known as "real assets" and can function as a secondary market platform or Financial Exchange for these types of assets as well as for other types of assets such as, but not limited to, investments in franchises, investments in business that generate dividends or returns based on performance of the business or underlying asset, investments in ventures that capture or mine natural resource such as, but not limited to uranium, timber, and other commodities, private credit, private debt, intangible assets, tradeable assets, real estate, jewelry, fine art, and any other types of appropriate assets.

As depicted, system 100 includes owner 112, seller 114, and buyer 116. Each of owner 112, seller 114, and buyer 116 may include computing and communication resources and systems (e.g., an owner device, a seller device, and a buyer device, respectively) corresponding to and/or representing users interfacing with system 100. Owner 112 may be an owner of an asset listed on the transaction platform and/or a sponsor of investments in an asset listed on the transaction platform, and may also be referred to as an asset owner or a property owner.

Seller 114 may represent one who is selling or listing an asset as available for sale or exchange, e.g., available to be transferred to another user in exchange for something else (e.g., tokens, currency, etc.). Seller 114 may also be referred to as a seller when participating in a buy-sell transaction, for example.

Buyer 116 may represent one who is seeking to purchase, buy, or acquire at least a partial interest in an asset which is listed (e.g., as available for sale or exchange) on the transaction platform. Buyer 116 may also be referred to as a buyer when participating in a buy-sell transaction, for example.

System 100 may perform verification of identification and related information for each of the users of the system 100 (e.g., including owner 112, seller 114, and/or buyer 116) via an online identity verification process, for example, a know your customer (KYC) verification process for an individual user, a know your business (KYB) verification process for any business entity, such as, but not limited to, limited liability company (LLC), C corporation, S corporation, and other appropriate business entities, and/or an anti-money laundering (AML) verification process.

Each user of the system 100 may communicatively couple an electronic and/or computer-networked funding source and/or recipients of funds (e.g., financial institution account, bank account, credit union account, investment account, cryptocurrency account, digital wallet, and/or other provider or recipient of digital representations of currency and/or digital assets associated with a transaction processed by the transaction platform) to system 100. Digital assets may include, but is not limited to, cryptocurrencies, crypto tokens, crypto coins, security token, asset tokens, non-fungible tokens (NFTs), fungible tokens, and/or other appropriate forms of digital assets. The electronic and/or computer-networked funding source and/or recipients of funds may include a computing system of one or more third-party accounts of users of the system 100.

Sending and/or distributing fees and/or funds, receiving and/or collecting fees and/or funds, and exchanging assets for fees and/or funds as described herein may merely be illustrative examples of the technological systems and methods described herein which may be applied in addressing challenges in a variety of other contexts and applications, also. For example, the technological systems and methods described herein may provide novel systems and methods for transmitting and/or receiving transmissions of various types of digital content (e.g., digital bits and/or bytes storable in a computer-readable memory of the system 100) over a computing communication system associated with the system 100. In various non-limiting examples, including those described herein, the digital content transmitted and/or received by components of the systems and methods described herein may include digital representations of currency, cryptocurrency, NFTs, and/or digital assets such as written works, artwork, photographs, audio/video programs, music, digital blueprints, computer-aided design (CAD) files representing physical articles of manufacture, architectural designs, plats of survey, deeds to real property, stock and/or membership interests in business entities, executed contracts, ownership and/or membership interests in timeshare properties, co-op properties, travel/vacation clubs, recreational clubs, social clubs, etc. Additional examples of content could be valuation estimates, third party appraisals, proof of purchases, copies of insurance policies, profit and loss data, calendars and schedules, and performance data.

System 100 may include primary ledger 102 (e.g., a private mutable ledger), secondary ledger 104 (e.g., a public immutable ledger), transfer agent 106, asset tokenization module 108, backend servers 132, website 134, and pricing oracle 136. While primary ledger 102 and transfer agent 106 are depicted as separate, it should be understood that, in certain aspects, primary ledger 102 and transfer agent 106 are included within the same service. The users may interact with website 134 via a web browser app executing on computing devices of owner 112, seller 114, and buyer 116, all of which can be, but is not limited to, a desktop computer, laptop computer, tablet computer, personal digital assistant (PDA), cell phone, mobile phone, smart phone, and/or other computing devices including mobile devices.

Website 134 can transfer user-interface data to and/or from computing devices corresponding to owner 112, seller 114, and buyer 116. Web browser apps at computing devices corresponding to owner 112, the seller 114, and the buyer 116 can process the user-interface data and present a corresponding user-interface. The user-interface data and user-interfaces can be tailored per user based on how a user is participating in a transaction, such as, for example, as an owner, a seller, or a buyer. For example, a seller and a buyer may get different user-interfaces, one user-interface with data relevant to selling a fractional interest in an asset and another user-interface with data relevant to purchasing the fractional interest in the asset respectively.

System 100 may be communicatively coupled with transaction ATS broker/dealer module 130, pricing oracle 136, and secondary ledger 104. While, in some aspects, primary ledger 102 is described as being centralized and secondary ledger 104 as being decentralized (e.g., distributed), it should be understood that primary ledger 102 could be decentralized. Primary ledger 102 and/or secondary ledger 104 may be implemented with blockchain technology. Primary ledger 102 and secondary ledger 104 may be private or public. Primary ledger 102 and secondary ledger 104 may include multiple copies of ledgers maintained on different computing nodes of computing networks implementing and/or supporting one or more public blockchain protocols, for example, but not limited to, Ethereum, Bitcoin, Binance Smart Chain (BSC), Cardano, Polkadot, Solana, Chainlink, Cosmos, TRON, HIVE, Polygon (Matic Network), and more.

In certain aspects, the primary ledger 102 can store all user personally identifiable information (PII) utilized by the system 100, as well as a capitalization table (also referred to as a cap table) that maintains the status of platform assets and transactions, including the capitalization of each asset (e.g., real property) listed on the platform (e.g., listed as available for transactions on the platform). The primary ledger 102 may be implemented as a Structured Query Language (SQL) database, for example.

In certain aspects, primary ledger 102 can store user personally identifiable information (PII) utilized by the system 100, as well as a capitalization table (also referred to as a cap table). The capitalization table maintains the status of platform assets and transactions, including the capitalization of each asset (e.g., real property) listed on the platform (e.g., listed as available for transactions on the platform). Primary ledger 102 may be implemented as a Structured Query Language (SQL) or other database, for example.

In some aspects, primary ledger 102 is maintained by transfer agent 106. The function of transfer agent 106 may be unregulated. Transfer agent 106 can record transactions and/or transaction data in primary ledger 102. Transactions and/or transaction data in primary ledger 102 can be (e.g., automatically) semi-redundantly synchronized to secondary ledger 104. For example, transfer agent 106 can (e.g., semi-redundantly) synchronize primary ledger 102 and secondary ledger 104. In some aspects, semi-redundant synchronization occurs automatically in accordance with synchronization rules, such as, for example, removing PII prior to synchronization. Further, transfer agent 106 may act as a gatekeeper and share information regarding transactions on primary ledger 102 and/or secondary ledger 104 only with authorized users and/or transaction ATS broker/dealer module 130.

In combination, primary ledger 102 and/or secondary ledger 104 can be utilized to automatically and digitally preserve evidence of transaction completion. Upon transaction completes, transaction related data can be (automatically) recorded to primary ledger 102 (e.g., a private mutable ledger). At least a subset of the transaction related data can be semi-redundantly (and automatically) synchronized from primary ledger 102 to secondary ledger 104 (e.g., a public immutable ledger, such as, a block chain).

Transaction ATS broker/dealer module 130 may include computing and communication resources and systems corresponding to and/or representing a registered broker, registered dealer, registered broker/dealer licensed by the US Securities and Exchange Commission (SEC), the Financial Industry Regulatory Agency (FINRA), other domestic/international regulatory or governmental agencies, and/or similar roles in various exemplary applications and/or jurisdictions in which the system 100 is utilized. Transaction ATS broker/dealer module 130 may interface with the system 100 to provide associated broker/dealer functionality on system 100.

Functionality provided by the transaction ATS broker/dealer module 130 may be separate from functionality provided by other modules of system 100, for example, due to regulatory requirements including those promulgated by the Financial Industry Regulatory Authority (FINRA). In one aspect, transaction ATS broker/dealer module 130 may include an Alternative Trading System (ATS) and implementations (e.g., software, firmware, programmable logic arrays, electronic circuitry, etc.) of FINRA-compliant processes and methods for facilitating the transactions processed by the transaction platform as approved and licensed by FINRA.

Compliance with FINRA, SEC, and other government regulations/conditions/flags may be required at system 100 for transactions to be initiated, proceed through various stages, and settle.

Functionality provided by transaction ATS broker/dealer module 130 may be implemented in a virtual private cloud separate from other modules of system 100. Firewalls may be established for transaction ATS broker/dealer module 130 to be separate from and/or on a separate web services instance than other modules of system 100. Transaction ATS broker/dealer module 130 may provide functionality to introduce buyers 116 and sellers 114 to each other, to present user-interfaces, to allocate resources, to release allocated resources, to generate smart contracts, to settle transactions facilitated by the transaction platform, to distribute fees associated with the transactions facilitated by the transaction platform to appropriate participants in system 100, and/or to act as a gatekeeper of transactions facilitated by the transaction platform.

Smart contracts are digital contracts that automatically execute, control or document events and actions according to the terms of a contract or an agreement. Fees generated from activities on system 100 during an acquisition/transfer transaction (e.g., buy-sell transaction, acquisition transaction, merger transaction, etc.) may be collected and/or distributed by transaction ATS broker/dealer module 130, for example, according to rules, agreements, and/or smart contracts associated with the transaction facilitated by the transaction platform. Fees generated from activities and/or participants of system 100 outside transaction ATS broker/dealer module 130 (e.g., from other participants of the transaction platform and/or any third-party system that is not included in system 100) may be processed and collected by components of system 100.

Transaction ATS broker/dealer module 130 may request payment of fees (e.g., fees associated with a transaction facilitated by components of system 100) via third-party custody account(s) of the buyer 116. Transaction ATS broker/dealer module 130 may deduct funds sufficient to cover the fees from proceeds of the transaction to pay seller fees (e.g., fees payable to the seller 114) as stipulated by and/or agreed to by the seller 114 in a smart contract associated with the transaction as part of a process of listing a token as available for an exchange transaction facilitated by system 100.

A computing system of the third-party custody account(s) may send funds to cover the fees to transaction ATS broker/dealer module 130 at which time transaction ATS broker/dealer module 130 may keep the funds covering the fees. Transaction ATS broker/dealer module 130 may disburse funds covering a licensing fee for system 100 to one or more entities due those fees. Transaction ATS broker/dealer module 130 may disburse funds covering a partnership fee to the transfer agent 106. Transaction ATS broker/dealer module 130 may generate and/or distribute a final settlement statement to the buyer 116 and seller 114. In the event of any errors, omissions, glitches, or problems associated with the transaction processed by system 100, transaction ATS broker/dealer module 130 may notify a designated third party of the event for appropriate remediation. Transaction ATS broker/dealer module 130 may include one or more maintenance and support modules via which remediation, updates, upgrades, and/or support may be provided via a third-party computing system communicatively coupled with transaction ATS broker/dealer module 130.

Pricing oracle 136 may include a third-party service that connects smart contracts formulated in system 100 with third-party entities and third-party systems outside of system 100. Pricing oracle 136 may provide a user of system 100 with an estimate of the current value of an asset. Pricing oracle 136 may facilitate calculations and computations based on the estimate as directed by the user. The user may modify inputs to pricing oracle 136 to utilize pricing oracle 136 for determining the user's own market pricing estimates. For example, buyer 116 may modify inputs to pricing oracle 136 to utilize pricing oracle 136 for estimating a future value of their investment in an asset and determining an amount of funds buyer 116 may agree to exchange for the asset on a given day. Seller 114 may transmit information indicating agreement with pricing data provided by pricing oracle 136, or seller 114 may transmit information that overrides the pricing data provided by pricing oracle 136. For example, in the context of commercial real estate assets, pricing oracle 136 may include a digital broker opinion of value (BOV).

In an example, owner 112 (e.g., a real estate property owner) may authenticate with system 100 according to KYB KYC AML 118 protocols and methodologies. Owner 112 may link bank account 140 and currency custody module 142 to system 100. Currency custody module 142 may serve as a custodian for owner 112's currency on system 100. Currency custody module 142 may be configured to hold fiat currency, for example, US dollars ($) or other forms of fiat currency. Platform digital wallet custody module 144 may serve as a custodian for owner 112's digital assets on system 100.

In the example, seller 114 may authenticate with system 100 according to KYB KYC AML 120 protocols and methodologies. In some examples, owner 112 and seller 114 may be the same individual or entity playing the different roles in a transaction, while in other examples, owner 112 and seller 114 may be different individuals or entities, for example, if seller 114 is a broker or agent engaged by owner 112 to list and/or transfer the property on system 100 on their behalf. Seller 114 may link bank account 148 and currency custody module 150 to system 100. Currency custody module 150 may serve as a custodian for seller 114's fiat currency on system 100.

Digital wallet custody module 157 may serve as a custodian for seller 114's digital assets on system 100. These digital assets may include cryptocurrency, e.g., USDC tokens and any other crypto currencies. Digital wallet custody module 157 may authenticate with system 100 according to wallet KYC 159 protocols and methodologies. Digital wallet custody module 157 may also include functionality and/or an interface to convert or exchange the digital currency held thereby into fiat currency for the benefit of seller 114. Conversions or exchanges of the cryptocurrency held by digital wallet custody module 157 to fiat currency may be documented by a transaction entry in primary ledger 102 and/or secondary ledger 104. Platform digital wallet custody module 152 may serve as a custodian for seller 114's digital assets on system 100, including digital assets which seller 114 transfers on behalf of a separate owner (e.g., via a broker or agency relationship) and the digital assets which seller 114 transfers on its own behalf as also owner 112 of the digital assets.

Asset tokenization module 108 may generate one or more digital assets representing an asset and/or a value of an asset, for example, a real estate property owned by owner 112, and store the generated digital assets in asset wallet custody module 146. Asset wallet custody module 146 may transmit data to and/or recording generation of data assets at primary ledger 102 and/or secondary ledger 104. Asset wallet custody module 146 may transmit the digital assets to owner 112's platform digital wallet custody module 144 and provide data to transfer agent 106 to record in the primary ledger 102 regarding the creation and/or transfer of the digital assets generated by asset tokenization module 108. Data recorded to primary ledger 102 can be (e.g., automatically) semi-redundantly synchronized to secondary ledger 104.

Asset wallet custody module 146 may transmit an invitation to seller 114 to claim the digital assets (e.g., a fractional interest in a real asset) generated by asset tokenization module 108. When seller 114 claims or retrieves its associated portion of the digital assets generated by asset tokenization module 108 that is stored in asset wallet custody module 146, for example, if seller 114 is going to trade its associated portion of the digital assets generated by asset tokenization module 108 on system 100, then asset wallet custody module 146 may transmit the digital assets to seller 114's platform digital wallet custody module 152 and transmit information regarding the transfer to transfer agent 106 for recording on the primary ledger 102 (with, for example, automatic, semi-redundant synchronization to secondary ledger 104). In some aspects, instead of transmitting an invitation to seller 114, asset wallet custody module 146 can transmit the digital assets generated by asset tokenization module 108 directly to seller 114's asset wallet custody module 146.

In an example, buyer 116 may authenticate with system 100 according to KYB KYC AML 122 protocols and methodologies. Buyer 116 may link bank account 154 and currency custody module 156 to system 100. Currency custody module 156 may serve as a custodian for buyer 116's fiat currency on system 100. Digital wallet custody module 158 may serve as a custodian for buyer 116's digital assets on system 100. These digital assets may include cryptocurrency, e.g., USDC tokens and any other crypto currencies. Digital wallet custody module 158 may authenticate with system 100 according to wallet KYC 160 protocols and methodologies. Digital wallet custody module 158 may also include functionality and/or an interface to convert or exchange the digital currency held thereby into fiat currency for the benefit of buyer 116. Conversions or exchanges of the cryptocurrency held by digital wallet custody module 158 to fiat currency may be documented by a transaction entry in primary ledger 102 and then automatically (semi-redundantly synchronized) secondary ledger 104. Platform digital wallet custody module 162 may serve as a custodian for buyer 116's digital assets on system 100, for example, shares in tokenized assets generated by asset tokenization module 108.

In an example, buyer 116 may see (e.g., in a presented user-interface) that seller 114 has listed one or more digital assets (e.g., a fractional interest in a real asset) for sale. The one or more digital assets may have been generated by asset tokenization module 108 and stored in asset wallet custody module 146. In one aspect, the one or more digital assets are listed on website 134 that is accessed by buyer 116.

Buyer 116 can engage in a transaction to purchase the one or more digital assets. The transaction can be processed by system 100 to exchange currency via currency custody module 156 and/or digital assets via digital wallet custody module 158 for the one or more digital assets generated by asset tokenization module 108, and, for example, representing the fractional interest in the real asset in which buyer 116 is interested. Seller 114 may receive currency and/or digital assets (e.g., crypto currency) from buyer 116's currency custody module 156 and/or digital wallet custody module

158. Buyer 116 may receive the one or more digital assets, representing the fractional interest in the real asst, from seller 114's platform digital wallet custody module 152, into buyer 116's platform digital wallet custody module 162. Evidence regarding the transfer and settlement of the transaction can be transmitted to and recorded on primary ledger 102 as well as on secondary ledger 104. In one aspect, data is recorded on primary ledger 102 and subsequently semi-redundantly synchronized to secondary ledger 104.

Figure 2:
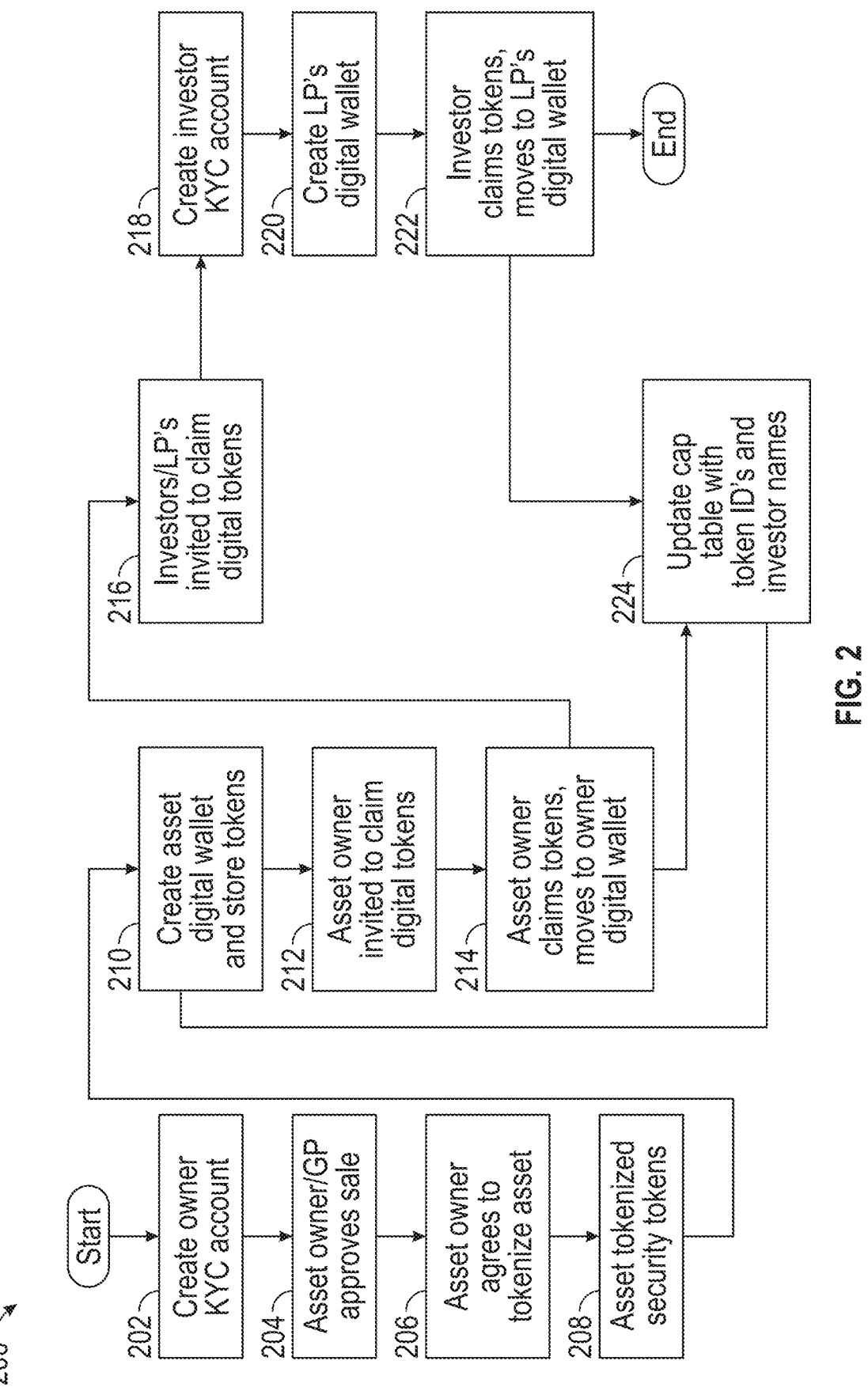
FIG. 2 illustrates an example process for tokenization of an asset.

FIG. 2 illustrates an exemplary process 200 for tokenization of an asset, according to some aspects of the disclosed technology. Process 200 can be implemented using the components of system 100. For example, one or more tokens can be created, each token representing a fractional interest in an asset. There are at least two types of participants in process 200. One is an owner, (e.g., an asset holder), such as the owner 112, who may also be referred to as a sponsor or general partner (GP). The other is an investor, also referred to as a limited partner (LP). The investor may be a current investor in the asset or an investor who wants to invest in the asset. The investor may also be referred to as the buyer, such as buyer 116.

Initially (e.g., at or prior to "START"), the participants (e.g., users) may be onboarded with system 100 as discussed with reference to FIG. 1, and process 200 that the participants undergo to become onboarded with system 100 is described in detail below. For example, the owner (e.g., may be GP) may undergo a KYB process and a KYC account for owner 112 may be created with system 100 (operation 202). Owner 112 may approve sale of the asset using the system 100 (operation 204) to generate a smart contract memorializing agreement to sell and list.

After owner 112 agrees to tokenize (fractionalize interests in) an asset (operation 206), system 100 may tokenize the asset as security tokens (operation 208), for example, or as other digital assets including, but is not limited to, nonfungible tokens (NFTs), fungible tokens, hybrid tokens, cryptocurrencies, crypto tokens, crypto coins, security token, and asset tokens, having metadata including identification information of the buyer of the NFTs. The security tokens may include, for example, ERC 1400 tokens. The security tokens may be fungible tokens or non-fungible tokens, which are unique and differentiated from other tokens representing a share of value in the asset, and may store associated meta data. In various examples, other digital asset types may be used. The security tokens created may include tokens designated as being owned by the GP and tokens owned by each of the investors or LPs who also hold an interest in the asset.

In the example of FIG. 2, an asset having a net value of $1,000,000 may be tokenized as 1,000 tokens, each token having a value of $1,000. In this example, the net value of the asset may be taken into account any debt by which the asset is burdened. In other words, an asset having a market value of $2,000,000, and a mortgage securing a debt of $1,000,000 recorded as a lien against the asset, may have a net value of $1,000,000. An asset having a market value of $1,000,000, and no debt against the asset, may have a net value of $1,000,000.

These tokens may be sent by transfer agent 106 to a platform digital wallet, such as platform digital wallet custody module 152, created for the asset (operation 210), and the capitalization table for the asset may be updated by transfer agent 106 to reflect moving the tokens (operation 224). An identification number (ID) identifying the unique tokens may be included in the capitalization table along with the token's owner or investor's identification information. The platform digital wallet may be held by system 100 or a third party.

System 100 may invite the GP to claim the tokens (operation 212). When the GP claims the tokens, they may be moved from the platform wallet to the GP's digital wallet (operation 214), and the capitalization table may be updated to reflect the move (operation 224). The tokens claimed by the GP are only the GP's tokens, not investors' (LP's) tokens. The GP may then invite the investors (LPs) to claim their tokens (operation 216). Once the LPs claim their tokens, the LPs may be free to conduct transactions on system 100 using the tokens, for example, transferring their tokens or exchanging their tokens for other items of value, for example, other tokens representing interests in other assets.

If an LP who wishes to claim their tokens is not registered or onboarded onto system 100, the LP may undergo a KYC process to create an investor account with the platform on the system 100 (operation 218) and create the LP's digital wallet (operation 220). The LPs may then claim their tokens, which may then be moved from the platform asset digital wallet (which may have been holding the tokens since they were created in operation 208) to the LP wallets (operation 222), and the capitalization table may be updated to reflect the moves (operation 224). For example, the capitalization table may associate the token identifiers (IDs) with the names of the LPs.

When the capitalization table is updated (operation 224), system 100 can record the updated capitalization table may be updated in primary ledger 102 and/or secondary ledger 104 (blockchain). In one aspect, system 100 records an updated capitalization table to primary ledger 102. The system 100 may also automatically update (e.g., semi-redundantly synchronize) secondary ledger 104 to correspond with primary ledger 102. PII about the GP or LPs may be withheld from and not stored in secondary ledger 104. For example, instead of an LP name, the secondary ledger may associate token IDs with a hash value that is unique to the LP. In this manner, a blockchain transaction at secondary ledger 104 may be linked to the LP, while the LP may remain anonymous. The primary and secondary ledgers 102, 104 may be correlated using a database within system 100.

Figure 3:
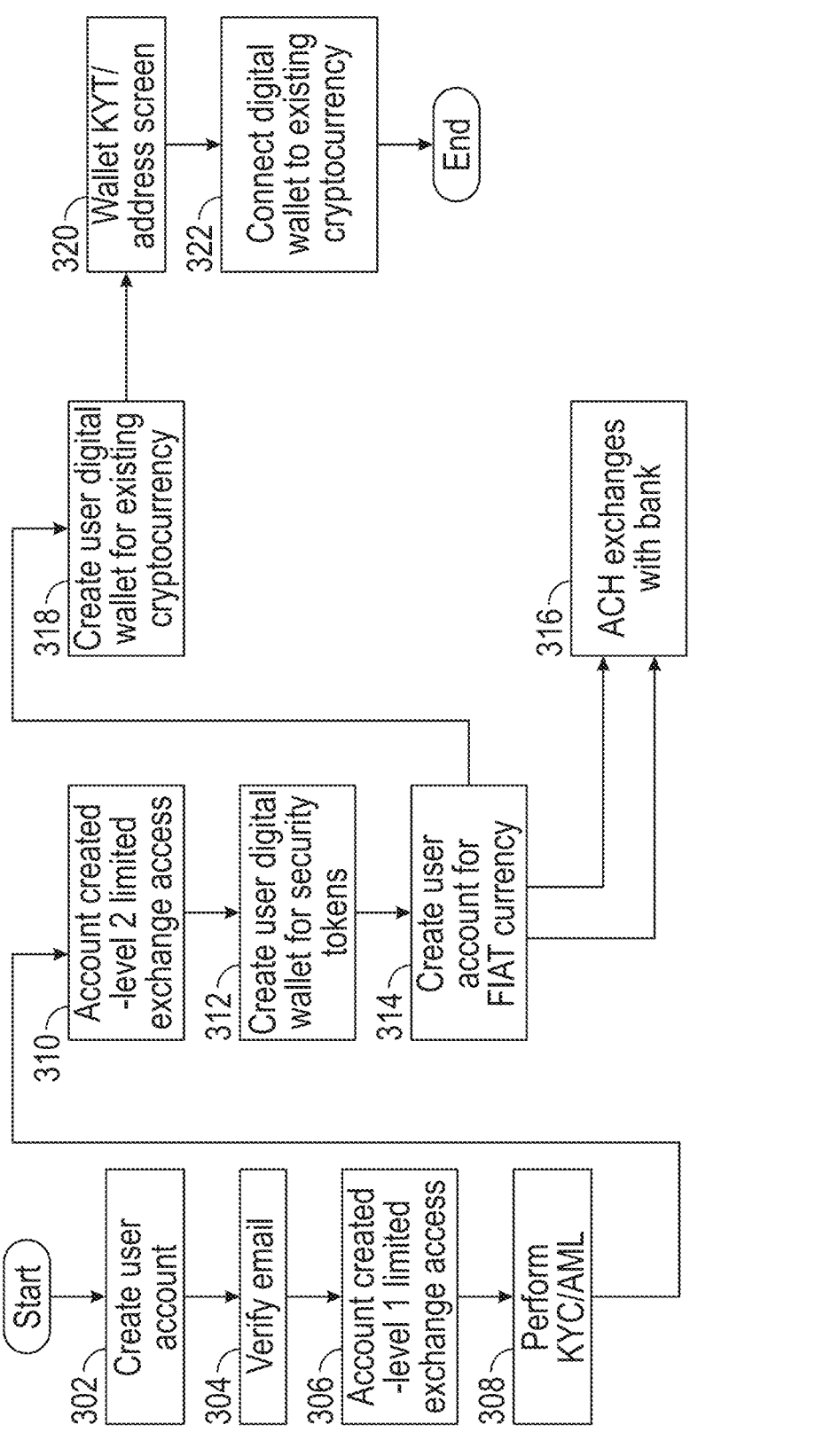
FIG. 3 illustrates an example process for user onboarding and account creation.

FIG. 3 illustrates an exemplary process 300 for user (e.g., owner 112, seller 114, or buyer 116) onboarding and account creation, according to some aspects of the disclosed technology. Process 300 can be implemented using the components of system 100. For a new user, e.g., the owner 112, seller 114, or buyer 116, system 100 may first perform a light account creation with the user's name, email address, and password (operation 302). System 100 may then verify the user's email address (operation 304), for example, by emailing a verification link to the user's email address, which the user may click or follow to verify the user's email address with the platform.

After successful email verification, the platform of the system 100 may perform a level 1 account creation for the user (operation 306). The level 1 account may provide limited access to the exchange, for example, authorizing the user to browse tokenized assets, but not to acquire or exchange the tokens created to represent the tokenized assets.

A user may gain level 2 access by successfully completing the KYB/KYC/AML process (operation 308). System 100 may create a level 2 access account for the user to provide the user with full exchange access (operation 310), which may include all access of the level 1 access plus full access to the exchange, for example, authorizing the user to acquire and/or exchange tokens created to represent tokenized assets. Upon successful completion of the KYB/KYC/AML process, system 100 may also allocate computing resources (e.g., system memory resources, storage resources, network resources etc.) for the creation of digital wallets. Using the allocated computing resources, system 100 can create multiple digital wallets or financial holdings accounts for the user.

For example, system 100 can create a digital security wallet to hold digital assets (operation 312), a fiat account to hold fiat currency (operation 314), and a digital currency wallet to hold cryptocurrency tokens (operation 318). The user's digital wallet can be used to receive, transmit, hold, etc. tokens (e.g., asset tokens representing fractional interests in an asset) generated by system 100 and from/to other user digital wallets at system 100. The user's digital currency wallet may receive and/or transmit cryptocurrency tokens from/to digital currency wallets and/or accounts off system 100. The user's fiat account can be used to receive and/or transmit fiat from/to digital fiat accounts/currency wallets and/or accounts off of system 100. The user may fund the user's fiat account, for example, via an ACH transfer or ACH exchange with a bank or other financial institution (operation 316). The user may also transfer fiat currency from the user's fiat account on system 100 to a bank or other financial institution external to the system 100 via an ACH transfer (operation 316).

With reference to operation 318, the level 2 account may facilitate the user (e.g., buyer 116) to acquire and exchange tokens on system 100. When the user (e.g., buyer 116) acquires an asset token from seller 114, funds may be transferred out of the user's (e.g., buyer's) fiat account (e.g., currency custody module 156) and/or digital wallet custody module 158 to the seller's fiat account (e.g., currency custody module 150) and/or digital wallet custody module 157, respectively. In turn, the asset token may be moved from the owner's or seller's digital wallet (e.g., platform digital wallet custody module 144 and platform digital wallet custody module 152, respectively) to the user's digital token wallet (e.g., platform digital wallet custody module 162).

When the user (e.g., seller 114) transfers an asset token to buyer 116, funds may be transferred into the user's fiat account (e.g., seller 114's currency custody module 150) from the buyer's fiat account (e.g., currency custody module 156), and the asset token may be moved out of the user's token wallet (e.g., seller 114's platform digital wallet custody module 152) and into the buyer's token wallet (e.g., platform digital wallet custody module 162).

In some aspects, the user's account(s) on the system 100 may earn dividends, and the earned dividends may be moved into the user's fiat account when in the form of fiat currency or into the user's digital currency wallet when in the form of a cryptocurrency. Note that on system 100, asset tokens may be purchased by and/or sold for any or a variety different forms of fiat currency and/or cryptocurrency, or combinations thereof. Likewise, in such aspects, the dividends may be earned and paid to a user's account in a variety different forms of fiat currency and/or cryptocurrency, or combinations thereof.

Some users may purchase asset tokens using cryptocurrency, as described in detail below. Such a user may first successfully complete a wallet know-your-transaction (KYT) process, such as a security process, and address screen (operation 320) to ensure the authenticity and security of the user's existing cryptocurrency. System 100 may then connect the digital currency wallet to an external cryptocurrency digital wallet for the user (operation 322) based on determining that the authenticity and security are proper. The user may then transfer cryptocurrency from an off-platform digital wallet to the user's on-platform crypto-currency digital wallet. In certain aspects, the security process is continually monitoring the digital currency wallet to determine proper authenticity and security.

When the user acquires an asset token on system 100 using cryptocurrency, cryptocurrency may be transferred from the user's crypto wallet to the platform crypto wallet and the asset token may be moved to the user's token wallet. When the user transfers an asset token on system 100 using cryptocurrency, cryptocurrency may be transferred into the user's crypto wallet from the platform crypto wallet and the asset token may be moved out of the user token wallet. In either case, the platform may settle the transaction with the counterparty, either in cryptocurrency or fiat currency.

Figure 4:
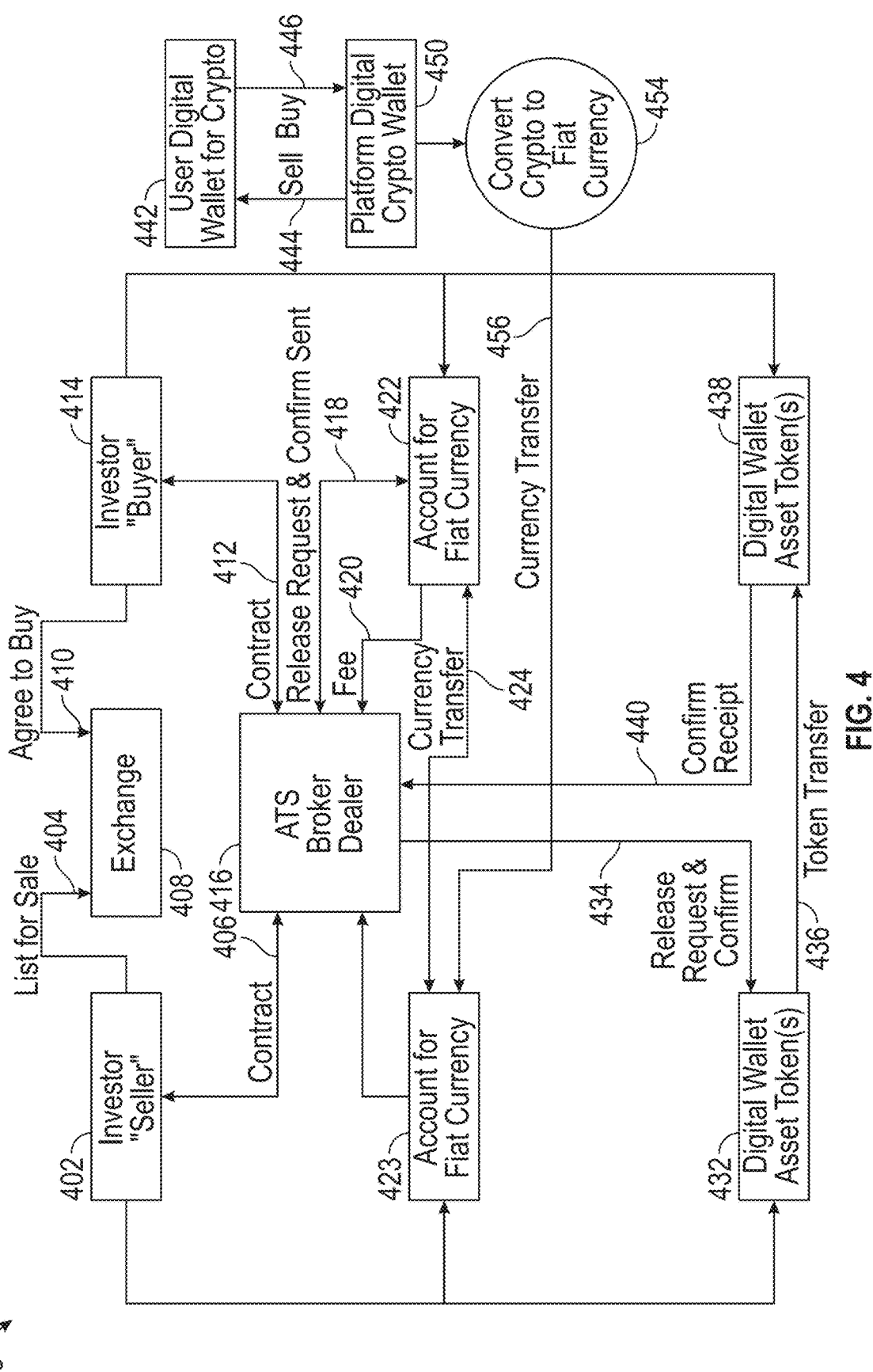
FIG. 4 illustrates an example process for acquiring and transferring asset tokens.

FIG. 4 illustrates an exemplary process 400 for acquiring and transferring asset tokens, according to some embodiments of the disclosed technology. Process 400 can be implemented using the components of system 100. A first investor (illustrated at block 402), referred to herein as the "seller," such as seller 114, holds an asset token in the seller's asset wallet (e.g., platform digital wallet custody module 152), as depicted at block 432. Seller 114 requests (404) the asset token be listed for sale on an exchange, as illustrated at block 408. In response, the system 100 informs a broker/dealer (at block 416), such as the transaction ATS broker/dealer module 130, which generates a corresponding seller smart contract, and sends that seller smart contract to the seller for acceptance (shown at 406).

A second investor (depicted at block 414), referred to herein as the "buyer," such as buyer 116, agrees (at 410) to acquire the asset token. In response, the platform informs the broker/dealer (at block 416), which generates a correspond-ing buyer smart contract, and sends (at 412) that buyer smart contract to the buyer (depicted at block 414) for acceptance.

The broker/dealer (at block 416) may perform a verifica-tion of funds available in the buyer's accounts, for example, to ensure that the buyer has a sufficient balance to settle the transaction. If not, system 100 may send the buyer a request to add additional currency (e.g., fiat currency, cryptocur-rency, tokens, and/or other digital representations of value offered to complete the transaction) to their account(s) being used to fund the acquisition. System 100 may send a release request (at 418) to the buyer's fiat account (block 422), such as the currency custody module 156, to transfer the required amount of fiat currency from the buyer's fiat account (block 422) to the seller's fiat account (block 423), such as the currency custody module 150 via currency transfers (424).

The purchase price amount may be transferred from the buyer's fiat account to the seller's fiat account, minus a service fee (at 420) associated with the acquisition. For example, if there was a purchase of $1000 and a fee of $50, there would be a transfer of $950 from the buyer's fiat account to the seller's fiat account, and a transfer of $50 from the buyer's fiat account to the broker dealer (at block 416). A service fee may be transferred from the buyer's fiat account to the broker/dealer. On receipt of the required amount into the seller's fiat account (at block 423), the platform may inform the broker/dealer.

Various safety actions can ensure an asset token is trans-ferred to an acquiring buyer (and not another user) during the transaction process, an asset token is appropriately delisted as for sale at system 100, and an asset token is free of tampering or interface during the transaction process. For example, at approximately the same time as (or concurrently with) the release request (at 418) sent system 100 to the buyer's fiat account (at block 422), a second release request (at 434) may be sent to the seller's asset token wallet (at block 432) to hold the asset token for the buyer. This combination of release requests may protect the buyer's currency by ensuring the buyer receives the asset token in exchange for the currency transferred to the seller of the asset token, by preventing the seller from interrupting the transfer of the asset token once the seller has accepted the terms to transfer the asset token.

On receipt of the agreed-upon payment, such as, amount of currency (e.g., fiat currency, cryptocurrency, etc.) into the seller's corresponding account, system 100 may transmit a confirmation of receipt to the seller's asset token wallet. In response to receiving the confirmation of receipt of the currency, the seller's asset token wallet (at block 432) may transfer (at 436) the asset token to the buyer's asset token wallet (at block 438), such as platform digital wallet custody module 162. Upon receipt of the asset token, the buyer's asset token wallet (at block 438) may transmit (at 440) confirmation of receipt of the asset token to the broker/ dealer (at block 416), thereby completing the transaction. System 100 may update the capitalization table in the primary ledger, such as primary ledger 102 (shown in FIG. 1), to reflect the transaction, and then (possibly automati-cally) semi-redundantly synchronize the update to the sec-ondary ledger, such as secondary ledger 104 (shown in FIG. 1), accordingly.

Although the acquire/transfer process has been described herein largely in terms of the exchange of fiat currency, either or both of the buyer and seller may use other digital representations of value (e.g., cryptocurrency or other digital tokens) instead of, or in addition to, fiat currency. System 100 may perform any conversions (at 454) between fiat currency, cryptocurrency, and/or other digital tokens as appropriate to facilitate and complete the transactions (444, 446) on system 100.

Figure 5:
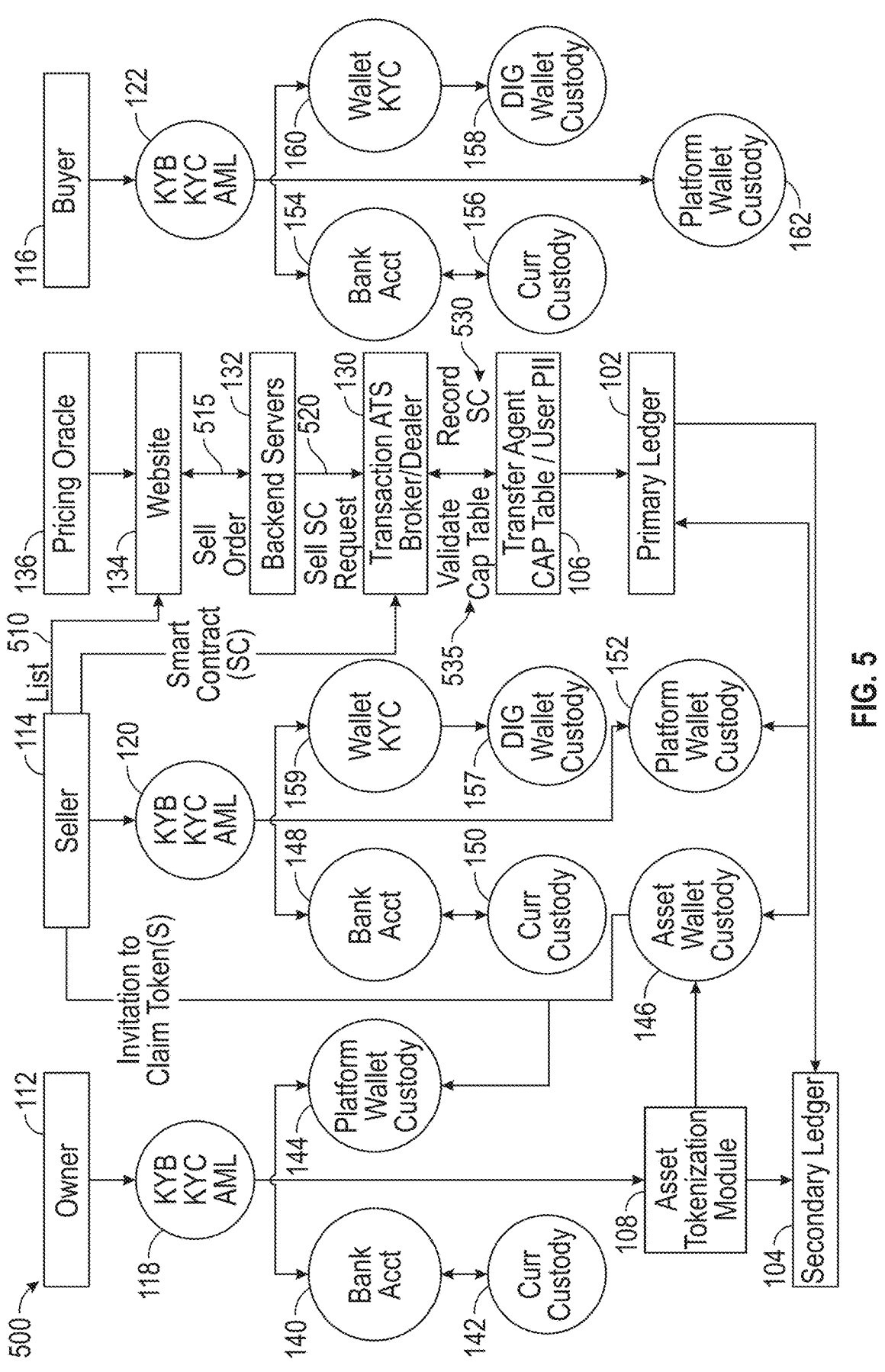
FIG. 5 illustrates an example seller login and transaction flow

FIG. 5 illustrates an exemplary seller login and transac-tion flow 500, according to some embodiments of the disclosed technology. Process 500 can be implemented using the components of system 100. Seller 114 may register with and log into system 100 and be authenticated as an authorized user of system 100 according to KYB KYC AML 120 protocols and methodologies. Seller 114 may link bank account 148 and currency custody module 150 to system 100. Currency custody module 150 may serve as a custodian for seller 114's fiat currency on system 100. Platform digital wallet custody module 152 may serve as a custodian for seller 114's digital assets on system 100.

Seller 114 may receive, from asset wallet custody module 146, an invitation 505 to claim digital assets generated by the asset tokenization module 108 to represent investors' shares (fractionalized interest) in an asset tokenized by asset tokenization module 108. An example of such an asset may include real property, e.g., commercial real estate. When seller 114 claims the digital assets (tokens) generated by asset tokenization module 108, asset wallet custody module 146 may transmit the digital assets (tokens) to seller 114's platform digital wallet custody module 152. For example, seller 114 can claim digital assets (tokens) in order to subsequently trade the digital assets at system 100. Concur-rently, also when seller 114 claims the digital assets (tokens) generated by asset tokenization module 108, system 100 can transmit transfer information regarding the transfer (from 146 to 152) to the transfer agent 106. Transfer agent 106 can record the transfer information in primary ledger 102. The transfer information can be (e.g., automatically) semi-redundantly synchronized (e.g., with PII removed) to secondary ledger 104.

Seller 114 may then list 510 the asset and/or asset tokens on system 100 as being available for sale, purchase, exchange, investing in, transferring, or any other appropriate listing action. Seller 114 may list 510 the asset and/or asset tokens via the website 134. For example, website 134 can send user-interface data including listing 510 to a web browser at a computing device. The web browser can present a user-interface including listing 510 at display device of the computing system. Listing 510 can include a list of multiple assets and/or asset tokens that are available on system 100. The web browser can present a user-interface including listing 510 of the multiple assets and/or asset tokens at the display device.

In one aspect, the user-interface including listing 510 is presented at a web browser of a computing device of buyer 116. Using an input device at the computing device, buyer 116 can select one or more of multiple assets and/or asset tokens for purchase from the web browser user-interface. Buyer 116's selection can be propagated back to website 134.

Responsive buyer 116's selection from the web-browser user interface, website 134 and/or backend servers 132 can generate a sell order. The sell order may be an order to request creation of a smart contract (SC) 525 to facilitate a sale, purchase, exchange, investment in, transferring of, or similar type of disposition of the selected asset(s) and/or asset token(s). In response to receiving the sell order 515, backend servers 132 may generate and transmit a sell SC request 520 to transaction ATS broker/dealer module 130 to request the creation of SC 525 between transaction ATS broker/dealer module 130 and seller 114.

Transaction ATS broker/dealer module 130 may establish SC 525 with seller 114 for the contemplated transaction involving the selected asset(s) and/or asset token(s) transferred to platform digital wallet custody module 152. Transaction ATS broker/dealer module 130 may record the smart contract (operation 530) and update and/or validate the capitalization (cap) table (operation 535) via transfer agent 106. Recording the smart contract and updating and/or validating the capitalization (cap) table can be based on the SC 525 and/or the asset tokens transferred to platform digital wallet custody module 152 by asset wallet custody module 146.

Transfer agent 106 may include and/or utilize user PII of seller 114 and/or owner 112 in the update and/or validation of the cap table. Transfer agent 106 may maintain an up-to-date copy of the cap table and related user PII. Transfer agent 106 may update the cap table and/or related user PII based on input provided via website 134 and routed to transfer agent 106 via backend servers 132 and/or transaction ATS broker/dealer module 130. Transfer agent 106 records the smart contract 525 as well as entries pertaining to the contemplated and performed transactions involving the asset and/or asset tokens in primary ledger 102 and (e.g., semi-redundantly synchronized) in secondary ledger 104.

Figure 6:
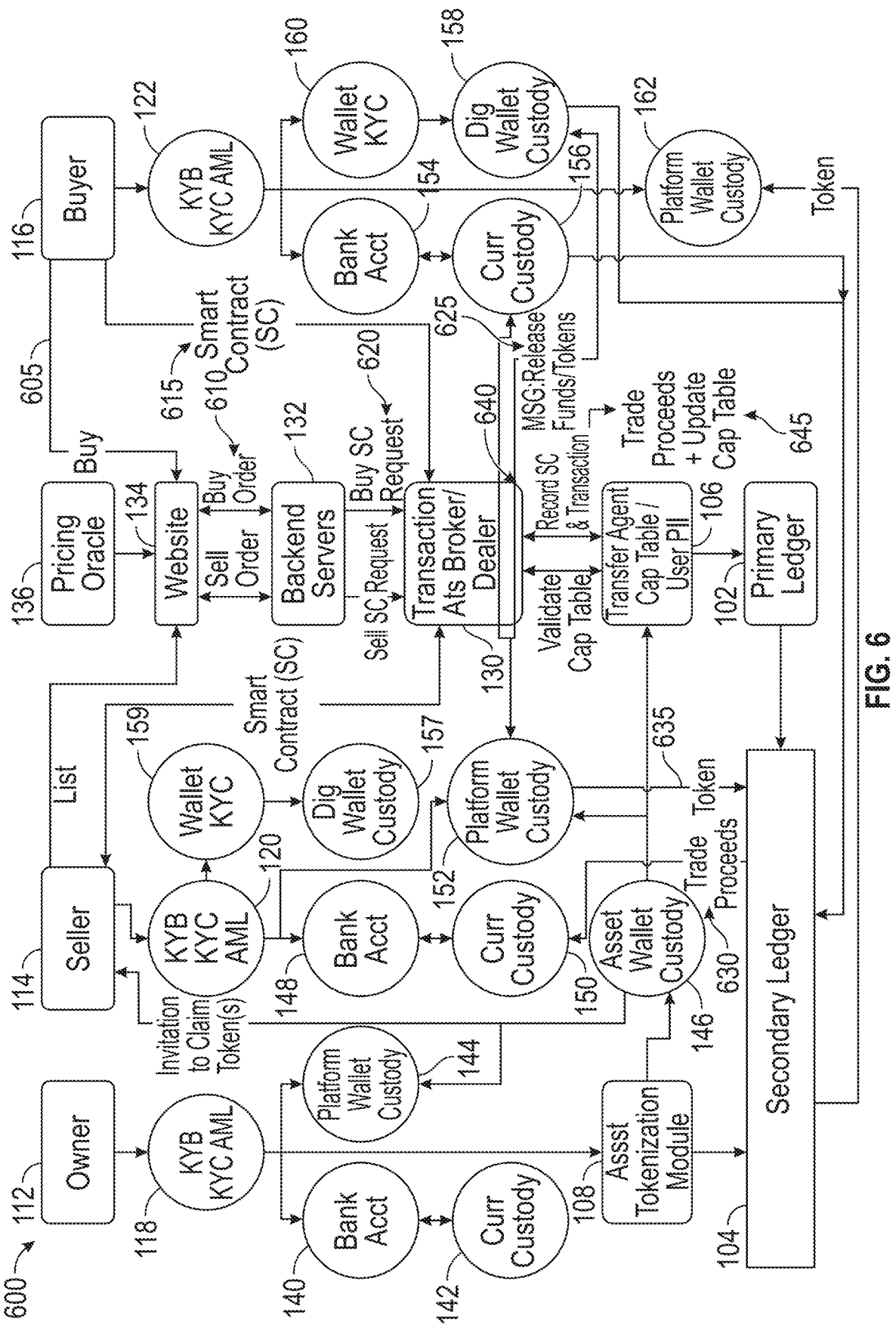
FIG. 6 illustrates an example buyer login and transaction flow.

FIG. 6 illustrates an exemplary buyer login and transaction flow 600, according to some embodiments of the disclosed technology. Process 600 can be implemented using the components of system 100. Buyer 116 may register with and log into system 100 and be authenticated as an authorized user of the system 100 according to KYB KYC AML 122 protocols and methodologies. Buyer 116 may link bank account 154 and currency custody module 156 to system 100. Currency custody module 156 may serve as a custodian for buyer 116's fiat currency on system 100.

Digital wallet custody module 158 may serve as a custodian for buyer 116's digital assets on system 100. These digital assets may include cryptocurrency, e.g., USDC tokens and/or other appropriate digital assets. Digital wallet custody module 158 may authenticate with system 100 according to wallet KYC 160 protocols and methodologies. Digital wallet custody module 158 may also include functionality and/or an interface to convert or exchange the digital currency held thereby into fiat currency for the benefit of buyer 116. Conversions or exchanges of the cryptocurrency held by digital wallet custody module 158 to fiat currency may be documented by a transaction entry in primary ledger 102 and (e.g., semi-redundantly synchronized) in secondary ledger 104.

Platform digital wallet custody module 162 may serve as a custodian for buyer 116's asset tokens acquired on system 100 by buyer 116.

As described, the user-interface including listing 510 is presented at a web browser of a computing device of buyer 116. Using an input device at the computing device, buyer 116 can select one or more of multiple assets and/or asset tokens for purchase from the web browser user-interface. Buyer 116's selection can be propagated back to website 134.

Thus, buyer 116 may view the listed asset and/or asset tokens on system 100 as being available for sale, purchase, exchange, investing in, transferring, or the like via website 134. Responsive to viewing the listing of the asset(s) and/or asset token(s) via website 134, buyer 116 may make an offer to buy 605 the listed asset(s) and/or asset token(s) via website 134. Responsive to buyer 116's offer to buy 605 the listed asset(s) and/or asset token(s), a buy order 610 may be generated by website 134 and/or backend servers 132 (which may host or control at least some aspects of the website 134).

Buy order 610 may be an order to request creation of a create smart contract (SC) 615 to facilitate a sale, purchase, exchange, investment in, transferring of, or similar type of disposition of the asset(s) and/or asset token(s). In response to receiving buy order 610, backend servers 132 may generate and transmit buy SC request 620 the transaction ATS broker/dealer module 130. Buy SC request 620 requests the creation of the SC 615 between transaction ATS broker/dealer module 130 and buyer 116. Transaction ATS broker/dealer module 130 may establish SC 615 with buyer 116 for the contemplated transaction involving the asset(s) and/or asset token(s) transferred to the platform digital wallet custody module 152.

Transaction ATS broker/dealer module 130 may perform on the SC 615 by: (1) transmitting electronic message(s) instructing digital wallet custody module 158 and currency custody module 156 to release buyer 116's funds and/or tokens to be exchanged for seller 114's asset tokens and (2) transmitting electronic message(s) instructing platform digital wallet custody module 152 to release seller 114's asset tokens to be exchanged for buyer 116's funds and/or tokens (operation 625).

Responsive to receiving the message from transaction ATS broker/dealer module 130, seller 114's platform digital wallet custody module 152 may transmit the asset token(s) to buyer 116's platform digital wallet custody module 162 and/or currency custody module 156 may transmit trade proceeds 630 being exchanged for the asset token(s) to seller 114's currency custody module 150 per the terms of the smart contract 615. Trade proceeds 630 may include cryptocurrency, cryptocurrency converted to fiat currency, and/or fiat currency. In some aspects, digital wallet custody module 158 may include or interface with a module configured to convert cryptocurrency (e.g., USDC), which may be held by digital wallet custody module 158, into fiat currency acceptable by the seller 114's currency custody module 150.

Digital wallet custody module 158 can, alternatively or additionally, transmit trade proceeds 630 being exchanged for the asset token(s) that are held in crypto to seller 114's digital wallet custody module 157. A blockchain may create and store a blockchain entry corresponding to the transfer of trade proceeds 630 from buyer 116's currency custody module 156 and/or digital wallet custody module 158 to seller 114's currency custody module 150 and/or digital wallet custody module 157, respectively.

In some aspects, seller 114 may also have, included within or coupled with system 100, digital wallet custody module 157 to receive and hold digital assets such as cryptocurrency in addition to or in place of fiat currency in exchange for asset tokens. In such aspects, buyer 116's digital wallet custody module 158 may not convert cryptocurrency funds into fiat currency when transmitting trade proceeds 630 to seller 114's digital wallet custody module 157.

In other aspects, seller 114's digital wallet custody module 157 can similarly include or interface with a module configured to convert cryptocurrency (e.g., USDC), which may be held by digital wallet custody module 157, into fiat currency acceptable by buyer 116's currency custody module 156. Responsive to receiving the message from transaction ATS broker/dealer module 130, seller 114's platform digital wallet custody module 152 may transmit asset token(s) 635 to buyer 116's platform digital wallet custody module 162 per the terms of the smart contract 615. The blockchain may create and store a blockchain entry corresponding to the transfer of the asset token(s) 635.

Transaction ATS broker/dealer module 130 may record the smart contract and transaction (operation 640) and update and/or validate the capitalization (cap) table (operation 645) via the transfer agent 106, for example, based on the SC 615, trade proceeds transferred to seller 114's currency custody module 150 and/or digital wallet custody module (not shown), and/or the asset tokens 635 transferred to buyer 116's platform digital wallet custody module 162 by seller 114's platform digital wallet custody module 152. Transfer agent 106 may include and/or utilize user PII of buyer 116, seller 114, and/or owner 112 in the update and/or validation of the cap table. Transfer agent 106 may maintain an up-to-date copy of the cap table and related user PII. Transfer agent 106 may update the cap table and/or related user PII based on input provided via the website 134 and routed to transfer agent 106 via backend servers 132 and/or transaction ATS broker/dealer module 130. Transfer agent 106 may also record entries pertaining to the contemplated and performed transactions involving the asset(s) and/or asset tokens in the primary ledger 102 and (semi-redundantly synchronized) in secondary ledger 104.

Figure 7:
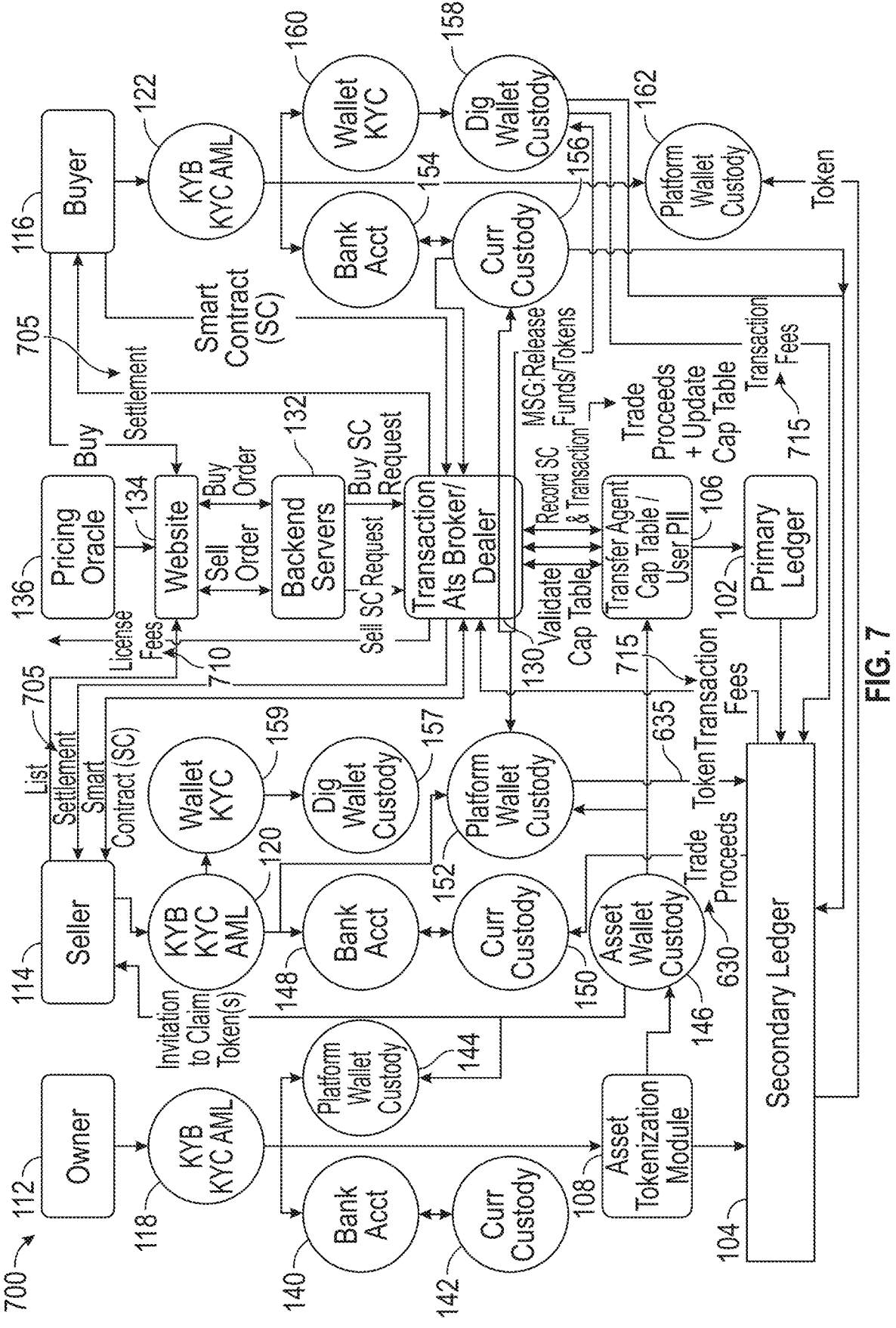
FIG. 7 illustrates an example fee flow.

FIG. 7 illustrates an exemplary fee flow 700, according to some embodiments of the disclosed technology. Process 700 can be implemented using the components of system 100. As the trade proceeds are being transferred on system 100 as described with respect to FIGS. 5-6, transaction ATS broker/dealer module 130 transmits requests to buyer 116's currency custody module 156 and/or digital wallet custody module 158 and to seller 114's currency custody module 150 and/or digital wallet custody module 157 to collect transaction fees 715 for distribution. Transactions fees 715 can include, but are not limited to, licensing fees 710 distributed to transaction ATS broker/dealer module 130, partnership fees distributed to transfer agent 106, and other appropriate fees.

Transaction ATS broker/dealer module 130 may receive transaction fees 715 associated with the transaction completed (settled) on system 100 from the buyer 116's currency custody module 156 and/or digital wallet custody module 158 and seller 114's currency custody module 150 and/or digital wallet custody module 157. Transaction fees 715 may be payable and funded via fiat currency and/or cryptocurrency, for example, as described above. In some examples, transaction fees 715 may be payable and funded by other digital assets, for example, NFTs.

Moreover, transaction ATS broker/dealer module 130 transmits settlement statements 705 to seller 114 and/or buyer 116. The transfer of transaction fees 715 may be recorded on the primary ledger 102 and (semi-redundantly synchronized) on the secondary ledger 104. As depicted in FIG. 7, transaction fees 715 are payable by and transferred to the transaction ATS broker/dealer 130. However, this is merely an example, and in other examples, transaction fees 715 may be payable by and transferred to transaction ATS broker/dealer module 130 by any combination of owner 112, seller 114, buyer 116, and/or third parties outside system 100, and/or their associated currency custody modules, digital custody modules, platform wallet custody modules, asset wallet custody modules, and/or the like.

Transaction ATS broker/dealer module 130 may distribute license fees 710 associated with the transaction completed (settled) on system 100 to those owed the license fees 710, such as, transaction ATS broker/dealer module 130. Examples of license fees may include royalties, service fees, intellectual property license fees, and software license fees for software, systems, and methods used by system 100 to complete (settle) the transactions. License fees 710 may be funded from the transaction fees 715 received by transaction ATS broker/dealer module 130.

The described systems, methods, and technologies provide numerous advantages over conventional systems. For example, system 100 may provide owners and sellers with the ability to exit a commercial real estate investment (as an asset) much earlier than the typical hold period for such asset types. In many commercial real estate investments, investors may hold the asset for five to seven (5 to 7) years for various reasons associated with processes and procedures for transferring ownership of the asset as a whole. At the end of the hold period (which may be mandated by statute, regulation, or other law, for example, SEC Rule 144), the owner of an investment property (e.g., commercial real estate) may either transfer the property or refinance the property. Refinancing the property may provide a liquidity event to the investor.

A technological system and method for fractionalizing and tokenizing such assets as described herein may provide owners of assets that would otherwise be subject to extended hold periods the ability to participate in liquidity opportunities and/or offer liquidity opportunities to their investors on a shorter timeline than with conventional legal processes, which may by and large be manually executed with extended delays. The technologies disclosed herein facilitate sellers in trading asset tokens and monetizing their investments in underlying assets, thereby unlocking an ability to re-invest capital and supporting the cycle of investment. For example, liquidity provided by the disclosed technology of system 100, even after just one year, may help create at least five to seven (5-7) times the liquidity in the entire ecosphere compared to traditional approaches. As an example, compared to traditional approaches in which a share of a real estate investment property is held for five (5) years, the technology disclosed herein may facilitate the asset tokens being traded five (5), ten (10), one hundred (100), or more times, for example, within the same five years.

Figure 8:
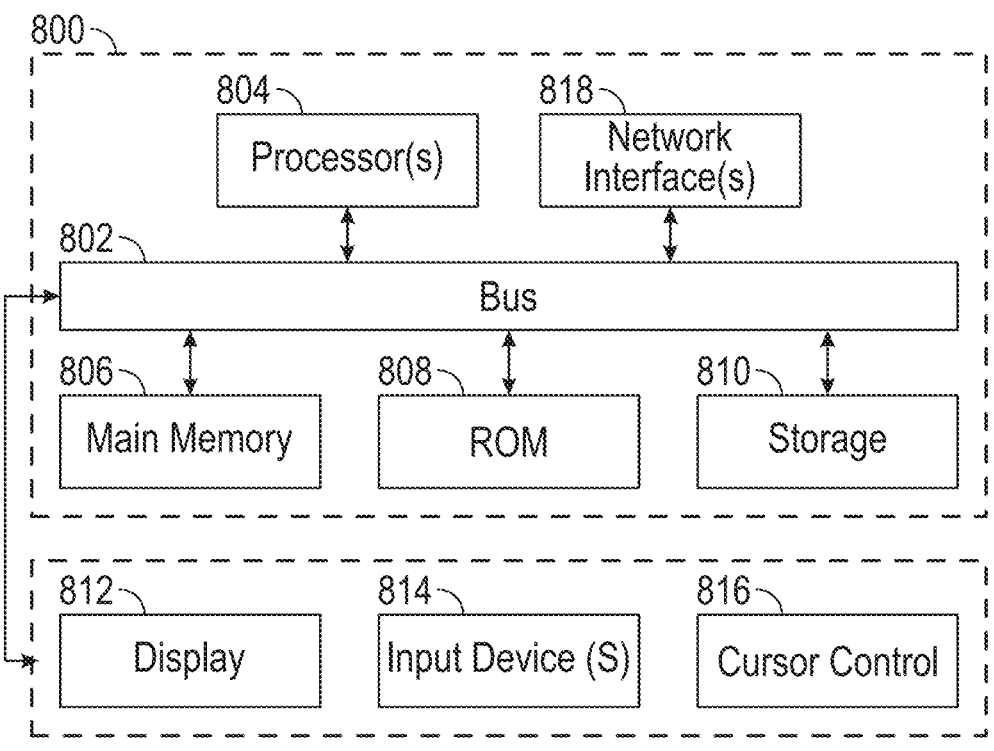
FIG. 8 illustrates a block diagram of an example computer system.

FIG. 8 depicts a block diagram of an example computer system 800 in which embodiments described herein may be implemented. System 100, computer architecture 900, system and data flow 1400, system and data flow 1500, computer architecture 1600, etc. can be implemented using components of and computing resources depicted in computer system 800. Computer system 800 may include bus 802 or other electronic communication mechanism for communicating information, and one or more hardware processors 804 coupled with bus 802 for processing information. Hardware processor(s) 804 may include, for example, one or more general purpose microprocessors and/or application specific integrated circuits (ASICs) configured to perform the processes and methods described herein and related processes and methods.

Computer system 800 also may include main (system) memory 806, for example, a random-access memory (RAM), cache, and/or other dynamic storage devices, coupled to bus 802 for storing information and instructions to be executed by processor(s) 804. Main memory 806 can also be used for storing temporary variables or other intermediate information during execution of instructions by processor(s) 804. Such instructions, when stored in storage media accessible to processor(s) 804, may render computer system 800 into a special-purpose machine that is customized to perform the operations specified in the instructions.

Computer system 800 may further include a read only memory (ROM) 808 and/or other static storage device coupled to bus 802 for storing static information and instructions for processor(s) 804. Storage device 810, for example, a magnetic disk, optical disk, and/or USB thumb drive (Flash drive), etc., may be provided and coupled to bus 802 for storing information and instructions.

Computer system 800 may be coupled via bus 802 to display 812, for example, a liquid crystal display (LCD), light emitting diode (LED) display, touch screen, and/or other electronic display for displaying information to a computer user. One or more input device(s) 814, including alphanumeric and/or other keys, may be coupled to bus 802 for communicating information and command selections to processor(s) 804. Another type of user input device may include cursor control 816, for example, a mouse, a trackball, a touchpad, and/or a set of cursor direction keys for communicating direction information and command selections to processor(s) 804 and for controlling cursor movement on display 812. In some examples, direction information and command selections (e.g., selecting assets and/or tokens from a listing) may be provided by cursor control may also or alternatively be implemented via receiving touches on a touch screen without the use of a separate cursor control device.

Computing system 800 may include a user interface module to implement a graphical user interface (GUI) that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the words "component," "engine," "system," "database," "data store," and the like, as used herein, may refer to logic embodied in hardware or firmware, or to a collection of software instructions, possibly having entry and exit points, written in a programming language, such as, for example, Java, C, or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, and/or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 800 may implement the techniques described herein using customized hard-wired logic, one or more ASICs or FPGAs, firmware and/or program logic which in combination with computer system 800 causes or programs computer system 800 to be a special-purpose machine. According to one embodiment, the techniques herein are performed by computer system 800 in response to processor(s) 804 executing one or more sequences of one or more instructions contained in main (system) memory 806. Such instructions may be read into main (system) memory 806 from another storage medium, such as storage device 810. Execution of the sequences of instructions contained in main (system) memory 806 may cause the processor(s) 804 to perform the methods and/or operations described herein. In alternative embodiments, hard-wired circuitry may be used in place of or in combination with software instructions.

The term "non-transitory media," and similar terms, as used herein refers to any non-transitory media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main (system) memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media may also take the form of acoustic or light waves, such as those generated during radio-wave and infra-red data communications.

Computer system 800 may also include one or more communication network interface(s) 818 coupled to bus 802. Network interface(s) 818 may provide two-way data communication coupling to one or more network links that are connected to one or more local networks. For example, network interface(s) 818 may include an integrated services digital network (ISDN) card, cable modem, satellite modem, or a modem to provide a data communication connection to a corresponding type of telephone line. As another example, network interface(s) 818 may include a local area network (LAN) card to provide a data communication connection to a compatible LAN (and/or a wide area network (WAN) component to communicate with a WAN). Wireless links may also be implemented. In any such implementation, network interface(s) 818 send and receive electrical, electromagnetic, and/or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP in turn may provide data communication services through the worldwide packet data communication network now commonly referred to as the "Internet." Local network and Internet both use electrical, electromagnetic, electronic, and/or optical signals that carry digital data streams. The signals through the various networks and the signals on network link and through network interface(s) 818, which may carry the digital data to and from computer system 800, are example forms of transmission media.

Computer system 800 may send and receive electronic messages and data, including program code, through the network(s), network link and network interface(s) 818. In the Internet example, a server might transmit a requested code for an application program through the Internet, the ISP, the local network, and network interface(s) 818.

The received code may be executed by the processor(s) 804 as it is received, and/or stored in the storage 810, or other non-volatile storage for later execution.

Data Retrieval and Validation and Work Product Generation

Figure 9A:
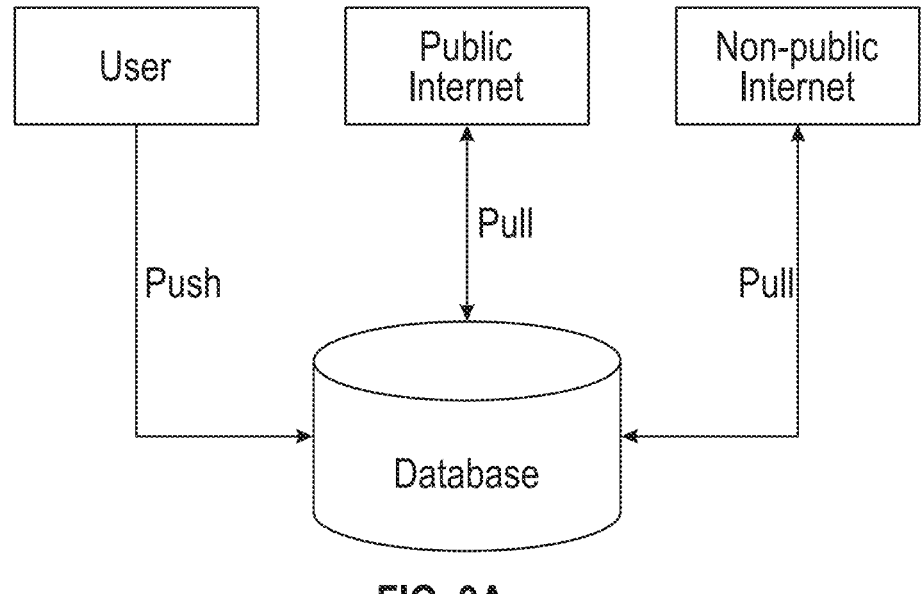
FIGS. 9A, 9B, and 9C illustrate various example data retrieval and validation phases.
Figures 9B, 9C:
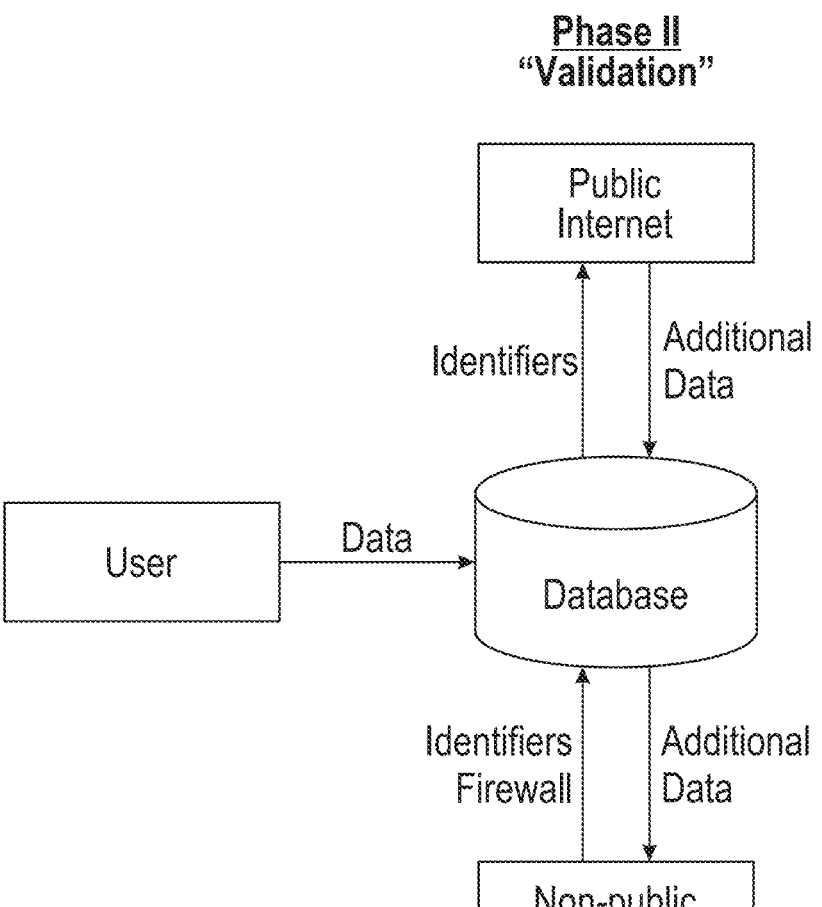

FIGS. 9A, 9B, and 9C illustrate various example data retrieval and validation phases. The various example data retrieval and validation phases can be performed by the transaction platform of the systems of FIGS. 1 and 5-7. The various example data retrieval and validation phases can be utilized for asset onboarding as well as deriving asset characteristics. Derived asset characteristics for an asset can include one or more: an asset capitalization rate (Cap Rate), an asset valuation (e.g., a Broker Opinion of Value (BOV)), an asset capitalization table (Cap Table) entry, an asset capitalization table (Cap Table), etc. Systems and methods for data retrieval and validation (e.g., mechanism, module, or application) disclosed herein may be broadly used for automated data capture and validation.

Figure 10:
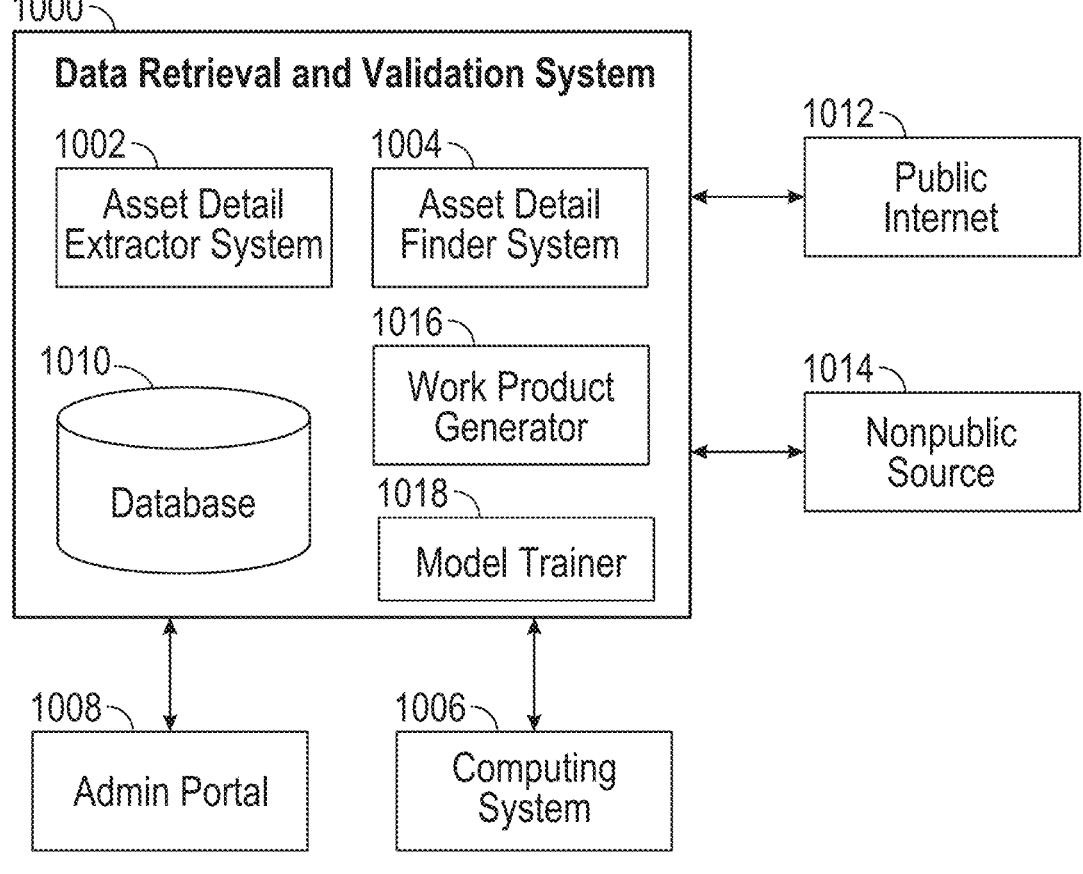
FIG. 10 illustrates an example data retrieval and validation system.

FIG. 10 illustrates an example data retrieval and validation system 1000. An asset owner ("owner", the owner 112) may use functions of data retrieval and validation system 1000 for (1) onboarding their asset onto a financial Exchange to be listed and traded and/or (2) deriving characteristics of their asset. One non-limiting example of an asset would be a commercial real estate property ("Property"). In this example, the Property Owner is can submit various raw inputs, such as, for example, documents and information, purported to correspond to their asset. Data retrieval and validation system 1000 is configured to take these raw inputs and validate that the raw inputs correspond to the asset. Data retrieval and validation system 1000 can alert an Exchange admin the raw inputs correspond to the asset. Subsequently, the asset can be listed on an exchange and/or characteristics of the asset can be derived.

Data retrieval and validation system 1000 can be utilized in many analogous use cases. For example, data retrieval and validation system 1000 can be used in any instance where a business desires a user to validate and qualify their asset via the submission of documentation and/or data that is publicly and/or non-publicly available.

As described, data validation can be part of an asset onboarding process or part of asset characteristics derivation process. In one aspect, a report can be generated that aggregates the validated data in a bespoke format for the user). The validation also may be a completed action, of many, in formulating any (e.g., final) output (at least partially) reliant on authentic and validated underlying data. For example, authentic and validated underlying data can be used in determining characteristics of an asset, such as, for example, a capitalization rate, a valuation, a capitalization table entry, a capitalization table, etc.

Overall, data retrieval and validation system 1000 can significantly reduce, if not eliminate, repetitive human tasks and/or the frequency of human manual errors in any document validation process. Time frames for asset onboarding and asset characteristics derivation—from the start (information gathering) to finish (successful, accurate submission and approval)—is significantly shortened. The cost of data onboarding and validation is also reduced (in dollar cost for workers, and in the opportunity cost of workers spending time on lower-value manual tasks).

The systems and methods for data retrieval and validation may also be used for applications for law firms, investment banks, and private equity firms. For example, the data retrieval and validation system 1000 may be used for a due diligence process during mergers and acquisitions (M&A) deal work (for example, validating whether or not the top 100 client contracts have a change of control clause). Data retrieval and validation system 1000 may also be used in the insurance industry, for example when potential policy buyers need to provide background information that must be validated, and for example, when a person must provide purchase documentation for expensive items to back up personal property riders.

There are at least three personas in the ecosystem: (1) any user who is being asked to provide some data or information; (2) the public internet (which can be validated); and (3) non-public sources (would be software with a login). In the disclosed embodiments, data retrieval and validation system 1000 includes "module" or "modules," e.g., a system that uses Artifical Intelligence (AI) and/or Machine Learning (ML) models to generate an output. The "module" or "modules" may use one or multiple models, not limited to optical character recognition (OCR), natural language processing (NLP), Vision, Heuristics, and other Machine Learning and Artificial Intelligence techniques.

Referring more specifically to FIG. 10, data retrieval and validation system 1000 includes asset detail extractor system 1002, asset detail finder system 1004, database 1010, work product generator 1016, and model trainer 1018. Data retrieval and validation system 1000 can be communicatively coupled (e.g., via a computer network) with computing system 1006, admin portal 1008, public internet 1012, and nonpublic source 1014.

Generally, asset detail extractor system 1002 is configured to create and/or find unique identifiers within raw data, that can then be used by the asset detail finder system 1004 configured to validate that data. The applications, software, modules, algorithms, protocols, and any necessary platforms may be available from a computing system 1006. The computing system 1006 may be included in data retrieval and validation system 1000 or may be a separate system (e.g., the computing system 800) in communication with data retrieval and validation system 1000. Data retrieval and validation system 1000 is also in communication with the admin portal 1008, which may be included in the asset onboarding system 1000 or may be a separate system.

Data retrieval and validation system 1000 is configured to achieve data retrieval and validation for asset onboarding and/or asset characteristic derivation a plurality of phases. "Phase I" is an information collection phase (see FIG. 9A), "Phase II" is a validation phase (see FIG. 9B), and "Phase III" is an approval, reject, and cure stage (see FIG. 9C). As described, data retrieval and validation system 1000 includes asset detail extractor system 1002 and asset detail finder system 1004. Asset detail extractor system 1002 and asset detail finder system 1004 are configured to perform processes and analysis in the different phases.

In Phase I (an information collection (retrieval) phase), data can be collected into database 1010 from different sources. In one aspect of information collection, a user (e.g., the owner 112, the seller 114, or the buyer 116) pushes data into database 1010. In this one aspect, the user (e.g., the owner 112, the seller 114, or the buyer 116) can provide data in response to a list that was given to them (and outlines the information that needs to be provided). One example of this kind of data could be raw data that is inconsistently formatted between users (for example, an excel spreadsheet with financial data may not be formatted the same across different Owners). Another example of this kind of data could be scanned documents or photos of documents that register as images (for example, certificates that are mailed to an Owner in hard copy after various state registrations). A further example could be various client contracts that are slightly different from each other. After the user (e.g., the owner 112, the seller 114, or the buyer 116) pushes their raw data into data retrieval and validation system 1000, asset detail extractor system 1002 ("Asset Detail Extractor" module) can access the data and create and/or find unique identifiers within the raw data. Those identifiers can then be used to validate the data with third parties in Phase II (the validation phase).

In another aspect of information collection, data retrieval and validation system 1000 pulls data from the public internet 1012 into database 1010. In this other aspect, data is pulled from the public internet 1012 into database 1010. An example of this type of data may be Corporate Governance status. For example, whether a given entity is in good standing and what the legal chain of asset ownership is for that entity. Another example of this type of data may come from the Secretary of State or SEC (public sites that can be confirmed).

In a further aspect of information collection, data retrieval and validation system 1000 pulls data from non-public internet 1014 sources (e.g. private software systems) into the database 1010. In this further aspect, data is pulled from non-public sources into database 1010.

As part of Phase I (the information collection phase), the User (e.g. the Property Owner from the illustrative Exchange example) can provide their credentials to any relevant third party systems. Data retrieval and validation system 1000 is therefore configured to go into software with the user's permission and extract their data and information. An example of this may be when a Property Owner enables data retrieval and validation system 1000 to access their Property management system, allowing data retrieval and validation system 1000 to deploy extraction models into these systems. Another example may be when a private equity deal team provides credentials to their "dataroom" (software program that is a repository for diligence documents that are uploaded by the target acquisition) during a deal. A third example may be when an insurance company login credential to their portal where insurance buyers upload information on themselves and their insured items.

Phase II (the validation phase) is fundamentally about validating the data in database 1010, with either public or non-public sources, to confirm if the user has adequately completed data collection. In Phase II (the validation phase), the asset detail finder system 1004 is configured to validate data by using either single or multi-source validation. The data being validated was previously uploaded by the user (asset Owner) or previously collected via the different data pulls (public and non-public sources) during Phase I.

In the case of single source validation, the asset detail finder system 1004 is configured to compare results found in the public internet 1012 with the identifiers created and/or found in Phase I (the information collection phase). The asset detail finder system 1004 is configured to identify the information in database 1010 to check/validate, and then navigates public and non-public sources to confirm "yes" or "no". Asset detail finder system 1004 is configured to provide additional data relating to the desired information back to database 1010. In an illustrative example of a financial Exchange (e.g., system 100), validation may include validating that there is actually a Property with the given address (initially provided by the Property Owner) that exists on a map and comparing the property images a Property Owner supplied with those found on private sources, as well as, on public sources, such as the internet, satellite imagery, survey data and other appropriate sources.

Asset detail finder system 1004 may use various models or techniques to perform validation, including but not limited to artificial intelligence (AI), machine learning, and other suitable models. Some of the AI models/techniques may include but not limited to: (1) image fingerprinting, (2) image similarity algorithm, (3) image classification algorithm, and (4) image quality algorithm.

Image fingerprinting is a process of creating a unique identifier of every image. In an example use for the financial Exchange, this is being used to make sure users (and automation) don't upload: (1) two copies of the same image for a Property, and (2) copy of an image already being used on another Property.

Image similarity algorithm is used for calculating the difference between two images. In an example use for the financial Exchange, this is being used to make sure users (and automation) do not upload repetitive Property images that are too similar (and therefore are not adding incremental value to the platform).

In certain aspects, image classification algorithm is used for identifying context within images. In an example use for the financial Exchange, this is being used to make sure users (and automation) don't upload: (1) images unrelated to the Property (ads, irrelevant images, etc.), and (2) images that are relevant to the Property, but that don't add value to the platform (floor plans, digital renderings, pictures with people, etc.). In another example use for the financial Exchange, this is being used to help improve the platform by including image descriptors that could be used for search tags and terms, and allowing users to search beyond descriptions that are found in standard text descriptions (for example, the user can search for "a Property with palm trees"). This capability makes the site more accessible by describing what is seen in the image for devices that have visual accessibility features enabled (dictation).

Image quality algorithm is used for identifying the quality of images. In an example use for the financial Exchange, this is being used to: (1) ensure users (and automation) don't upload low quality images to the platform, (2) auto-adjust the quality of images to make them visually more appealing to users on the platform.

In the case of multi-source validation, asset detail finder system 1004 is configured to compare the data versus multiple sources to validate its veracity. Asset detail finder system 1004 is configured to use the public internet 1012 and cross-reference data from internal sources. Asset detail finder system 1004 is also configured to validate data from multiple online sources. Asset detail finder system 1004 is configured to use an internal scoring system for assigning each source a value/weight/score as to the accuracy of their data. Asset detail finder system 1004 is configured to distinguish a difference in the weighting score between a highly valued source such as a government site, e.g., the U.S. Securities and Exchange Commission (SEC), and a private site where multiple sources of validation may be appropriate for a high confidence.

In general, validation based on data from more unique sources is preferred. An example of this (relevant to a financial Exchange) may be that asset detail finder system 1004 is configured to use the SEC website to validate Regulation D issuance or other legal filings, and also confirm related parties for the issuing entity (like Board members and Investors) by cross-checking internal annual reports with public news releases. Another example (relevant to an Insurance company confirming personal property riders) would be that asset detail finder system 1004 is configured to confirm that a certain named piece of art was indeed made by a certain artist.

Data retrieval and validation system 1000 is configured to transmit the validation results to the system (e.g., system 100) at the end of Phase II (the validation phase). Based on an internal scoring system, the system may inform the user via electronic methods (e.g. email, text, in app notification) if their submitted data is appropriate (e.g., complete, compliant, etc.) or is not appropriate.

Data retrieval and validation system 1000 is configured to process/analyze appropriate data in Phase III. The asset onboarding system 1000 is configured to send a signal to the system (e.g., the system 100) causing the system to revert a message back to the user. The message may indicate that the system cannot confirm the data is validated and may prompt the user to begin the process from the beginning and incentivize attention to detail.

In Phase III (the approval, reject, and cure stage), the Data retrieval and validation system 1000 can approve or reject inputs and/or generate work product 901 (e.g., one or more derived asset characteristics). For example, data retrieval and validation system 1000 is configured to generate and transmit/present findings (e.g., analyzed information/results for approval or rejection) to an admin for approval or rejection, e.g., via an admin portal 1008. Data retrieval and validation system 1000 is configured to ensure that the admin (or any stakeholder involved in an onboarding process) has minimal tasks beyond a final approval (or rejection) based on the results generated by data retrieval and validation system 1000.

Based on validated data, work product generator 1016 can generate work product 901. Work product 901 can include approval for listing an asset on the Exchange, approval for insurance coverage, moving forward in a different administrative process, deriving one or more (or a plurality of) asset characteristics for an asset, etc. Asset characteristics derived in Phase III can include any of: an asset Cap Rate, an asset valuation (e.g., a BOV), an asset Cap Table entry, an asset Cap Table, etc. In some aspects, work product 901 can include an aggregate, complete report that combines all of the received data from multiple disparate sources. For example, work product 901 can include a combination of multiple asset characteristics derived in Phase III. In another example, work product 901 includes one or more derived asset characteristics along with other output, such as, for example, (approval for) listing an asset on the Exchange, in Phase III.

Work product generator 1016 can include modules and/or components configured to generate any of the described types of work product, including but not limited to: an asset Cap Rate, an asset valuation (e.g., a BOV), an asset Cap Table entry, an asset Cap Table, etc.

Concurrently with work product generator 1016 generating work product, model trainer 1018 can utilize validated data to train models that facilitate data retrieval, data validation, and work product generation.

Data retrieval and validation system 1000 (e.g., collectively spanning 1002, 1004, and 1016) can include, access, be integrated with and/or interoperate with various artificial intelligence (AI) and/or Machines Learning (ML) components that facilitate data retrieval, data validation, and work product generation. Data retrieval and validation system 1000 is configured to generate a reason or explanation to the admin, if the findings are rejected, to allow the end user (e.g. the asset owner) to correct (cure) issues with their data. This provides a constant (e.g., training) cycle where the algorithms (and corresponding AI and/or ML components) within data retrieval and validation system 1000 may improve the search and validation process and work product generation. For example, model trainer 1018 can be configured to train and improve (e.g., via AI and/or ML components) the performance of asset detail extractor system 1002, asset detail finder system 1004, and work product generator 1016. Training can be based on the approval/rejection processes in Phase III, other human feedback indicating appropriateness of model outputs, (confirmed) relevancy of items include in collected data, confirming depicted property features are features of a real property asset, validation findings, generated work product, etc. Improvements based on training can include improving data searching performance, data validating performance, work product generation, etc.

As part of a constant training cycle, model trainer 1018 can concurrently train AI and/or ML components within data retrieval and validation system 1000 to improve the search and validation process and work product generation concurrently with deriving work product 901 and/or performing other operations at data retrieval and validation system 1000. For example, training can occur concurrently with one or more of: an approval rejection process, a rejection/approval decision, confirming depicted one or more property features are features of a real property, confirming the relevancy of one or more items in collected data, listing an asset on the Exchange, approval for insurance coverage, moving forward in a different administrative process, deriving asset characteristics for an asset, as well as any other appropriate data collection, data validation activities, or work product related activities, etc.

Generally, documents/data may be uploaded asynchronously to data retrieval and validation system 1000 by a user, the admin, or data retrieval and validation system 1000 itself (if automatically uploaded or pulled from a third-party source) into database 1010. Once the documents/data are uploaded, data retrieval and validation system 1000 may perform an antivirus scan to ensure they are safe to be further processed/analyzed by data retrieval and validation system 1000. Data retrieval and validation system 1000 is configured to reject unacceptable documents/data. The rejected documents/data are not entered for further process/analysis (e.g., used to approve a listing, used to derive asset characteristics, etc.), and data retrieval and validation system 1000 can send a notification (e.g., for notifying an admin and or an asset owner) via the admin portal 1008. When documents/data are determined to be safe, they are queued to be processed/analyzed.

An application programming interface (API) in the computing system 1006 is configured to receive additional file details including, but not limited to: (1) file topic, e.g., "Loan Agreement" and "Debt Financing Agreement", (2) file type, e.g. pdf, .jpeg, and (3) file path, e.g., file destination. The API is configured to add a job to the queue with the above details.

In certain aspects, data retrieval and validation system 1000 is configured to pass the file (e.g., the documents/data and the additional file details) to a Document Details Extractor System ("DDES") (e.g., asset detail extractor system 1002). The DDES (e.g., asset detail extractor system 1002) is configured to receive the file and extract the text into a computer-friendly format. The DDES (e.g., asset detail extractor system 1002) may be configured to use a devised open source optical character recognition (OCR) library system/mechanism, and other suitable techniques, to extract text (according to the parameters of the desired data).

In an asset onboarding example, the input may be "Control Threshold" and the information sought would be the percent that a single entity can acquire before covenants in the original loan agreements are tripped; in the hypothetical, the desired output would be "10%." The DDES (e.g., asset detail extractor system 1002) may be configured to search for "Control Threshold" provision within a series of non-standard deal documents or contracts. The DDES (e.g., asset detail extractor system 1002) may be configured to score all of the results that are returned from a single document (as there could be multiple initial matches relevant to "Control Threshold") on a match confidence score (0-100%). The confidence score is generated by a proprietary algorithm ("Model") (in the computing system 1006) that gives a probability or confidence that the results provided are relevant and the right fit to the desired input. All data returned in the DDES (e.g., asset detail extractor system 1002) would be given a score. The algorithm determines the key threshold of score that is needed to be confident that the information returned is relevant to the admin and/or user. The Model mentioned above may use different processes, including (but not limited to): (1) regular expression (REGEX), (2) Exact, partial match, (3) N-grams to score words together (and/or other NLP-like patterns), (4) Word classification models, (5) Pre-trained model that is trained to interact with text, and (6) Model that is trained to interact with Artificial Intelligence chatbots.

Once the text is extracted, it returns to a different system, e.g., the admin portal 1008. The DDES (e.g., asset detail extractor system 1002) may be configured to return the page number, the text it matched on, and any other details relevant to the extraction.

Moving on to examples for the processes performed by asset detail finder system 1004, as a user first inputs basic information into a user interface of a website, the user may input basic information via a form including basic fields like name and address (the fields are standard for all users). After the user has submitted their introductory form, a private API would receive a JSON object containing the name of an asset (e.g., a property and the location of a property). Asset detail finder system 1004 is configured to generate/assign a unique identifier to the asset. Asset detail finder system 1004 is configured to generate an ID and add the ID to the system (e.g. data retrieval and validation system 1000) and the API is configured to receive the object and create a job on a queue. A service called Property Details Finder ("Finder") (e.g., asset detail finder system 1004) is a system that is always on (but passive until it is pinged). Once there is an object in the queue, this pings Finder (e.g., asset detail finder system 1004) and it accepts that object.

The Finder (e.g., asset detail finder system 1004) is configured to send out a search (asynchronous) on the internet to retrieve public sources of information that have matches on those property details initially listed. The Finder (e.g., asset detail finder system 1004) is configured to search for and find any links (appearing across multiple search engines) that are relevant to the asset.

The Finder (e.g., asset detail finder system 1004) can use pattern matching on the links to determine that it is finding a relevant page across search engines. A pattern example may be that the Finder (e.g., asset detail finder system 1004) looks for the same link to appear on multiple search engine pages; if it can only find the link on one search engine, for example, it will throw an error because this indicates the link returned is not mainstream or an authority site. The Finder (e.g., asset detail finder system 1004) may be configured to add the link to a manual review queue, where an admin can approve and force the job to process. Another pattern example may be that the Finder evaluates the way that a given link is structured for direct-to-property pages (versus other pages that are not authority sources).

After finding the initial batch of matching sources, the Finder (e.g., asset detail finder system 1004) is configured to match that list against a list of known and approved sources (that have been supplied by the business). For example, the company provides the system (e.g., data retrieval and validation system 1000) with the list of approved sites, and if a new approved site needs to be added, the Finder (e.g., asset detail finder system 1004) is configured to send communication for deploying an updated file.

The Finder (e.g., asset detail finder system 1004) may be configured to review the data that has now been cross-referenced, and apply a more subjective/qualitative review via suitable algorithm. For example, the Finder (e.g., asset detail finder system 1004) may be configured to reject an image that has been returned and is relevant to a real property, but bad quality or not helpful to the overall topic (e.g. rejecting the image of a pool in the part of a submission that discusses interiors).

FIG. 11 illustrates a flow chart of an example method 1100 for data retrieval and validation. Method 1100 can be implemented will be described with respect to the components and data retrieval and validation system 1000. As such, method 1100 is suitable for use with the exemplary transaction platform of the systems in FIGS. 1 and 5-7.

Method 1100 includes collecting a first set of data (collected in Phase I) associated with an asset (1102), creating identifiers associated with the first set of data (1104), collecting a second set of data (collected in Phase II) associated with the asset based on the identifiers (1106), comparing the first set of data and the second set of data based on the identifiers (1108), determining validation of the first set of data based on the comparison (1110), automatically, as part of a constant training cycle, training an artificial intelligence module based on the validation improving data validation performance (1112), and (concurrently with 1112) deriving a characteristic of the asset from items in the first data set (1114). Method 1100 can also include generating a result of approval or rejection based on the comparison. Method 1100 may include collecting the first set of data and the second set of data from at least one source comprising one of a user, public internet 1012, and non-public internet 1014.

Method 1100 may include assigning a weight to the at least one source based on accuracy of the data; and determining a confidence score for the validation result based on the assigned weight. Method 1100 may include verifying quality of the first set of data and the second set of data prior to comparing the first set of data and the second set of data based on the identifiers. The method 1100 may include transmitting the result, and when the validation is rejected, transmitting a reason for the rejection.

Method 1100 may include any actions, processes, or analyses to achieve features performable by the asset onboarding system 1000. For example, method 1100 can generate work product, such as, for example, approval for listing an asset on the Exchange, approval for insurance coverage, moving forward in a different administrative process, deriving one or more (or a plurality of) asset characteristics for an asset (e.g., an asset Cap Rate, an asset valuation (e.g., a BOV), an asset Cap Table entry, an asset Cap Table, etc.), etc. In some aspects, work product generated by method 1100 can include an aggregate, complete report that combines all of the received data from multiple disparate sources. For example, method 1100 can generate work product including a combination of multiple derived asset characteristics. In another example, method 1100 can generate work product including one or more derived asset characteristics along with other output, such as, for example, (approval for) listing an asset on the Exchange.

Derived Asset Characteristic-Asset Valuation

Figure 12:
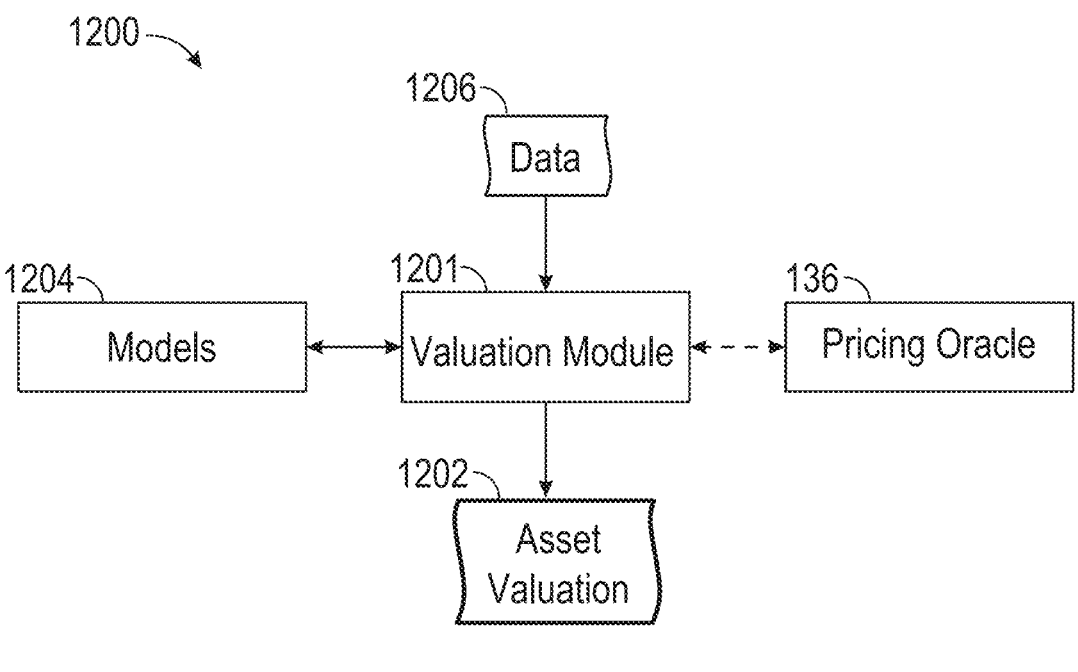
FIG. 12 illustrates an example computer architecture that facilitates digitally deriving an asset valuation.

FIG. 12 illustrates an example computer architecture 1200 that facilitates digitally deriving an asset valuation. Computer architecture 1200 can be implemented at and/or using the components of system 100 and/or data retrieval and validation system 1000. As such, computer architecture 1200 is suitable for use with the exemplary transaction platform of the systems in FIGS. 1 and 5-7.

As depicted, computer architecture 1200 includes valuation module 1201 and models 1204. As depicted, valuation module 1201 communicates with pricing oracle 136. Valuation module 1201 can be separate from or included in pricing oracle 136.

Generally, valuation module 1201 can derive (e.g., calculate, re-calculate, revise, update, etc.) an asset valuation, such as, a Broker Opinion of Value ("BOV"), for any of a variety of different assets and asset types from relevant data associated with an asset. For example, valuation module 1201 can derive an asset valuation for assets and asset types, including, but not limited to, real estate (real property), natural resources, natural resource extraction operations, independent valuations, independent appraisals, private debt, private credit, any other described asset types, including other appropriate valuations for real and non-real assets.

In one aspect, components of computer architecture 1200 are included in, accessed by, integrated with, and/or interoperates with data retrieval and validation system 1000. Thus, as part of deriving an asset valuation, data retrieval and validation system 1000 can collect and validate data 1206. Valuation module 1201 can derive asset valuation 1202 from data 1206. In one aspect, data 1206 is data that was previously collected by and validated at data retrieval and validation system 1000. For example, data 1206 can be data purported to be associated with an asset and subsequently confirmed by data retrieval and validation system 1000 as being relevant to the asset.

Valuation module 1201 can interoperate with models 1204 and/or pricing oracle 136 as part of asset valuation derivation (e.g., of asset valuation 1202). Models 1204 can include artificial intelligence (AI), machine learning, and/or other appropriate models and/or algorithms. As such, valuation module 1201 can employ AI models when deriving an asset valuation from selected/validated data. In one aspect, models 1204 are implemented within and/or are part of pricing oracle 136.

In one more specific aspect, work product generator 1016 includes, accesses, is integrated with, and/or interoperates with components of computer architecture 1200, such as, for example, valuation module 1201 and models 1204. As such, it may be that work product generator 1016 (e.g., utilizing valuation module 1201 and models 1204) derives an asset valuation, such as, for example, a BOV.

More generally, models 1204 can be models included in a constant training cycle implemented at system 100 and/or at data retrieval and validation system 1000 to improve deriving asset valuations. For example, model trainer 1018 can train and improve models 1204, the performance of the asset detail extractor system 1002 and the asset detail finder system 1004. Training can be based on the approval/rejection processes in Phase III, other human feedback, (confirmed) relevancy of items include in collected data, confirming depicted property features are features of a real property asset, validation findings, etc. Improvements based on training can include improving asset valuation derivation.

Model trainer 1018 can train models 1204 (as well as other AI and/or ML components within data retrieval and validation system 1000) as part of a constant training cycle to improve the search and validation process and asset valuation derivation concurrently with deriving work product 901 (e.g., asset valuation 1202) and/or performing other operations at data retrieval and validation system 1000. Training models 1204 to improve deriving asset valuations can occur concurrently with one or more of: an approval rejection process, a rejection/approval decision, confirming depicted one or more property features are features of a real property, confirming the relevancy of one or more items in collected data, listing an asset on the Exchange, approval for insurance coverage, moving forward in a different administrative process, deriving an asset valuation, deriving one or more other asset characteristics for an asset, as well as any other described data collection, data validation activities, or work product related activities, etc.

Derived asset valuation 1202 (one example of an asset characteristic) can be provided to and/or utilized by sellers, buyers, investors, modules in system 100, modules of system (e.g., a cap table system) and data flow 1400, modules of system (e.g., a cap table system) and data flow 1500, cap rate module 1601, etc.

In aspects, data retrieval and validation system 1000 gathers data from multiple sources and compares the data to determine relevant (e.g., more accurate) data. For example, property condition is an element considered for valuing real estate. A property condition can be based on submitted photos and/or an in-person visit. Data retrieval and validation system 1000 can (e.g., via interoperation with valuation module 1201, models 1204 and/or pricing oracle 136) evaluate multiple images of a property, determine which are most recent, highlight changes between different images of the property (to point identify changes that might have been made over time, either positive or negative), and then formulate a rating (e.g., a score) based on more recent and/or more accurate images of the property.

Data retrieval and validation system 1000 (e.g., via interoperation with valuation module 1201, models 1204 and/or pricing oracle 136) indicate relevancy (e.g., how recent, quality, etc.) of data used to derive an asset valuation. In one aspect, data relevancy, potentially along with an asset valuation, is indicated to a user of system 100 (e.g., an asset owner, a potential investor, buyer, seller, etc.) at a user-interface. Data relevancy can be indicated/presented with time-stamp information. As such, a user of system 100 (e.g., an investor) can be notified that an asset valuation is derived from data over a specified period, for example, within the last 6 months, 12-18 months in the past, etc.

Asset valuations derived from more recent data may increase chances of purchase, investment, etc. As such, using time-stamp information incentivizes asset owners to keep asset documentation (data) maintained.

Generally, valuation module 1201 can update an asset valuation in response to changed data, at specified (e.g., predetermined) intervals, or even in real-time. In aspects, valuation module 1201 monitors data used to derive an asset valuation. Valuation module 1201 updates the asset valuation responsive to a monitored data change (e.g., data changed either manually, or on the internet via updated imagery). In other aspects, valuation module 1201 updates an asset valuation at virtually any specified interval (or any frequency) when asset documentation is kept up to date. In further aspects, valuation module 1201 updates an asset valuation live, for example, responsive to a potentially investor viewing a corresponding asset listing.

In aspects, valuation module 1201 helps evaluate and value assets, such as commercial real estate, listed on a financial exchange, such as, for example, an Alternative Trading System (ATS) implemented on and/or at system 100. To list an asset, an asset owner can submit the asset along with corresponding data and documentation (e.g., part of data 1206) to data retrieval and validation service 1000 during an asset onboarding process. Valuation module 1201 can derive an asset valuation from the data and documentation provided to and validated by data retrieval and validation service 1000. The asset valuation can be publicly available and presented to potential inventors at a user-interface.

The financial exchange is also a repository for a range of detailed data across a range of assets and asset types. Over time, as owners continue to update new information, valuation module 1201 (or more broadly work product generator 1016) can identify relationships between assets listed on the financial exchange as well as corresponding data and documentation. Valuation module 1201 can predictively derive an asset valuation for other comparable assets that are not listed on the financial exchange (considering factors like asset class (asset type), location, condition, etc.) based on identified relationships. Models 1204 can include AI models, machine learning, etc. that facilitate identifying relationships between assets and/or corresponding data and documentation (another type of asset characteristic that can be derived by work product generator 1016 and/or included in work product 901). Models 1204 can include AI models, machine learning, etc. that facilitate deriving predictive asset valuations for comparable assets. Thus, valuation module 1201 can interoperate with models 1204 to identify asset relationships and derive asset valuations for comparable assets. Model trainer 1018 can train models 1204 as part of a constant training cycle to improve identifying relationships between assets and/or corresponding data and documentation and deriving predictive asset valuations for comparable assets concurrently with other operations as described.

Valuation module 1201 can also standardize asset valuations across assets and asset types. As such, digital deriving asset valuations can be more efficient and more accurate. Asset valuations can be derived in hours and can be based on what is essentially real-time measurements.

Data 1206 can be collected by data retrieval and validation service 1000 in an "Information Collection" Phase 1 (FIG. 9A). Thus, data 1206 can include raw data, processed data, and other types of data from various public data sources and/or from various private data sources. As such, valuation module 1201 can derive an asset valuation from the raw data, processed data, and other types of data accessed from the various public data sources and/or the various private data sources. For example, data retrieval and validation service 1000 can access data 1206 from a plurality of data sources including at least first source and a second source. The first source can include raw inputs and documentation (potentially unstructured and not standardized) provided by the owner of the property. The second source can be facilitated through connections to third party software.

As described, data retrieval and validation service 1000 can also access data 1206 from other sources including public sources, e.g., through internet search engines.

It may be that data retrieval and validation service 1000 accesses raw documentation (i.e., part of data 1206) that is supplied by the owners during their initial onboarding and approval process. Example of raw inputs include but not limited to: (1) trailing 12 months financial statements, (2) balance sheet business plan (original) and any updated versions vacancy rates, (3) marketing materials, and (4) "qualitative" information like management team and their credentials, and other appropriate raw inputs.

It may also be that data retrieval and validation service 1000 accesses private software(s). Through interoperating with the private software(s), data retrieval and validation service 1000 can enter and pull data relevant to asset valuation (i.e., part of data 1206). For example, data retrieval and validation service 1000 can utilize private software(s) to identify, find, and extract relevant asset information. Data retrieval and validation service 1000 can utilize private software(s) when an asset owner is not actively producing/providing relevant asset information. Examples of private software include but are limited to: (1) property management software for data like rent roll, vacancy, non-revenue units, and other key performance indicators (KPIs), (2) certified public accountant (CPA) software, (3) accounting software for data like Trailing Twelve Months profit and loss (P&L) statement, bad debt, write-offs, concessions, capital reserves, monthly cash position, and other financial data, (4) P&L detail that can include revenue details like rent, pest control, trash, and cable and internet, and (5) P&L detail that can include cost details like payroll, general and administrative (G&A), advertising, taxes, insurance, and other appropriate private software.

When accessing data relevant to an asset valuation (i.e., part of data 1206) from other sources, data retrieval and validation service 1000 can interoperate with AI models (potentially included in models 1204) scraping the public internet to extract the relevant data, such as, for example, property condition. Data retrieval and validation service 1000 can interoperate with AI models that implement various Vision, Natural Language Processing (NLP), Optical Character Recognition (OCR), etc. related operations. More specifically, AI models can implement related operations to: compare photos of the same property over a period of time to show condition change (both internal and external), utilize satellite and mapping technologies to validate external changes (and photos provided by owner or the technologies). For example, relevant data may include demographic trends from public sources (government agencies, economic releases), such as, population growth, construction permits, (e.g., new) business growth in certain areas, unemployment rate, average income, crime trends, etc.

After gathering (and, when appropriate, consolidating) data relevant to asset valuation, data retrieval and validation service 1000 can normalize and/or validate the relevant data. For example, data retrieval and validation service 1000 can normalize and/or validate data 1206.

Subsequent to gathering (and, when appropriate, consolidating data 1206), data retrieval and validation service 1000 can normalize data 906. In one aspect, data retrieval and validation service 1000 interoperates with one or more normalization models (e.g., included in models 904) to normalize data 1206. Data normalization can include transforming unstructured/unformatted data, irregular data, partially structured/formatted data, etc. into a common format. Data normalization can also include converting formatted data into the common format. Subsequent to data normalization, valuation module 1201 may identify (decide) what data parts of data 1206 to use for asset valuation. For example, valuation module 1201 can match data that relates to the same "topic" and determine a broader than average value and remove the outliers. In certain other aspects, the outliers could be based on other factors for removal.

Also subsequent to gathering valuation module 3201 can impute data 1206. In one aspect, valuation module 1201 interoperates with one or more models (e.g., included in models 1204) to impute data 1206. Data imputation can include replacing missing data with estimated values which allows more complete datasets and enables more robust analysis while maintaining data integrity. Simple imputation techniques may include market-level median imputation and k nearest neighbor (KNN) imputation. For market level median imputation, medians for cap rates may be computed while ensuring markets with entirely missing values are excluded. Market level median imputation is robust to outliers, and preserves location-specific trends, but lacks adaptability to capture complex relationships across features. A KNN imputation estimates values based on the most similar observations in the dataset. While KNN may be theoretically promising, due to the high-dimensional nature of the dataset, finding reliable nearest neighbors is computational expensive and ineffective against high sparsity in datasets. Simple imputation techniques, either alone or in combination, may not provide an adequate solution.

In one aspect, valuation module 1201 may interoperate with one or more models (e.g., included in models 1204) iteratively using Bayesian Ridge Regression. The valuation module 1201 may train a model 1204 to predict missing values based on other available features and iteratively refine its estimates. Bayesian Ridge Regression is computationally efficient, prevents overfitting by introducing prior distributions, and works well with highly correlated data.

In another aspect, valuation module 1201 may utilize a hybrid approach first applying a group median imputation by geography code secondly followed by a machine learning based filling for any remaining gaps. This hybrid approach helps ensures extreme missing values do not introduce biases or degrade the predictive accuracy of models 1204. The valuation module 1201 may determine which imputation technique to execute based on a measure of missing values. For instance, when it is determined that more than 50% of values are missing, the valuation module 1201 may execute the hybrid approach above with median imputation by market before applying ML-based techniques to fill any gaps. When it is determined that more than 30% of values are missing, the valuation module 1201 may apply ML-based imputation iteratively.

Subsequent to consolidation, normalization, validation, etc. of data 1206, and as appropriate, valuation module 1201 can interoperate with one or more valuation models (e.g., in models 1204) to derive asset valuation 1202 from identified data parts of data 1206. Deriving an asset valuation can include calculating an asset valuation, re-calculating an asset valuation, revising an asset valuation, updating asset valuation, etc. An asset valuation can be associated with a corresponding asset and presented to a one or more of: an asset owner, an investor, a buyer, etc. through a (e.g., web based) user interface. Parts of data 1206 used in deriving an asset valuation can also be presented, for example, to an investor, a buyer, etc., through a (e.g., web based) user interface. As such, investors, buyers, etc. can review the parts of data 1206 and compare standardized measurements across different assets. Accordingly, investors, buyers, etc. can make more informed decisions.

One or more rules can be used to inform valuation module 1201 when asset valuations are to be updated. The one or more rules can be internal to valuation module 1201 and/or included at models 1204 and/or pricing oracle 136. In one aspect, the one or more rules are maintained in a database (or other mutable ledger, for example, 102) and may be synced to a blockchain (or other immutable ledger, for example, 104). As such, when an asset valuation is derived, investors, buyers, etc. can audit the condition that triggered deriving the asset valuation.

In accordance with the one or more rules, valuation module 1201 can implement an updating process, including flagging data that has become outdated (stale). The one or more rules can define one or more asset valuation update schedules. Asset valuation update schedules can vary across data types (e.g., in data 1206), across assets, assets types, etc. Each asset valuation update schedule can include one or more rules. Valuation module 1201 can interoperate with one or more models (e.g., in models 1204) formulating an asset valuation update schedule for an asset An asset valuation update schedule can define asset valuation is to be updated in accordance with a standard, at specified intervals, at specified times, at specified frequencies, when changed data (e.g., in data 1206) is detected, etc. It one aspect, valuation module 1201 interoperates with one or more models (e.g., in models 1204) formulating an asset valuation update schedule for an asset per data relevant to the asset valuation. Formulating an asset valuation update schedule per data facilitates updating asset valuations at appropriate times without unnecessarily consuming (e.g., computing) resources at an ATS. That is, it minimizing the possibility of updating an asset valuation when relevant data (e.g., in data 1206) hasn't changed.

In one example, property photos for an asset may be updated quarterly or annually, financials for the asset may be updated month or quarterly, and market trends for the asset are updated semi-annually or annually. Valuation module 1201 can interoperate with one or more models (e.g., in models 1204) to formulate an update schedule for the asset. The update schedule can be formulated such that asset valuation for the asset is updated when data changes to photos, financial, or market trends are more likely to have occurred in view of the update frequencies for the different data.

An asset valuation schedule may also define update preferences as well as update requirements. Update preferences can identify when asset valuation updates are preferred, such as, for example, hourly, daily, weekly, when a data change is detected, etc. Update requirements can indicate when asset valuation updates are required, such as, for example, daily, every two days, every three days, weekly, bi-monthly, monthly, when a data change is detected, etc. Other longer time periods (e.g., multiple months, quarterly, annually, multiple years, etc.) and/or shorter time periods (e.g., minutes, tens of minutes, etc.) are possible for both update preferences and update requirements. Update preferences and update requirements can be also be configured per data.

An update preference can be associated with one or more conditions. If the one or more conditions are satisfied at a time prescribed by the update preference, an asset valuation can be updated. In one aspect, a condition relates to resource utilization and/or resource availability at an ATS, such as, system 100. For example, an update preference can define an asset valuation update is to occur every day at a specified time, if a transaction volume at an ATS is below a specified threshold. If, at the specified time, the transaction volume is below the specified threshold, an asset valuation update may occur. On the other hand, if, at the specified time, the transaction volume is at or above the specified threshold, an asset valuation update does not occur. Other conditions (and/or thresholds) can be related to availability and/or utilization of computer system resources, such as, system memory, processor, network, etc. Using conditions minimizes the possibility of resource allocation for asset valuation updates degrading the efficiency of in-process activities (e.g., transactions) at an ATS. That is, resources more likely remain available for handling in-process activities.

In one aspect, an update schedule includes at least one update requirement. In another aspect, an update schedule includes at least one update preference and at least one update requirement. When an update schedule includes both an update preference and an update requirement, it may be that the time period defined for the update preference is less than the time period defined for the update requirement. Accordingly, one or more rules can define update preferences and/or update requirements of an update schedule appropriate for an ATS and based on (and potentially varying by) asset and/or asset type.

When an asset is in non-compliance with a corresponding update schedule, for example, data has become "out of date", valuation module 1201 can discount the asset valuation based on a weighted metric of non-compliance. In one aspect, non-compliance can occur when updated data is inaccessible for some amount of time, such as, for example, exceeding that of an update requirement.

Figure 13:
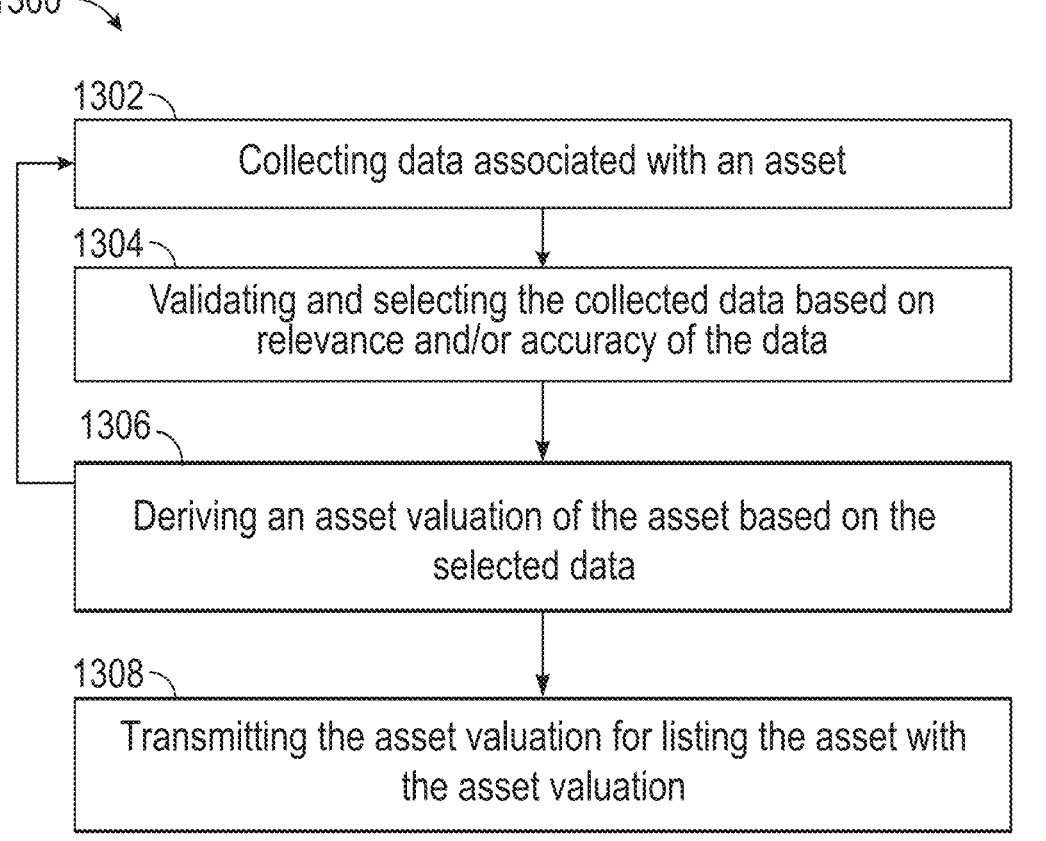
FIG. 13 illustrates a flow chart of an example method for digitally deriving an asset valuation.

FIG. 13 illustrates a flow chart of an example method 1300 for digitally deriving an asset valuation. Method 1300 will be described with respect to the components and data of data retrieval and validation service 1000 and in computer architecture 1200. As such, method 1300 is suitable for use with the exemplary transaction platform of the systems in FIGS. 1 and 5-7, data retrieval and validation system 1000, and valuation module 1201. The method 1300 includes collecting data associated with an asset (act 1302), validating and selecting the collected data based on relevance and/or accuracy of the data (act 1304), deriving an asset valuation (e.g., a BOV) of the asset based on the selected data (act 1306) and transmitting the asset valuation (e.g., the BOV) for listing the asset with the asset valuation (e.g., the BOV) (act 1308).

Method 1300 may be repeated in accordance with an update schedule corresponding to an asset, such as, for example, at a specified time interval, when new information/ data associated with an asset is available, as appropriate to generate up-to-date asset valuation, etc. In other aspects, method 1300 may be partially repeated, incrementally repeated, and could also increase margin/variance metrics.

In accordance with an update schedule, method 1300 can also include determining when to collect data associated with an asset, such as, for example, at a specified frequency. Method 1300 can also include discounting an asset valuation of the asset when the is out-of-date based on a weighted metric of non-compliance.

Act 1302 can include collecting the data from a first source including raw documentation associated with the asset supplied by an owner of the asset, collecting the data from a second source including data associated with the asset from private software, and collecting the data from a third source including data associated with the asset from public internet. Act 1302 may include cross-comparing the data collected from at least two of the first source, the second source, and the third source, to determine the relevance and/or accuracy of the data.

Act 1308 may include transmitting the asset valuation for listing the asset with the asset valuation with time-stamp information.

Method 1300 may can also include activities facilitating a constating training cycle wherein an asset valuation is derived concurrently with training models (e.g., models 1204) to improve performance.

Method 1300 can include determining a relationship between listed assets and a comparable asset and deriving an asset valuation for the comparable asset. Method 1300 may include any acts, processes, or analyses to facilitate described functionality of components in system 100, data retrieval and validation system 1000, and computer architecture 1200. For example, method 1300 can include acts, processes, or analyses facilitating interoperation between components of system 100, asset detail extractor system 1002, asset detail finder system 1004, work product generator 1016, valuation module 901 and models 904.

Derived Asset Characteristic-Capitalization Table/Capitalization Table Entry

As described herein, a capitalization table ("cap table") is a document used by companies, funds, and other entities to document and track the ownership structure of an asset. Essentially, a cap table provides an accounting of an asset's valuation, asset's owners, investors, and, possibly, employees (collectively, the "ownership group"). A cap table can also track ownership percentages of entities (e.g., individuals, corporations, etc.) having an ownership interest in an asset, including indicating an investor's initial investment in the asset.

In one aspect, a cap table includes one or more cap table entries (e.g., one or more rows). Each cap table entry at least identifies an entity and the entity's ownership interest in an asset.

The structure of a cap table typically may be a list of an overall ownership group, sorted by stakeholder type. For example, the order might list one or more founders first, followed by one or more executives and/or one or more key employees with equity and/or option stakes, and then additional investors, such as angel investors, venture capital firms, and others who are invested in the entity. Alternatively, a cap table may list the ownership group in descending order by ownership size, e.g., ownership percent, showing the largest holders at the top.

A cap table can also take convertible debt into account. For example, a cap table can include a section tracking any debt with potential to covert to equity in the future.

Cap tables can be maintained by spreadsheet software (or similar software). A cap table represents a moment in time, for example, corresponding to the last time data in the cap table was changed, updated, amended, etc. Examples of changes include, without limitation, sale of a stake by an investor to a new investor, or tender by an owner of equity shares to an employee or another entity via a partnership. A variety of entities, including startups (that raise funding), investment funds, and private equity portfolio roll-ups, us cap tables.

Aspects of the invention include cap tables that are synced live (e.g., automatically). Live syncing cap tables can be used at a financial exchange (e.g., an ATS implemented at system 100) providing a secondary trading market place for digital shares of assets. Within this description and the following claims, live syncing cap tables are considered components of and/or can be derived by components of system 100 and/or data retrieval and validation system 1000.

Those with an ownership interest in an asset may desire to list their ownership interest for sale, for example, as a way for investors to obtain liquidity. For example, an owner of a multi-family apartment building complex may accept (e.g., fiat currency) funding from limited partners (who now receive dividends). Alternatively, an owner of a fleet of private planes may have purchased the planes via a pool of (e.g., fiat currency) funds from a series of investors (who now share in charter revenue). In these two, as well as other examples, an owner can have a cap table to track ownership interests in the asset (e.g., apartment building, plane fleet, etc.).

As such, a cap table can change over time, for example, as ownership in an asset is traded between entities. An exemplarily initial use case for the live syncing cap table system relates to a financial exchange (e.g., implemented at system 100) that provides a secondary trading marketplace for digital shares of real assets. In this exchange ecosystem, asset owners have a legal right to list the owner's assets on the exchange. The owner might decide to list the owner's asset on the exchange for several reasons but one primary reason for listing an asset on the exchange would be to provide a way for investors in the asset to get liquidity in their investment. The investors are part of the ownership group and, as such, are reflected on the cap table.

An asset onboarding process can be implemented, for example, at data retrieval and validation service 1000, for an asset prior to listing an asset at a financial exchange (e.g., at an ATS implemented at system 100). As part of the asset onboarding process, asset owners can provide details regarding the asset, along with a current ownership group information (e.g., included in a static cap table). For example, data retrieval and validation service 1000 can ingest asset details and current ownership group information.

Generally, data retrieval and validation service 1000 can ingest irregular data, unformatted data, partially formatted data, non-standardized data, etc. associated with an asset. Data retrieval and validation service 1000 can draw out information relevant to live syncing cap table creation and/or live syncing cap table updates (e.g., changing one or more cap table entries after a trade) from the ingested data. In one aspect, data retrieval and validation service 1000 formats relevant information into an industry-accepted format suitable for use by third parties, such as, CPAs, attorneys, etc. As such, subsequent to ingesting data, the cap table system can create or update a live syncing cap table for the asset.

Figure 14:
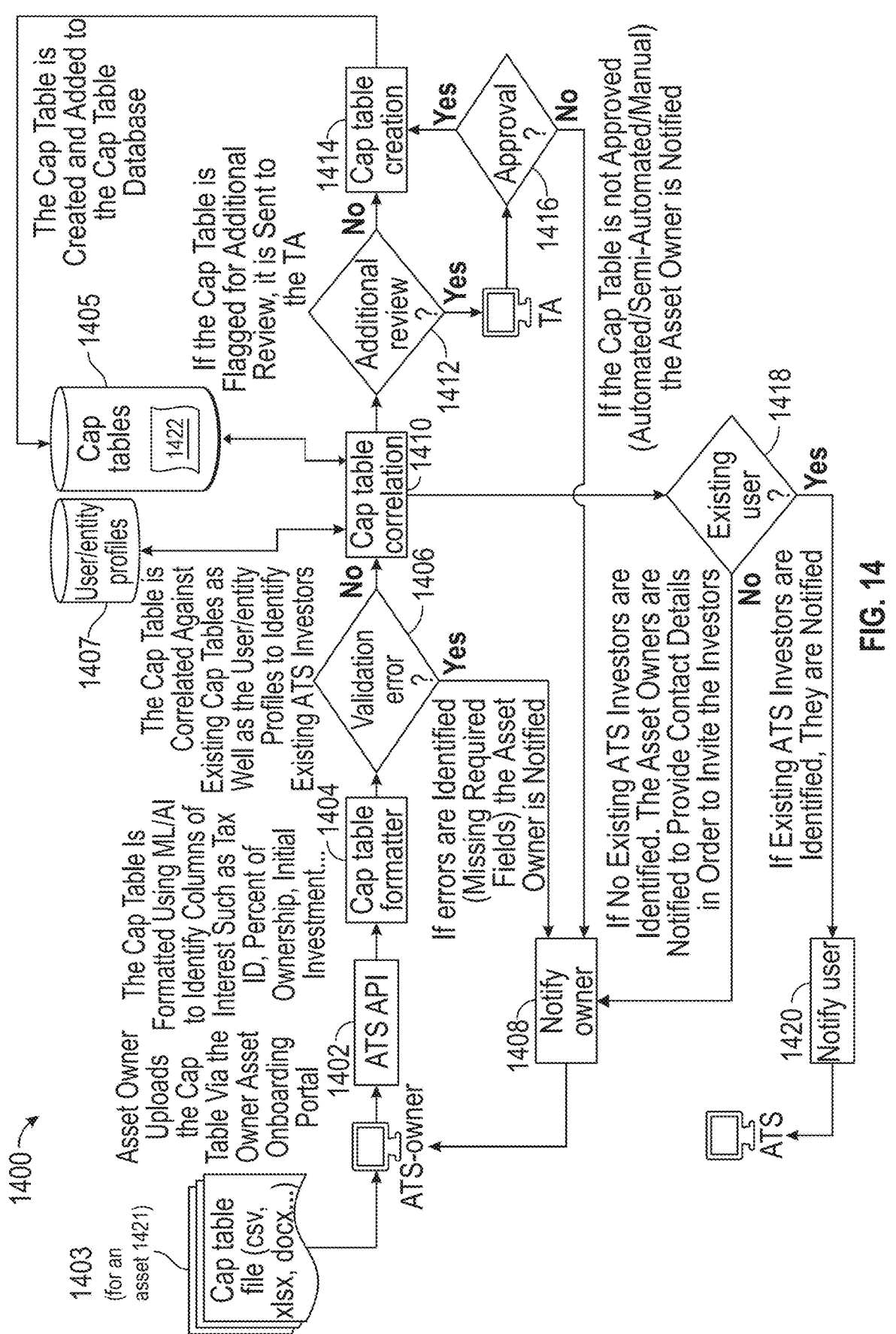
FIG. 14 illustrates an example system and data flow for creating a live syncing capitalization table.

FIG. 14 illustrates an example system (e.g., a cap table system) and data flow 1400 for creating a live syncing capitalization table. Generally, components of system and data flow 1400 can be implemented at, included in, integrated with, and/or otherwise interoperate with components of system 100 and/or data retrieval and validation service 1000. As such, system and data flow 1400 is suitable for use with the exemplary transaction platform of the systems in FIGS. 1 and 5-7 and data retrieval and validation service 1000. System and data flow 1400 can also interoperate with computer architecture 1200 (possibly through interaction with system 100 or data retrieval and validation service 1000). For example, system and data flow 1400 can ingest an asset valuation derived by computer architecture 1200. System and data flow 1400 can consider the derived valuation relevant information during live syncing cap table creation.

Generally, system and data flow 1400 can interoperate with one or more models and/or algorithms, for example, a series or sequence of machine learning algorithms, artificial intelligence algorithms, etc. Through interoperation with the one or more models and/or algorithms (possibly also included in models 1204 and/or otherwise utilized by data retrieval and validation service 1000), system and data flow 1400 can create a live syncing cap table and/or corresponding cap table entries for an asset. Live syncing cap table creation can include converting other (e.g., static) data, such as, an existing static cap table (representing a single, static moment in time) into the live syncing cap table (such as a digital ledger) for the asset. A live syncing cap table can be automatically, and without human intervention, updateable for any transaction (e.g., a buy/sell transaction at system 100) and/or change (e.g., updated asset valuation) that occurs related to the asset.

System and data flow 1400 can implement an ingestion phase when creating a live syncing cap table for an asset. During the ingestion phase (e.g., implemented at data retrieval and validation system 1000), system and data flow 1400 can interoperate with one or more models, algorithms, etc., ingesting irregular data, unformatted data, partially formatted data, non-standardized data, etc. associated with an asset. Associated (relevant) data can include static data, such as, for example, a static cap table corresponding to the asset. Associated (relevant) data can also include data generated by components of system 100 or computer architecture 1200, such as, transaction data, an asset valuation, etc. corresponding to the asset. In one aspect, system and data flow 1400 receives an asset valuation that was derived by valuation module 1201 (and is potentially included in cap table data 1403).

For example, not all entities capture ownership group data in the same way. Some entities might have this data in spreadsheets like in Microsoft Excel spreadsheet and keep the data in a table format. Other entities might use word processing documents (like Microsoft Word) and use more of a list format. Some entities might use hard copies of investment documents and keep track of the ownership group via unstructured data (handwritten lists, hard copies of deal documents, and/or other types of "hard copy" memoranda).

As such, an entity or entities can produce data in different and varied formats and format types. For example, the owner that is trying to list an asset might upload a plurality of documents including: (1) a spreadsheet with the original list of the ownership group by name and date of commitment to the investment, (2) a spreadsheet that lists the final amounts invested by each ownership group entity after consideration of some special expenses that were assessed at closing, and (3) a series of word documents that list shares allocated to the CFO and COO of the owner's company.

In aspects, system and data flow 1400 ingests these (as well as other types of) document through interoperation with one or more models, algorithms, etc. Relevant information contained in ingested documents can include, but is not limited to: a name, an email address, a mobile phone number, a profile type (a personal or entity type), an entity name (if applicable), a social security number or EIN, a Tax ID, a percent ownership, and/or an investment amount.

System and data flow 1400 can implement a conversion phase when creating a live syncing cap table for an asset. During the conversion phase, system and data flow 1400 can interoperate with one or more other models, algorithms, etc., compensating for data inconsistencies, irregularities, formats, etc. in ingested data and converting asset associated data into a standardized format. From the standardized format data, system and data flow 1400 can in turn derive a standardized version live syncing cap table for the asset.

System and data flow 1400 can also include additional data in the live syncing cap table. It may be that ingested materials include data extraneous to the standardized format but that is relevant to an asset (e.g., data import to an original asset owner). For example, ingested data may include a field that indicating whether a given entity in an ownership group has previously invested with the owner (e.g., a Yes/No field), and then a free text field for the date of investment (e.g., December 2009). Another example might be an annotation on the salesperson associated with each specific ownership group entity's investment (e.g., Robert Johns). Using such data can result, for example, in a live syncing cap table that has the following fields: a name, an email address, a mobile phone number, a profile type (a personal or entity type), an entity name (if applicable), a social security number or EIN, a Tax ID, a percent ownership, and/or an investment amount, a previous investor (Yes/No), a date of investment (e.g., a text field "December 2009, February 2012, etc."), an associated salesperson (e.g., a text field "Robert Johns").

In aspects, data ingestion, data conversion, data supplementation, etc. of system and data flow 1400 are implemented utilizing components of data retrieval and validation system 1000.

Creating a live syncing cap table can include creating a live syncing cap table template and implementing error identification, validation, and resolution (or rejection) on the live syncing cap table template. System and data flow 1400

(e.g., through components of data retrieval and validation system 1000) can interoperate with one or more AL and/or ML models to continually identify, and improve on identification of, potentially non-conforming data. Examples of non-conforming data include a social security number that does not include the correct number of digits and area code for a mobile phone number that is not a recognized area code.

In aspects, system and data flow 1400 interoperates with one or more continuous learning ML components. Over time, model trainer 1018 can refine (e.g., train) the continuous learning ML components through creating live syncing cap tables. The continuous learning machine learning components can automatically, and without user intervention, ingest data and implement any described actions creating live syncing cap tables.

Concurrently, based on handling ingested data, model trainer 1018 can further refine (train) capabilities of the continuous learning machine learning components utilized to create live syncing cap tables. Refined capabilities can include refining capabilities to identify columns of interest for an asset class from within subsequently accessed (e.g., unstructured table) data, draw out relevant information for the asset class from the within subsequently accessed (e.g., unstructured table) data, and produce templates for an asset class. As such, ingested data can be concurrently used for live syncing cap table creation and also training continuous learning ML components. Concurrently using ingested data for creating live syncing cap tables and refining ML components conserves ATS and/or computing resources by minimizing (or even eliminating) use of separate training data and training cycles to refine machine learning component capabilities.

ML components can calculate (or receive from valuation module 1201) an asset valuation and/or a total investment value. The ML components can flag if a calculated percent ownership does not match the investment amount as a percentage of the total investment value. Flagged errors can be overridden by an administrator or returned to the owner to correct. ML components may catch conditions, such as, data errors, that might slip by manual review. For example, a person manually maintaining a cap table might make a mathematical error in calculating percent ownership, or the person might not catch that an area code with three digits (e.g., 111) is not valid even though it appears to be valid.

System and data flow 1400 can also, possibly through interoperation with ML components, access and analyze data contained in different cap tables (live syncing cap tables and/or static cap tables). As such, ingesting data for creating a live syncing cap table can include accessing (or ingesting) one or more other live syncing cap tables (e.g., at system 100) and/or ingesting one or more other static cap tables. From the analysis, commonalities between cap tables can be identified. Identified commonalities can be utilized when creating a live syncing cap table for an asset. Concurrently, identified commonalities can also be used for training continuous learning ML components.

Accordingly, although each live syncing cap table is created individually for a given asset, system and data flow 1400 is also able to look between cap tables to analyze and find commonalities. An administrator might choose to preselect actions for the system to identify and link one or more commonalities. For example, at an ATS (e.g., system 100), system and data flow 1400 can determine that a given social security number appears on four different live syncing cap tables corresponding to four different assets within the exchange ecosystem. However, system and data flow 1400 can determine that an associated email address appears on two of the four different live syncing cap tables. System and data flow 1400 can identify the discrepancy.

A possible reason for the discrepancy is that the documentation for the four different assets was different. A first two assets might have been onboarded by Owner A, who might have demanded this field in Owner A's own deal paperwork. However, a second two assets might have been onboarded by Owner B. Owner B might use a CRM for Owner B's sales efforts, and Owner B might actually try to segregate some sales and marketing information (e.g., emails) from Owner B's deal paperwork.

Without any involvement from system and data flow 1400, a user would not be notified automatically about the second two assets that are listed on the exchange (and about the user's shares in those assets, and the user's eligibility to participate on the exchange). A manual review of each member of the ownership group may be required, with associated manual outreach. Additionally, a person is required to manually update the second two cap tables with the email address to ensure a consistent format across all reporting. However, because system and data flow 1400 is able to identify and link information between the four different live syncing cap tables, this issue can be more efficiently resolved. For example, system and data flow 1400 is able to identify commonalities among different live syncing cap tables and plug in missing data where applicable. Identifying commonalities and plugging in missing data, facilitates automated consistent, accurate, and complete data reducing manual work (and the corresponding possibility of human error). In the example above, system and data flow 1400 can automatically enter the email address into live syncing cap tables for the second two assets. System and data flow 1400 can also notify and administrator that a link (or similar outreach) is to be sent to a user to alert the user to the user's shares.

System and data flow 1400 can also maintain, potentially responsive to share owner instructions, values in various supplemental fields within a live syncing cap table indicating the status of asset shares, compliance data, etc. Field value maintenance can include setting, monitoring, changing, reading, writing, etc. a value contained in a supplemental field. For example, a value in one supplemental field can indicate if shares in an asset currently are for or currently not currently for sale (e.g., "For Sale" or "Not For Sale"). A value in another supplemental field may indicate if shares in an asset are being held for an initiated, but not yet settled, transaction (e.g., "Hold" or "No Hold"). A field value can be Boolean (T or F), numeric, character, text, etc. A value in a further supplemental field may indicate a maximum percentage ownership per entity, such as, per individual, per corporation, per consortium, etc. (e.g., 15%, 20%, etc.). A value in an additional supplemental field can indicate KYC/AML screening requirements for transferring shares.

Field values can be maintained per asset (e.g., per live syncing cap table) and/or per asset owner (e.g., per each row of a live syncing cap table). Some owners may desire to list their shares in an asset for sale or other owners may desire to retain their share in the asset. Fields for each owner (e.g., row) can be maintained to indicate this distinction (as well as other distinctions). In one aspect, system and data flow 1400 includes supplemental fields in a live syncing cap table during creation. In other aspects, system and data flow 1400 adds supplemental fields when appropriate as updates occur (e.g., shares are listed for sale, shares are sold, an owner changes preferences, etc.)

A live syncing cap table can be utilized in transactions at a financial exchange (e.g., at an ATS implemented at system 100). When a seller elects to sell one or more of the seller's shares, the sell order is generated on the financial exchange and can be confirmed via a broker/dealer (e.g., 130). The sell order can also be communicated to a transfer agent. At this point, system and data flow 1400 and/or components of system 100, can mark the shares as "Hold" in a corresponding live syncing cap table. As such, other actions with respect to the shares are blocked until the shares are bought or the seller elects to cancel the listing. For example, the shares cannot be listed again ("double-listed") at a different price.

Utilizing supplemental fields in live syncing cap tables for listed shares helps protect financial exchange participates (buyers, sellers, owners, etc.) from fraud. For example, a bad actor may attempt unauthorized access to, e.g., hacking, the exchange and request transferring a user's shares into the bad actor's account (without a bona fide transaction). Upon receiving the requested transfer, components of system 100 can refer to supplemental fields within a live syncing cap table corresponding to the user's shares. Components of system 100 can read a field value of "Not For Sale" from a supplemental field. In response, system 100 rejects the requested transfer because data in the live syncing cap table indicates that the user's shares are not for sale.

Contents of live syncing cap tables also help financial exchanges (e.g., an ATS implemented at system 100) comply with legal and contractual requirements. For example, live syncing cap tables can significantly reduce (if not entirely eliminate) the likelihood of an actor obtaining an undue concentration in a given asset (either intentionally or inadvertently). At least from time to time, asset owners may restrict the percent ownership that any individual, entity, group or affiliated entities, can own in an asset. Ownership restrictions may be mandated by the government, or by banker or lender terms. Ownership restrictions may also be an owner preference (for example, to maintain control).

Use of live syncing cap tables significantly increases the efficiency of tracking of ownership changes and aggregate ownership percentages. When a entity's (e.g., a person, entity, and/or group of affiliates acting in concert) asset ownership reaches or is nearing a defined ownership percentage, components of system 100 can notify an owner or administrator. For example, an owner of a multi-family apartment building may desire (or is required to) limit ownership concentration to less than 20%. The ownership concentration of 20% can be indicated in a supplemental field in the live syncing cap table for the multi-family apartment building. Components of system 100 can check a proposed purchase transaction (or a series of proposed purchase transactions) against the ownership concentration of 20%. When a proposed purchase (or series of proposed purchases) would result in an entity's ownership reaching or exceeding 20%, components of system 100 may block the transaction or, alternatively, may "pause" the transaction and notify an administrator. When a transaction is paused, the administrator can perform further investigation and can decide to allow or block the transaction.

In aspects, a transfer agent (e.g., transfer agent 106) facilitates creation, maintenance, and updates to live syncing cap tables. The transfer agent creates or generates a live syncing cap table and is configured to modify, update, and control the live syncing cap table. Other stakeholders or actors within the system can request changes to any live syncing cap table via the transfer agent.

As described, activities performed at system 100 along with corresponding results can be written to a mutable ledger, such as, primary ledger 102. Activities and corresponding results can be semi-redundantly synchronized from the mutable ledger to an immutable ledger, such as, the secondary ledger 104. Thus, system 100 (possibly through interoperation with components of system and data flow 1400 and/or components of system and data flow 1500) can create and maintain an immutable record of live syncing cap table iterations.

Use of dual syncing ledgers, allows "looking back" to see the point at which specific changes were made (e.g., a certain transaction or a certain canceled trade). Use of dual syncing ledgers also allows administrators (or other users) to pull records from a given "point in time." For example, owners can export a cap table that reflects the owner's ownership at any point in time after the owner's asset is listed and approved on system 100. The owner can also use the live syncing cap table to follow a specific member of the owner's ownership group through time (e.g., determine for how many calendar days the owner held a certain share). For example, components of system 100 can track changes to cap table entries over time. System 100 is able to keep track of this data in millisecond time stamps, for example, for use in more efficient legal and regulatory reporting.

In aspects, (e.g., continuous learning) ML components continually assess "what type of data makes up a cap table" according to different asset classes and the evolving marketplace. For example, some assets (for example, venture-backed businesses) might have a large amount of convertible debt associated with the asset's cap tables. Other assets (for example, private equity roll-ups) might have cap tables that reflect a large proportion of employee options that are allocated each year at bonus time and vest over time. Over time, the ML components refine what information is prioritized during initial data ingestion of data. The machine learning components can also refine what is produced as the template for a live syncing cap table for each different asset class.

The machine learning components can also continue to learn and refine as the overall market regulatory, legal, and/or investment environment evolves (types of ingested data). For example, it may be that regulations change and mandate different disclosures and, therefore, those disclosures begin to appear in the raw inputs from the owners. As ML components ingest the new market environment data, the new market environment data can be used to refine capabilities for cap table template(s). Alternatively, market practices may shift (for example, options vesting schedules delay from a typical average four year period to a new average six year period). As machine learning components ingest the new vesting schedule, the new vesting schedule can be utilized in calculations for new shares within the live syncing cap table (without the owner flagging those differences in the underlying paperwork for the employee grants).

In one example, a live syncing cap table can be utilized to reduce or eliminate "double trades". As descried, components of system 100 can refer to data values in a live syncing cap table. Based on the data values, components of system 100 automatically implement measures to "freeze" (or pause) trades for certain asset shares. For example, when a buyer elects to "buy" a share that has been listed for sale, for a (however brief) moment in time, the exchange performs several checks. These checks must be confirmed before the trade proceeds to settlement. The checks include, without limitation, confirming that the buyer is approved in KYC/AML screening (e.g., through reference to a supplemental field) and confirming that the buyer has the appropriate funds in the buyer's account to cover the cost of the purchase.

When a user selects or clicks "Buy" in the exchange, the components of system 100 can automatically "freeze" the shares in question. In response, the shares transition into a "Hold" status (e.g., indicated in a change to an appropriate supplemental field). As such, the shares are removed from listing and essentially in accessible for another buyer to access. In the time, e.g., milliseconds or nanoseconds, of buyer auditing, others are preventing from attempting to buy those shares (components of system 100 can send the other buyer an error message and prevent a purchase transaction).

In aspects, components of system 100 utilize live syncing cap tables for ongoing audits. Alerts can be triggered when discrepancies are detected during audit. For example, components of system 100 can continually check to see that a number of total shares initially allocated to a given asset are always represented on the live syncing cap table for the asset. If 25,000 initial shares are created for an asset (at $1,000.00 each), a live syncing cap table indicates that the total equity value of the asset is $25,000,000.00. Components of system 100 continuously determine the total value of identified shares (shares not yet claimed, shares that are claimed and are available for trading, shares that are for sale, and shares that are in the process of a transaction and, therefore, in a "Hold" status). If the total value deviates from an overall known total of $25,000,000.00, an administrator can be notified.

Components of system 100 can audit as individual shares of an asset are transferring between different users. Components of system 100 consider a live syncing cap table for an asset to be the source of truth for the asset.

As described, components of system 100 can utilize live syncing cap tables in performing continuous audits. In one aspect, as part of audit, components of system 100 compare a current version of a live syncing cap table to one or more previous versions of the live syncing cap table. For example, components of system 100 can compare cap table entries from different times to one another.

In one aspect, system and data flow 1400 creates a cap table entry per owner for an asset and combines the cap table entries into a cap table for the asset.

Referring more specifically back to system and data flow 1400, system and data flow 1400 can be utilized to create a live syncing capitalization table. As depicted in system and data flow 1400, ATS is used as an abbreviation for Alternative Trading System. As depicted in system and data flow 1400, TA is used as an abbreviation for Transfer Agent.

Generally, system and data flow 1400 facilitates creating a live syncing cap table. ATS API 1402 can ingest cap table data 1403 for an asset 1421 from an asset owner. Cap table data 1403 can include any described type of ingested data. Cap table data 1403 can be transferred to cap table formatter 1404 (e.g., in the cloud). Cap table formatter 1404 can format, standardize, and correlate cap table data 1103. Cap table formatter 1404 can interoperate with machine learning (ML) and/or artificial intelligence (AI) to identify at least columns of interest, such as tax ID, percent ownership, and initial investment. In one aspect, cap table formatter 1404 interoperates with continuous learning ML components that identify columns of interest and also (and concurrently) utilize the identified columns of interest as training data to refine their column identification capabilities.

ML components can also validate formatted, standardized, and correlated cap table data 1403 (at 1406). If errors are identified during validation, such as missing required fields, the asset owner is notified 1408. For example, an administrative entity can be notified via admin portal 1008. The asset owner can supply data for the missing fields and formatting, standardizing, and correlating can restart. If no errors are identified during validation, the formatted, standardized, and correlated cap table data 1403 can be correlated (at 1410) against existing live syncing cap tables in cap table database 1405 as well as user/entity profiles in user/entity profiles database 1407.

After correlation with existing live syncing cap tables in cap table database 1405, as well as user/entity profiles in user/entity profiles database 1407, formatted, standardized, and correlated cap table data 1403 may be flagged for additional review (1412) (e.g., via admin portal 1008). When not flagged for additional review, formatted, standardized, and correlated cap table data 1403 can be transferred to cap table creation 1414 (e.g., which is included in work product generator 1016). When flagged for additional review, formatted, standardized, and correlated cap table data 1403 can be transferred to a transfer agent (or other authoritative entity) for additional review and approval (1416) (e.g., via admin portal 1008). When the transfer agent (or other authoritative entity) approves (YES at 1416), formatted, standardized, and correlated cap table data 1403 can be transferred to cap table creation 1414. When the transfer agent (or other authoritative entity) does not approve (NO at 1416), the asset owner is notified 1108 is notified (e.g., via admin portal 1008). The asset owner can enter appropriate corrections and formatting, standardizing, and correlating can restart.

Cap table creation 1414 can create a live syncing cap table 1422 (work product 901) for asset 1421 from formatted, standardized, and correlated cap table data 1403. Live syncing cap table 1422 can include any supplemental fields and corresponding field values as described. Cap table creation 1414 can store live syncing cap table 1422 in cap tables 1405. When appropriate, other components, such as, components of system 100, components data retrieval and validation system 100, components of system and data flow 1400, components of system and data flow 1500, etc. can access live syncing cap table 1422 from cap tables 1405.

During cap table correlation 1410, it may be that formatted, standardized, and correlated cap table data 1403 identifies investors that have not been notified of shares being listed on a financial exchange (e.g., an ATS implemented at system 100). It may also be that one or more investors are not even existing users of the financial exchange and/or that formatted, standardized, and correlated cap table data 1403 lacks a way to identify the one or more investors. When an investor is not an existing user of the financial exchange (NO at 1418), an asset owner is notified 1408 to provide investor contact details. When an investor is an existing user of the financial exchange (YES at 1418), the user is notified 1420 that shares are being list at the financial exchange.

Figure 15:
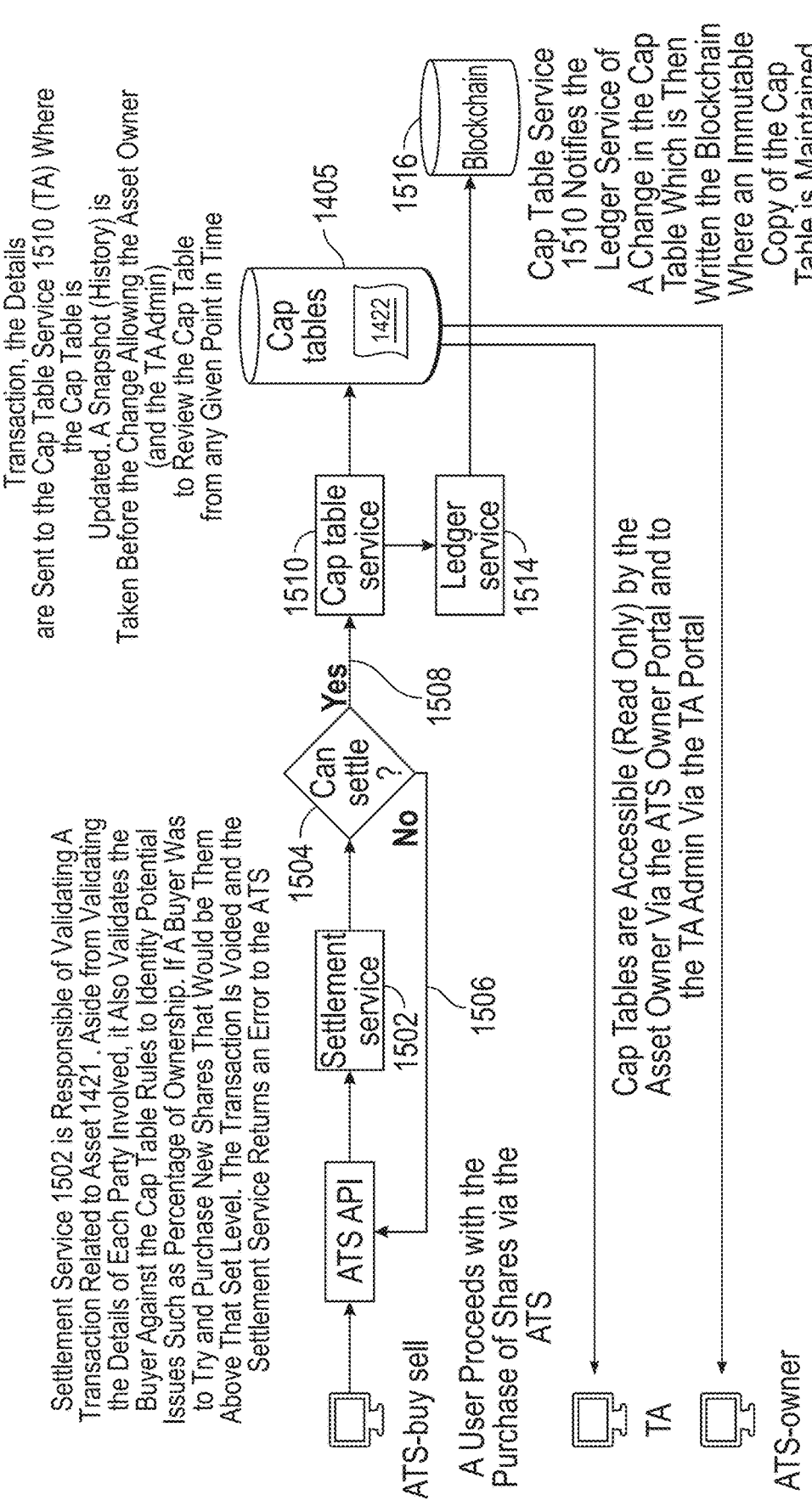
FIG. 15 illustrates an example system and flow for updating a live syncing capitalization table.

FIG. 15 illustrates example system (e.g., a cap table system) and flow 1500 for updating a live syncing capitalization table. Generally, components of system and data flow 1500 can be implemented at, included in, integrated with, and/or otherwise interoperate with components of system 100 and/or data retrieval and validation service 1000. As such, system and data flow 1500 is suitable for use with the exemplary transaction platform of the systems in FIGS. 1 and 5-7 and data retrieval and validation service 1000. System and data flow 1500 can also interoperate with components of computer architecture 1200 (possibly through interaction with system 100 or data retrieval and validation service 1000), such as, for example, to ingest an asset valuation for use in updating a live syncing cap table or for use in creating a live syncing cap table. As depicted in system and data flow 1500, ATS is used as an abbreviation for Alternative Trading System. As depicted in system and data flow 1500, TA is used as an abbreviation for Transfer Agent.

Generally, system and data flow 1500 facilitates updating a live syncing cap table. For example, system and data flow 1500 can update a live syncing cap table for an asset by deriving new cap table entries corresponding owners involved in a transaction for part of the asset. System and data flow 1500 can remove existing cap table entries for the owners involved in the transaction from the live syncing cap table. System and data flow 1500 can include the new cap table entries for the owners involved in the transaction in the live syncing cap table. When an existing owner sells their entire interest in an asset, a cap table entry for the existing owner is removed from a live syncing cap table with no new cap table entry being created.

In one aspect, system and data flow 1500 updates live syncing cap table 1422. Live syncing cap table 1422 can be updated automatically when a transaction related to asset 1421 settles. Settlement service 1502 can validate when a buyer proceeds with a buy/sell transaction for shares in asset 1421 via the ATS (e.g., through an ATS API). During transaction validation, settlement service 1502 validates the details for each party involved in the transaction and validates the buyer against the cap table rules to identify potential issues including, without limitation, percentage ownership, are shares on hold, are shares for sale, etc. In one aspect, settlement service 1502 refers to supplementals fields in live syncing cap table 1422 to check cap table rules.

Settlement service 1502 determines whether the transaction can settle (1504). For example, if a buyer attempts to purchase new shares in asset 1421, settlement service 1502 determines if owning the new shares would position the buyer above a set percentage ownership level (possibly through reference to supplemental fields in live syncing cap table 1422). If not, settlement service 1502 permits the transaction to settle (YES at 1504). On the other hand, if purchase of the new shares would position the buyer above the set percentage ownership level, the transaction is at least paused, and potentially voided (NO at 1504). In one aspect, when a transaction is voided, the buyer is notified 1506. In another aspect, when a transaction is paused, the transaction detail can be submitted to a transfer agent or administrator for further review. The transfer agent or administrator then decides if the transaction can settle and, if not, the buyer is notified 1506.

When the transaction is permitted to settle (either automatically or through human intervention), settlement service 1502 settles the transaction (moving shares, fiat currency, etc., between accounts). Settlement service 1502 sends transaction details of the settled transaction to cap table service 1510 (e.g., which may be included in work product generator 1016). Cap table service 1510 can utilize the transaction details to update live syncing cap table 1422, such for example, adding a cap table entry for a new investor, updating share amounts in cap table entries, removing a cap table entry for an investor, etc.

In some aspects, a snapshot or history of live syncing cap table 1422 is taken prior to updating. Taking a snapshot or history allows the asset owner and/or the transfer agent to review live syncing cap table 1422 from any given point in time.

Cap table service 1510 (or the transfer agent) notifies ledger service 1514 of the update to live syncing cap table

1522. Ledger service 1514 can write the update to a mutable ledger (e.g., ledger 102). Ledger service 1514 can also sync the update to an immutable ledger (e.g., ledger 104, blockchain 1516) maintaining an immutable copy of the update and also an immutable copy of live syncing cap table 1422.

In aspects, live syncing cap tables in cap tables 1405 are read only to settlement service 1502, the transfer agent, and the owner.

Generally, any models utilized by system and data flow 1400 and/or system and data flow 1400 can be models included in a constant training cycle implemented at system 100 and/or at data retrieval and validation service 1000 to improve creating live syncing cap tables, creating cap table entries, updating live syncing cap tables, and updating cap table entries. For example, model trainer 1018 can train and improve models, the performance of the asset detail extractor system 1002 and the asset detail finder system 1004. Training can be based on the approval/rejection processes in Phase III, other human feedback, (confirmed) relevancy of items include in collected data, confirming depicted property features are features of a real property asset, validation findings, etc. Improvements based on training can include improving creating live syncing cap tables, creating cap table entries, updating live syncing cap tables, and updating cap table entries Model trainer 1018 can train models (as well as other AI and/or ML components within data retrieval and validation system 1000) as part of a constant training cycle to improve the search and validation process and creating live syncing cap tables, creating cap table entries, updating live syncing cap tables, and updating cap table entries concurrently with deriving work product 901 (e.g., a live syncing cap table) and/or performing other operations at data retrieval and validation system 1000. Training models to improve creating live syncing cap tables, creating cap table entries, updating live syncing cap tables, and updating cap table entries can occur concurrently with one or more of: an approval rejection process, a rejection/approval decision, confirming depicted one or more property features are features of a real property, confirming the relevancy of one or more items in collected data, listing an asset on the Exchange, approval for insurance coverage, moving forward in a different administrative process, creating live syncing cap tables, creating cap table entries, updating live syncing cap tables, updating cap table entries, deriving one or more other asset characteristics for an asset, as well as any other described data collection, data validation activities, or work product related activities, etc.

Derived Asset Characteristic-Capitalization Rate, Net Operating Income

In this description and the following claims, capitalization rate (or "Cap Rate") is defined as a valuation measure to compare assets. Cap Rate can generally be calculated as a ratio between (e.g., annual) Net Operating Income (NOI) produce by an asset to the Asset Valuation. For example, Cap Rate may be calculated according to Equation 1.

$$\text{Capitalization Rate} (Cap \text{ Rate}) = \frac{}{\text{Net Operating Income} (NOI)/\text{Asset Valuation}} \quad \text{Equation 1}$$

More specific to real estate, Cap Rate can be calculated as a ratio between annual rental income to current market value. Some variations of Cap Rate depend on the definition of the annual NOI (e.g., rental income) and whether it is gross or net of annual costs, and whether the annual NOI is the actual amount received (initial yields), or the potential rental income that could be received if the asset was optimally rented (ERV yield).

Aspects of the invention can minimize, and possibly fully eliminate, dependency on lagging data factors when deriving an asset valuation for an asset. Net Operating Income can be efficiently calculated, re-calculated, and updated via access (e.g., on a live/regular basis) to asset owner financials relevant to the asset. Through interoperation with algorithms, models, mini models, etc. components of system 100, data retrieval and validation system 1000, computer architecture 1200, system and data flow 1400, system and data flow 1400, etc. can calculate an asset valuation and NOI from ingested data and determine if the calculated asset valuation and/or NOI is correct in view of ingested data. Appropriate adjustments, corrections, etc. can be made to facilitate accuracy and prevent fraud, mistakes, disingenuous behaviors, etc.

Aspects of the invention can create and maintain an essentially real-time cap rate from different data sources.

Years of historical Cap Rate data, including data from hundreds of sources of macro- and micro-economic data related to Cap Rates exist. The historical cap rate data from these sources can be combined and used to train and test cap rate models. After training, the cap rate models can predict what the Cap Rate was at a specified time in history (e.g., 5 years ago) in any given market. The cap rate models can also predict a current real-time cap rate. The predicted current real-time cap rate can be predicted within some standard deviation of an actual current real-time cap rate. As such, a financial system (e.g., an ATS implemented at system 100), can utilize NOI data along with predicted current real-time cap rate to derive asset valuations for otherwise illiquid assets. For example, valuation module 1201 can value assets daily, or even hourly, creating liquidity and a more efficient market.

Aspects of the invention can minimize (or even fully eliminate) reference to lagging data when deriving (or approximating) a property value (e.g., in accordance with Equation 1). In one aspect, a Cap Rate is approximated to within One standard deviation of other industry sources. 68% of data falls within One standard deviation. In less stable markets, a Cap Rate is approximated within 0.5 standard deviation.

Figure 16:
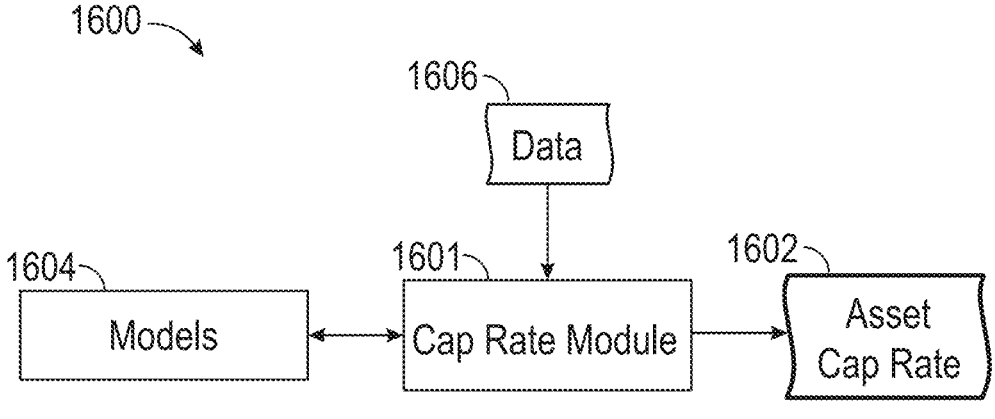
FIG. 16 illustrates an example computer architecture that facilitates digitally deriving an asset capitalization rate.

FIG. 16 illustrates an example computer architecture that facilitates digitally deriving an asset capitalization rate. Computer architecture 1600 can be implemented at and/or using the components of system 100 and/or data retrieval and validation system 1000. As such, computer architecture 1600 is suitable for use with the exemplary transaction platform of the systems in FIGS. 1 and 5-7.

As depicted, computer architecture 1600 includes cap rate module 1601 and models 1604.

Generally, cap rate module 1601 can derive (e.g., calculate, re-calculate, revise, update, etc.) an asset cap rate for any of a variety of different assets and asset types from relevant data associated with an asset. For example, cap rate module 1601 can derive an cap rate for assets and asset types, including, but not limited to, real estate (real property), natural resources, natural resource extraction operations, independent valuations, independent appraisals, private debt, private credit, any other described asset types, including other appropriate valuations for real and non-real assets.

In one aspect, components of computer architecture 1600 are included in, accessed by, integrated with, and/or interoperate with data retrieval and validation system 1000. Thus, as part of deriving an asset cap rate, data retrieval and validation system 1000 can collect and validate data 1606. Cap rate module 1601 can derive asset cap rate 1602 from data 1606. In one aspect, data 1606 is data that was previously collected by and validated at data retrieval and validation system 1000. For example, data 1606 can be data purported to be associated with an asset and subsequently confirmed by data retrieval and validation system 1000 as being relevant to the asset.

Cap rate module 1601 can interoperate with models 1604 as part of asset cap rate derivation (e.g., of asset cap rate 1602). Models 1604 can include artificial intelligence (AI), machine learning, and/or other appropriate models and/or algorithms. As such, cap rate module 1601 can employ AI models when deriving an asset cap rate from selected/validated data.

In one more specific aspect, work product generator 1016 includes, accesses, is integrated with, and/or interoperates with components of computer architecture 1600, such as, for example, cap rate module 1601 and models 1604. As such, it may be that work product generator 1016 (e.g., utilizing valuation module 1601 and models 1604) derives an asset cap rate.

More generally, models 1604 can be models included in a constant training cycle implemented at system 100 and/or at data retrieval and validation system 1000 to improve deriving asset cap rates. For example, model trainer 1018 can train and improve models 1604, the performance of the asset detail extractor system 1002 and the asset detail finder system 1004. Training can be based on the approval/rejection processes in Phase III, other human feedback, (confirmed) relevancy of items include in collected data, confirming depicted property features are features of a real property asset, validation findings, etc. Improvements based on training can include improving asset cap rate derivation.

Model trainer 1018 can train models 1604 (as well as other AI and/or ML components within data retrieval and validation system 1000) as part of a constant training cycle to improve the search and validation process and asset cap rate derivation concurrently with deriving work product 901 (e.g., asset cap rate 1602) and/or performing other operations at data retrieval and validation system 1000. Training models 1604 to improve deriving asset cap rates can occur concurrently with one or more of: an approval rejection process, a rejection/approval decision, confirming depicted one or more property features are features of a real property, confirming the relevancy of one or more items in collected data, listing an asset on the Exchange, approval for insurance coverage, moving forward in a different administrative process, deriving an asset cap rate, deriving one or more other asset characteristics for an asset, as well as any other described data collection, data validation activities, or work product related activities, etc.

Derived asset cap rate 1602 (one example of an asset characteristic) can be provided to and/or utilized by sellers, buyers, investors, modules in system 100, valuation module 1201, modules of system (e.g., a cap table system) and data flow 1400, modules of system (e.g., a cap table system) and data flow 1500, etc.

A plurality of factors can be considered when deriving a Cap Rate. Each factor can include one or more sub components data sources. Data retrieval and validation system 1000 can ingest and validate data associated with factors and any corresponding one or more sub component data sources and include ingested, validated data in data 1606. Aspects of the invention can also consider dynamics and causal relationships between data subcomponents of different main factors. For example, it is not always clear whether fuel prices directly influence energy costs or if other factors come into play, such as supply chain disruptions or geopolitical events. Interactions between various subcomponents can be intricate and nonlinear.

A plurality of interoperating components (e.g., AI, ML, continuous learning ML, etc.) can be included in models 1604 and can be used to calculate different sub parts of a Cap Rate. The sub parts are then combined to derive the Cap Rate. The plurality of interoperating components can account for the described dynamics, causal relationships, intricacies, and non-linearity in ingested data when deriving a Cap Rate based on data spanning a plurality of sub component data sources. The plurality of interoperating components can use at least one or more of: Granger Test, SEM, causal inference, and graphs when accounting for the described dynamics, causal relationships, intricacies, and non-linearity.

The plurality of interoperating components can utilize the same historical periods when ingesting data that spans different sub component data sources.

In one aspect, additional micro models (e.g., included in models 1604) are used for industry subcomponents. The additional micro models can model major components and minor components utilized to derive a Cap Rate. In another aspect, Cap Rate is considered in view of debt and equity components. Cap Rate can be calculated like a Capital Asset Pricing Model (CAPM) risk-free rate. Particular to commercial real estate (CRE) a CAPM formula may not fully capture the nuances of CRE and return. CRE often includes not only systematic but idiosyncratic risk. This is due at least in part to CRE investments being less liquid and more location-specific than the broad market securities typically analyzed using CAPM.

Thus, it may be that a Cap Rate derivation model that derives a real-time Cap Rate is a series of several micro models. The series of the micro models can produce a number(s) that are used in other models to facilitate tuning to an appropriate Cap Rate outcome. This modular approach facilitates specialization in modeling different factors and/or for different asset types. For example, a one series of micro models can be used for to derive a Commercial Real Estate (CRE) cap rate, another different series of micro modules can be used to derive a private credit cap rate, etc. From a Micro and macro perspective; interconnectedness facilitates a dynamic and iterative process where different components are continuously refined to achieve the most accurate Cap Rate.

Different Cap Rate factors can be weighted differently relative to one another and relative to other cap rate components. Some Cap Rate factors may be more indicative of Cap Rate direction. Other Cap Rate factors may be more core to getting the actual number of a Cap Rate in a sub market. For example, changing of interest rates or inflation, may correlate more directly to the direction Cap Rates move and correlate less directly to a number for a Cap Rate in a market. In contrast, the location, rent growth and class of an asset may correlate more directly to a derived final Cap Rate number.

In one aspect, appropriate components (e.g., AI, ML, continuous learning ML, etc.) utilize ingested data (e.g., in data 1606), for example, Asset Class (type) to derive range of Cap Rates instead of a single "exact" or single "approximated" Cap Rate number. In these aspects, derived Cap Rate ranges can be overlapping Cap Rate ranges.

In more specific aspects, Cap Rate Direction, Cap Rate Number, and Cap Rate Range components (models) are utilized to derive one or more of: a Cap Rate, a Cap Rate Range, or multiple, and potentially overlapping, Cap Rate Ranges. Probabilities and confidences can be associated with Cap Rates and Cap Rate Ranges.

In some aspects, appropriate components create a desirability index for living in a submarket. The desirability index can provide extra precision to the "why". A desirability index can consist of multiple sub components from different major components such as but not limited to: Cost of living, crime, job growth, rent growth and occupancy. Desirability can be fundamentally linked to location, accurately defining a market or submarket becomes a prerequisite for determining Cap Rate. A standardization approach can be utilized to account for how different data sources define market boundaries (and which otherwise may lead to inconsistencies).

As described, appropriate components can derive a Cap Rate range helping investors assess their risk tolerance. For example, a Cap Rate range can include: 1) a base case (standard assumption, the most likely scenario based on current market conditions and standard assumptions), 2) a better (or best) case (more aggressive Cap Rate if market conditions appear to continue in a favorable direction), 3) a worse (or worst) case (for the conservative investor that doesn't have an appetite for risk). A Cap Rate score can also be associated with a derived confidence score (which may or may not be published) used to help categorize Cap Rates by "risk range". Cap rate module 1601 can derive Cap Rate ranges with additional gradients of Cap Rates surrounding a base case, such as, for example, best, better, base, worse, worst, etc.

In some aspects, there is a correlation between ingested data from an historical perspective and comparing that result to the Cap Rate in the marketplace (as well as the movement past that historical point and what influenced that point). Linear as well as non-linear relationships in real estate and other asset classes (types) can be considered. Also, the strength or direction of correlations or relationships may evolve with the market due to the time-sensitive nature of these relationships.

Some example correlations include: (1) Comparing insurability according to the region and its impact on Cap Rate. (e.g., Florida insurers that have left the market after hurricane claims, which has dramatically increased rates due to the lack of supply). (2) Determining an impact market "shock" events have had on Cap Rate and whether there was a lag. (3) Comparing Cap Rate (Market Value) with historical gold prices (since this is known as one of the safest proxies). Determination of how this compares with the relationship between Cap Rate direction after Quantitative Tightening (QT) and Quantitative Easing (QE) by the Fed.

In one aspect, unstructured data, such as, social media data, is standardized by data retrieval and validation system 1000 into structured data using described standardization and formatting techniques.

In various example aspects, data retrieval and validation system 1000 collects and validates at least five different types of data: Rent Growth, G D P and Unemployment, Economic Cycle Stage, Location, and Asset Class. Data retrieval and validation system 1000 can include any of the five types of data in data 1606.

More specifically, rent growth data can include any of: Rental (lease) renewal rates (might be a component to desirability to indicated satisfaction), Rental concessions (loss to lease) such as month free to move in, Eviction rates, Rental income by property type and location, Operational costs such as insurance/taxes/utilities, Transaction volume sales/rentals, and any user specific data.

GDP and Unemployment data can include any of: GDP growth, Local unemployment and growth by sector, Data on employment trends in key sectors (e.g. tech, manufacturing, tourism) that dominate the local economy (may predict economic stability/desirability), Labor force participation rate, Economic diversity Index, Median household income for area, Portion of income spent on housing, Family composition (e.g. full family or not), Per capita income, Consumer spending, and Consumer price expectations Economic Cycle Stage data can include any of: Interest rates, Inflation, Treasury yields, Local taxes, Money supply metrics, REIT performance data, Dividends, Acquisitions, and Percentage of Unsecured Debt.

Location data can include: Migration (Population growth/decrease rate), Home prices (trends, housing starts, inventory), Mortgage rates, Hotel prices and occupancy rates, Airbnb prices and occupancy rates, Fuel prices, Auto & foot traffic increase/decrease (social mobility data), Areas with high social mobility and strong educational institutions often attract long-term investment and higher demand for housing and commercial properties (e.g. can use data on social mobility indices, school performance metrics, education attainment), Building permits for new builds, Zoning size and changes (e.g. how much is available for a certain asset class), Construction cost index, Opportunities zones, announcements ("housing and entertainment developments, closing of plants & schools & shopping, etc."), Property locations relative to key infrastructure/public transportation, airports networks/amenities, POIs (Starbucks, grocery stores, hospitals, schools, cultural, recreational), GIS based risk assessment; hurricanes/flood zones/earthquakes/tornadoes, Data from local news/forums/Google keywords/social media, Real estate lending data, Principal vs. debt rate, Delinquency rates, Rental application volume, Real estate sales to foreigners, Business climate data (taxes, opportunities for small business, i.e. a lot of startups went to Texas), Corporate profitability (especially key industries), Direct foreign investments, Retail vacancy rates, State legislation taxes/fees on acquiring/selling real estate, Weather, Walkability score, Air quality, Green spaces, Affordability index, Data on gentrification, Urbanization rates, Tourism data, and Epidemic risk (lockdown events)

Asset Class data can include any of: Availability, Occupancy, and Supply vs demand.

When defining a Cap Rate derivation model (or models), various factors can be considered for each component of the Cap Rate derivation to facilitate well-defined, relevant, and contributory components meaningfully to the overall objective.

Factors can include:

Purpose and Objective: A Cap Rate model can include well-defined, relevant, and contributory components. The purpose and object of each component can be considered. For example, what does the component contribute to overall Cap Rate derivation. An objective for each component can be clearly defined. Each component can include a specified purpose that aligns with the broader goal of the model or system. For example, if a goal is to estimate Cap Rates, the component can focus on a factor that influences Cap Rates.

Relevance and Impact: The influence of the component on outcome can be considered. Is the component a primary driver or a supporting factor. The relevance of each component to the outcome can be assessed. For example, what is the significance of a component on a Cap Rate result, either directly (as a primary driver) or indirectly (as a supporting factor).

Scope and Boundaries: What specific elements fall within this component, and what should be excluded. A component scope can be defined by identifying what specific data, variables, or factors the component will include. Appropriate scope can ensure the component is neither too broad (overlapping with other components) nor too narrow (missing important aspects).

Measurability and Data Availability: Is a component quantified or measurable with available data. For example, can the component be supported by reliable, quantifiable data. If the data is not available or difficult to measure, the component may need to be redefined or refined.

Interdependence and Interactions: How does this component interact with others. Are there dependencies or overlaps. Relationships between components can be considered. Dependencies, correlations, or potential overlaps can be identified to minimize (or even avoid) redundancy and ensure that the model captures the interactions between different components effectively (think about causality). Minimizing redundancy correspondingly minimizing inefficient use of computer system resources by minimizing redundant calculations at a system such as an ATS at system 100.

Adaptability and Flexibility: Can this component adapt to changing conditions or new information. Components can be flexibly designed to adapt to incorporate new data, insights, or changing market conditions. As such components and Cap Rate Derivation models can remain sufficiently relevant and accurate over time. Adaptability and flexibility can include data frequency (e.g. is it a static/constant component that defines the environment/scope?)

Simplicity and Clarity: Is the component easy to understand and implement without oversimplifying. Components can be simply designed while maintain effectiveness. A component can be clear enough to be understood and applied by stakeholders but comprehensive enough to capture appropriate complexity.

Validation and Testing: How a component is to be validated and/or tested withing a Cap Rate derivation model can be considered. It can be defined how a component's effectiveness is to be validated. Validation can include testing against historical data, cross-validation with other models, or scenario analysis. Validation helps ensure that a component appropriately contributes to the model's predictions.

For example, when designing a component related to "Location and Market Conditions" the following factors can be considered:

1. Purpose: Focus on how geographic and market-specific factors influence property values.
2. Relevance: Ensure this is a major factor that directly impacts Cap Rates (Literature review, data analysis, align with economic theory, expert consultation, scenario analysis, backtesting, impact assessment)
3. Scope: Include elements like population growth, infrastructure development, and local economic indicators, while excluding broader macroeconomic factors covered by other components.
4. Measurability: Use available data like census reports, real estate market data, and GIS information.
5. Interdependence: Consider how location interacts with rent growth and economic fundamentals.
6. Adaptability: Allow for updates with new infrastructure projects or zoning changes.

7. Simplicity: Keep the focus on critical, high-impact factors without overcomplicating.
8. Validation: Test against historical trends in various markets to ensure accuracy.

Such a framework helps ensure that each component is thoughtfully defined, contributing to a cohesive and effective overall model.

In one aspect, components of a Cap Rate derivation model are designed to meet some, many, most, or all of the described objectives, also considering how different objectives of different components interoperate, contribute, and/or impact one another. For example, the purpose and objective of one component may enhance or degrade the scope and boundaries of another component, etc.

Some example components (models) can include:
1. Rent Growth→(Rental/RE) Market Dynamics and Profitability
   Include Market liquidity and credit conditions
2. GDP and Unemployment+Stage in Economic Cycle→Economic Environment
3. Location and Market Conditions (consider including regulatory environment here)
   Factors: Tax policies, property taxes, rent control laws, zoning changes, and environmental regulations
4. Environmental and Social Governance (ESG) Factors
   Factors: Sustainability initiatives, green certifications, social impact considerations, and the adoption of ESG criteria by investors.
5. Asset Class→Property Characteristics and Classification Factors: Property type, condition, occupancy rates, and market positioning (i.e. asset specific data/factors)

As such, aspects of the invention can account for incomplete data, complex, possibly non-linear data relationships and extracting actionable insights despite uncertainties.

Components can be designed to understand cause-and-effect relationships between different factors or variables in a system by developing standardized methods and metrics that can be used across teams. Causal inference can be used with constraints. Causal inference can be used to estimate, approximate, or even determine whether a causal relationship exists between different ingested data. Instrumental variables can be utilized when unobserved factors affecting independent variables and/or dependent variables are suspected.

Complex phenomena can be deconstructed into their individual components to better understand each part. In modeling, this could mean creating micro models for specific factors like rent growth or GDP and analyzing them separately before integrating them into the overall model.

Reductionism may be limited to specific components. For example, individual components may change depending on the broader context in which they operate or there may be oversimplification of interactions or ignorance of interdependencies. In one aspect, agent-based modeling is utilized to approximate reductionism. Agent-based modeling can be used to better account for individual behaviors and interactions that lead to complex and/or unpredictable outcomes. Agent-based modeling can also capture emergent behavior and possibly facilitate hierarchical modeling.

A Cap Rate derivation model or models (e.g., included in models 1604) can be considered as a complex system, that is as more that a sum of parts taking into account intricate interactions and feedback loops. Considering a Cap Rate derivation model as a complex system acknowledges that relationships between components are often non-linear and that the system's behavior cannot always be predicted by analyzing individual parts in isolation. Network theory, such as, community detection or Bayesian networks can be utilized to reveal dependencies and/or relationship.

Specialized micro models can be developed for additional components like market liquidity, investor sentiment, and detailed demographic trends. These micro models can be integrated into a Cap Rate derivation model improving predictive accuracy and providing more granular insights.

A Cap Rate derivation model can include a robust data integration framework (e.g., through interoperation with data retrieval and validation system 1000) that increases consistency across data sources, aligns historical periods, and synchronizes datasets. Data harmonization and integration helps maintain the accuracy and reliability of the models (data normalization, preprocessing, standardization, transformation, time-series alignment, etc). Alternative data sources, such as, crowdsourced information, unstructured data (social media, local news), and satellite imagery, can be leveraged to provide unique insights and refine a Cap Rate derivation model.

A risk management framework and confidence scoring can use probabilistic modeling to better understand and communicate risks associated with different Cap Rate outcomes. A risk management framework can include a scenario analysis (base, best, worst cases) and a confidence scoring mechanism.

Components of a Cap Rate derivation model can be designed for scaling to additional markets and incorporating real-time data and/or alternative data. This helps keep the model adaptable and relevant as market conditions evolve.

General implementation of a Cap Rate derivation system, such as, depicted in computer architecture 1600 can take into account various considerations and include various functionalities. A cap rate derivation system can Define Strategic Objectives and Scope. Objective setting can include establishing precise goals, such as achieving Cap Rate predictions within specified (e.g., 0.5, 1, etc.) standard deviation of industry benchmarks and can also include risk management goals. Market focus can include beginning with a pilot in selected markets (e.g., Dallas/Fort Worth, Atlanta, Jacksonville, Phoenix) to test and refine the model. Performance metrics can include defining key performance indicators/metrics (KPIs/metrics) for accuracy, robustness, and consistency across markets/conditions. Metrics can track the model consistency over time and not just across different market conditions.

A cap rate derivation system can include Advanced Data Collection and Integration. Data source identification can include a Catalog of comprehensive data sources, including traditional (economic indicators, real estate metrics) and non-traditional (social media, GIS data). Data provenance and governance protocols can also be tracked. Data Harmonization can implement ETL (Extract, Transform, Load) processes to synchronize data across different historical periods and formats, ensuring temporal alignment. Data Quality Assurance can deploy advanced data validation techniques (e.g., anomaly detection, outlier analysis, bias detection) to maintain high data integrity.

A cap rate derivation system can include Micro-Model Development and Integration Component-Level Models (sub-component Models) can be enveloped micro-models tailored to each Cap Rate component (e.g., Rent Growth, GDP & Unemployment, Economic Cycle, Location, Asset Class) using advanced statistical methods (e.g., multivariate regression, time-series forecasting, machine learning). Ensemble Techniques can integrate micro-models using ensemble learning techniques (e.g., stacking, boosting) to optimize prediction accuracy and reduce variance. A Modular Architecture Design (distributed computing framework) can allow individual model components to be updated or replaced without disrupting the overall system.

A cap rate derivation system can include Standardization and Consistency. Market Boundary Definitions create standardized definitions for market boundaries across all data sources, employing spatial analysis tools (e.g. GIS). Normalization Protocols can apply advanced normalization techniques (e.g. z-score normalization, min-max scaling) to ensure comparability of data across diverse datasets. With the constant influx of data coming in that represent new markets, etc., the normalization process must be adaptive. It also should include dynamic scaling to handle shifts in data distribution, especially with real-time data. Cross-Validation can implement k-fold cross-validation for model training to ensure robustness and prevent overfitting.

A cap rate derivation system can include Causal Analysis and Advanced Model Tuning. Causal Inference can utilize sophisticated causal inference techniques (e.g. Granger causality tests, Structural Equation Modeling) to identify and quantify the impact of key factors on cap rates. Non-Linear Modeling can incorporate non-linear modeling approaches (e.g. neural networks, decision trees) to capture complex relationships between variables. Feedback Mechanisms can establish dynamic feedback loops to continuously adjust model parameters based on real-time market data and performance metrics.

A cap rate derivation system can include Testing and Calibration. Benchmarking can Continuously benchmark model outputs against industry standards and historical data, using statistical tests (e.g., t-tests, ANOVA) to ensure alignment within the desired standard deviation. Sensitivity Analysis can conduct extensive sensitivity analysis to understand the impact of different variables and market conditions on model outputs. Scenario diversity will be helpful here as well. Scenario Simulation can develop scenario-based simulations (e.g. Monte Carlo simulations) to evaluate model performance under various hypothetical market conditions.

A cap rate derivation system can include Deployment, Monitoring, and Automation.

Deployment Strategy can use cloud-based platforms and native features for scalable deployment, ensuring the model can handle real-time data inputs and produce on-demand estimates. Continuous Monitoring can implement automated monitoring systems with alerts for performance deviations, using metrics such as Mean Absolute Error (MAE) and Root Mean Squared Error (RMSE). Bias and drift in both the data and the models can be monitored. Automated retraining protocols can trigger when new data is available or when model performance drops below a predefined threshold (e.g. as part of continuous training cycle).

A cap rate derivation system can include Advanced Reporting and Visualization. Dynamic Reporting can create interactive dashboards (e.g. using Tableau, Power BI) for stakeholders to explore Cap Rate predictions, underlying data, and risk assessments. Confidence Intervals can Provide confidence intervals and prediction intervals alongside Cap Rate estimates to convey the uncertainty and reliability of predictions. Risk Assessment Tools can be developed that categorize Cap Rates into risk ranges (e.g., base case, best case, worst case) with corresponding confidence scores.

A cap rate derivation system can include Iterative Feedback and Continuous Improvement. User Feedback Integration can regularly solicit feedback from end-users (e.g., investors, analysts) and integrate insights into model updates and refinements. Continuous Learning can implement a continuous learning loop where the model evolves based on new data, feedback, and emerging market trends. Performance Audits can schedule regular performance audits to assess the model's accuracy, bias, and alignment with changing market conditions.

A cap rate derivation system can include Scalability and Future-Proofing. Market Expansion. Models can be gradually scaled the to additional markets, incorporating regional specifics into the model architecture. Cloud-Based Automation can leverage cloud infrastructure (e.g., AWS) for scalable data processing and model training, ensuring the system can adapt to increasing data volumes and complexity. Future-Proofing can anticipate and incorporate future data sources (e.g., IoT, real-time transaction data) and emerging modeling techniques (e.g., deep learning, blockchain integration) to maintain a competitive edge.

Accordingly, aspects of the invention ensure that Cap Rate derivation models and corresponding components are both effective and practical, balancing accuracy with real-world applicability. Aspects include utilize multiple micro models to capture various factors influencing Cap Rates, and the recognition of different component types (Direction, Number, and Range), into a structured approach to model development. The creation of a Desirability Index for submarkets adds an innovative layer of precision to understanding Cap Rate variations.

While specialization can boost accuracy, aspects ensure that the models remain generalizable across different markets and conditions (i.e., consider overfitting). Components can be calibrated and the transparency of which micro models apply for each market can be provided (e.g. scope/profile of the model). Balancing model complexity with the ability to adapt to new data facilitates robustness and scalability as Cap Rate models are refined and deployed.

In aspects, cap rate module 1601 can utilize models 1604 to derive asset cap rate 1602 from data 1606 using both a base component and a dynamic overlay component. For example, Cap rates can be (potentially highly) dependent on one or more of: macroeconomic conditions, market cycles, and location-specific risks, which cannot be fully captured using a single static model.

Each factor may influence cap rates differently based on its magnitude, volatility, and interactions with other factors. Since economic factors change over time, it may be difficult for a static regression model to adapt to macroeconomic fluctuations. Additionally, there can be lagged effects, as well as different responses in recession vs. expansion and thus a single equation cannot capture these changes. To more accurately calculate cap rate, dynamic risk-based adjustments must be accounted using the Equation 2:

$$Cap\ rate_{Final} = Cap\ rate_{Basci} + \sum Dynamic\ adjustments \quad \text{Equation 2}$$

In one aspect, a first base model is a (e.g., more) static, high(er)-performance model using ensemble learning methods. The first base model may capture the general structure and cross-sectional logic of a cap rate. In one implementation, the first base component model may be determined using a bagging ensemble learning method with random search. The ensemble learning method improves model accuracy and stability by training multiple models on random subsets of the training data, then aggregating their predictions (e.g., averaging for regression, voting for classification, etc.). Random search is an optimization method that explores the hyperparameter space by randomly sampling different combinations of hyperparameters and evaluating their performance to find the best configuration. Since cap rates are influenced by micro and macro factors, the base model may be defined as a regression-based model according to Equation 3:

$$Cap\ rate_t = \beta_0 + \beta_1 + \beta_2 + \beta_3 + \beta_4 + \beta_5 + \beta_6 + \beta_7 + \beta_8 + \varepsilon_{t,}, \quad \text{Equation 3}$$

where $\beta_1$ – rent growth volatility $\beta_2$ – location risk $\beta_3$ – asset class $\beta_4$ – GDP growth $\beta_5$ – unemployment $\beta_6$ – stage in economic cycle $\beta_7$ – inflation $\beta_8$ – interest rates $E_t$ – error A second dynamic overlay component is designed to capture temporal volatility, macroeconomic interdependencies, and behavioral shifts. Market reactions to factors like inflation or unemployment often lag or shift suddenly due to shocks or turning points in the economic cycle. The dynamic overlay component may consist of time-series and regime-switching models. A regime-switching model is a statistical model that assumes a time-series data is generated by multiple hidden states or "regimes", each with its own distinct probability distribution and parameters, allowing for modeling of dynamic and complex patterns in time series data.

In the example of cap rates, determination of pricing is a function of trends, volatility and sentiment threshold points. Each of these factors may be layered systematically in the dynamic overlay component to improve pricing accuracy. Cap rate module 1601 may build and validate each of these into the dynamic overlay component. Generalized Autoregressive Conditional Heteroskedasticity (GARCH) may be used to measure volatility. GARCH is a statistical model used to forecast volatility in financial and economic time series by analyzing patterns in past price movements and volatility, helping with risk management and portfolio optimization. For example, GARCH may be used to capture periods of stable and volatile rent growth to adjust cap rate risk premiums, including fluctuations (e.g., high periods vs stable periods). Markets react to volatility, not just average rent growth. The risk premiums may be adjusted dynamically (e.g., higher volatility leads to higher cap rates).

Similarly, Vector Autoregression (VAR) model may be used for lagged economic effects and is a multivariate time series model that describes the dynamic relationships between multiple time series variables, where each variable is modeled as a linear function of its own past values and the past values of other variables. For example, VAR may be used to capture interdependencies between GDP growth, unemployment, and cap rates. GDP growth in the present day may affect cap rates months or years later. VAR may capture the economic dependencies including time lags and quantifies the effect of economic shocks using impulse response functions. VAR may also be used with a threshold to adjust cap rates non-linearly when inflation or interest rates cross critical levels. Investors react only when rates cross critical points. Threshold regression dynamically adjusts cap rates when inflation or rates hit pre-defined breakpoints.

A hidden Markov model (HMM) model may be used for detecting hidden economic regimes, in which the observations are dependent on a latent (or hidden) Markov process where a sequence of possible events in which the probability of each event depends only on the state attained in the previous event. For example, HMM may be used to detect economic regime switches that impact investor risk perception. Hidden economic states may be identified, and cap rates adjusted based on regime changes.

Bayesian Structural Time Series (BSTS) may be used for long-term location risk trends. BSTS is a statistical technique used for time series analysis, forecasting, decomposition, and feature selection, offering advantages over traditional methods like Autoregressive Integrated Moving Average (ARIMA) by incorporating prior knowledge and uncertainty. For example, BSTS may be used to adjust cap rates based on long-term location risk trends.

In one implementation, GARCH, VAR, or HMM models may be systematically implemented either alone or in combination, to enable dynamic (re) derivation of a cap rate based on both historical behavior and emerging shifts.

Accordingly, cap rate derivation includes generating real-time estimates as opposed to outdated cap rates based on market value determined by comparables received, processed, and published well behind the actual event of the property's transaction. The present invention allows for more accurate cap rate derivation, including accounting for situations where there may be limited data in markets with smaller sales activity. Real-time cap rate derivation at a higher transaction volume platform (e.g., system 100) may impact resource allocation due at least in part to the efficiency, performance, and scalability of the models. Training a model may take hours, days, or even weeks if resources are not allocated property. Wasting time on inefficient models means slower experimentation and deployment. Similarly, poor allocation of resources across multiple machines or nodes may lead to bottlenecks leading to one overloaded server while others sit idle. There may be monetary costs regarding compute resources in addition to power and maintenance costs. Utilizing a base model with a dynamic overlay model enables optimization of speed, cost, scalability, and quality to produce the most accurate and efficient determination of cap rates.

Asset Characteristic Derivation, Model Training, Concurrency

Generally, any data collected (e.g., by data retrieval and validation system 1000) for deriving an asset characteristic can also concurrently be utilized for model training. Further, data collected for deriving one asset characteristic can be concurrently utilized for training a model that validates data corresponding to another different asset characteristic. For example, data collected for deriving an asset capitalization rate can be concurrently utilized to train a model that validates data for asset valuations.

Collected data can also be used to concurrently derive multiple asset characteristics. For example, collected data can be used concurrently to both derive an asset capitalization rate and derive an asset capitalization table.

Further, it may be that collected data is used to derive one or more asset characteristics and concurrently utilized for training multiple models, which may or may not validate data corresponding to the one or more asset characteristics or corresponding to a different asset characteristic. For example, data collected to derive a cap table entry can be concurrently utilized to both: train a model that validates data for cap table entries and to train another model that validates data for asset valuations.

Other combinations of asset characteristic derivation and concurrent model training are contemplated.

Data Standardization

As such, various components of system 100, data retrieval and validation system 1000, computer architecture 1200, system and data flow 1400, system and data flow 1500, computer architecture 1600, etc. can normalize (or standardize) data. In aspects, system 100, data retrieval and validation system, computer architecture 1200, system and data flow 1400, system and data flow 1500, computer architecture 1600, etc. interoperate with one or more machine learning components normalizing (or standardizing) data. The machine learning components may be continuous learning machine learning components wherein capabilities of the continuous learning machine learning components are refined by using "live" data as training data. Accordingly, model trainer 1018 can refine (train) capabilities of continuous learning machine learning components concurrently with the "live" data being utilized for another appropriate purpose (e.g., listing an asset on an exchange, deriving asset valuations, creating live sync cap tables, creating cap table entries, updating live syncing cap tables, updating cap table entries, Cap Rate derivations, model interoperation, etc.).

In one aspect, one or more, potentially interoperating, modules (e.g., one or more of asset detail extractor system 1002, asset detail finder system 1004, work product generator 1016, valuation module 1201, pricing oracle 136, back-end servers 132, 136, cap table formatter 1504, cap table correlation 1410, cap table creation 1414, settlement service 1502, cap table service 1510, cap rate module 1601, etc.) are configured to ingest financials for variety of assets, across any of the described asset classes (types), in varied and different formats, and normalize them into a common format financial package (Asset Valuation, Profile and Loss, Balance Sheet, etc.). For example, data retrieval and validation system 1000 can ingest a Trailing 12 (T12) months of financials for multiple different assets where the T12s are of varied and different configurations (e.g., irregular, unformatted, partially formatted, formatted, etc.). data retrieval and validation system 1000 can normalize the different T12 financials into corresponding common format financial packages.

Financial data can be ingested in different configurations, including but not limited to: excel or other spreadsheets, QuickBooks or other accounting programs, Portable Document Format (PDF), NetSuite, Juniper Square, Word (or other word processors), etc. Different assets can also have differences in nomenclature, income and expense types. For example, multifamily type, location, class, vintage, etc., may have different fields than an office high rise. These as well as other differences can be flexibly captured and accounted for (e.g., through flexible coding techniques, AI, etc.) when common format financial packages are formulated.

Aspects of normalizing ingested financials can be used in other environments as well and is not limited to the described examples.

In one aspect, asset valuation is determined in accordance with the Equation 4:

$$\text{Asset Valuation} = \quad\quad\quad\quad\quad\quad\quad\quad\quad\quad\quad \text{Equation 4}$$

$$\text{Net Operating Income } (NOI)/\text{Capitalization Rate } (Cap \text{ Rate})$$

wherein NOI represents the operating profitability (e.g., total revenue) of an asset (e.g., an incoming producing property) and Cap Rate represents the rate of return of (or on) an asset (e.g., an incoming producing property).

The one or more, potentially interoperating, modules can ingest financials and utilize Equation 4 to derive one or more of: an asset valuation for an asset, an NOI for an asset, or Cap Rate for an asset. The one or more, potentially interoperating, modules can automatically read headers, sections, columns, rows, etc. In one aspect, manual or semi-manual inputs are used to facilitate a mapping and training for modules. In some aspects, one of Asset Valuation, NOI, or Cap Rate for an asset is derived and/or accessed in a different way. The one or more, potentially interoperating, modules can derive at least one other of Asset Valuation, NOI, or Cap Rate for an asset. Accordingly, with two of Asset Valuation, NOI, or Cap Rate known, the third can be calculated according to Equation 4.

In one aspect, the one or more, potentially interoperating, modules also interoperate with one or more mini models. Mini models can be developed/designed per section of financials to understand where income and expenses are put for an asset. Mini models can be trained to understand what is "normal" and what is "outside of normal". As appropriate, when an income or expense is outside of normal, a human can be notified to validate and confirm. Each mini model can transform a piece of ingested data into corresponding data in a uniform format. Each mini model can add a result, such as, uniformly formatted data (e.g., numbers) to one or more relevant portions of a normalized financial package. A normalized financial package can include one or more of: an asset valuation for an asset, an NOI for the asset, or Cap Rate for the asset.

In one aspect, a financial template is created. Each mini model fills in a corresponding, appropriate part of the financial template with uniform data. When all mini models fill in corresponding appropriate parts a uniform financial package is created. When mini model work is completed, data can be verified/validated against ingested financials. It may be that one or more mini models facilitate template completion and then one or more other corresponding mini models facilitate data verification/validation.

Similar to other models, model trainer 1018 can train mini models in a continuous learning cycle. That is, ingested financials can be concurrently used for creating normalized financial packages and also training relevant mini models. As such, in aspects, mini models are and/or can include continuous learning machine learning components.

In one aspect of the present invention, a dashboard of inputs provides an interface for humans to efficiently interface with data, make data adjustments, and manually/semi-manually verify/validate data. Human input can also be used in a continuous learning cycle. Human input can be implemented on ingested data and/or uniform data and also concurrently used training relevant mini models.

Mini models can be constructed, trained, etc. to detect both data anomalies (data "outside the norm") as well as verify and categorize normal data (e.g., normal/expected values). Mini models can vary by asset class (type). Many asset types have incomes and expenses and assets and liabilities. As such, there may be some, or potentially even significant, commonality between mini models for different asset classes (types). However, at least some financial package creation mini models can differ between different asset classes. In aspects, a mini model includes one or more components common to a group of (or even all) asset classes and includes another one or more components that differ based on asset class. As such, an appropriate configuration of mini models can be assembled and/or networked per asset class (type). A mini model assembly/network can ingest financial data corresponding to an asset of the asset class (type) and formulate a corresponding uniform financial package (e.g., by filling in a template).

In aspects, some mini models are configured specifically to identify naming conventions and categories in ingested financial data. When naming conventions and categories are appropriately identified, the accuracy of and/or within a corresponding uniform financial package is increased. It may be that a mini model development process includes manual mapping, monitoring and training (e.g., in a continuous learning cycle) until full mapping an automation is achieved (with human interaction significantly reduced if not fully eliminated).

Uniform financial package formulation can be broken down to (e.g., lowest) common denominators). In one example, financial data exists for three very different companies and a corresponding uniform financial package is formulated for each of the 3 companies in a comment format. The financials from the three different companies may read the same but each has different financial results.

The are at least three ways a mini model or mini model assembly or mini model network can be configured to ingest financial data for an asset: manual input, uploaded files, and through APIs. Manul input can include a human inputting financial value. When accepting manual input a template can be used facilitating the ability to add/subtract fields and understand financial documents naming convention to match a uniform financial package. Mini models (as well as other models) can learn from the "mapping" of manually entered data, as well as other human learnings that can be monitored and reported (e.g., as part of a continuous learning cycle).

When uploading files, OCR and/or auto mapping or manual mapping of naming conventions can be utilized. File upload is more automated than manual entry. Mini models (as well as other models) can implement a best effort approach to map ingested fields to corresponding fields of a uniform financial statement. A human observer can adjust the data as needed, further reinforcing/training the mini models (or other models).

When ingesting via API, mini models (or other models) can ingest from other financial systems and automatically map ingested fields to corresponding fields of a uniform financial statement. An interface for manual adjustment can be provided if anomalies are detected. Overtime, human adjustments can continually decrease.

The are at least three ways for a mini model or mini model assembly or mini model network to review ingested financial data for an asset: manual (supervised), partial automation (semi-supervised), and automated (unsupervised). Manual review can include humans reviewing line by line making adjustments as needed. Partial automation can include human involvement with a level of artificial intelligence (AI) assisting to achieve more accurate outcomes more efficiently. Automation can include AI and machine learning (ML) doing mapping, verification, validation and output with essentially no human intervention. As such, there are mini models configured to perform described actions and other mini models to ensure accuracy of the performed actions.

As described, mini models can be developed/designed to perform different actions on financial statements for different asset classes (types). As such, a mini model can be developed/designed and trained (e.g., on an ongoing basis) per category, each line item, of a financial statement (similar to a human looking at each category with their historical knowledge to guide them). There can be more basic models that check for high level and foundational items and also more advanced models that consider each income or expense item within the financials to ensure they are accurate.

Mini model functionality can include, but is not limited to: (1) mapping to naming convention (can also flag/alert income and expenses without a home or seems out of place), (2) detecting mistakes from input (anomalies), (3) Comparing line items to past financials (if not available, then comparing to industry norms, if not available, then basic checks with manual review), (4) occupancy times avg rent to get the income (change from period to period), (5) detecting large changes in avg rent or occupancy, (6) detecting "outside" of normal changes to NOI (and other line items that go into NOI), (7) insurance model to compare expense against predictive rate for size, class, location, of asset, (8) determine what financials were used to derive (to interpolate) a T12, for example, was it a T1, T3, etc., (9) determine if debt payments have changed, for example, has new debt been added (which could decrease equity and therefore the change in value of the shareholders holdings).

As such, mini models can be used to more efficiently detect fraudulent, potentially fraudulent, or disingenuous behaviors of asset owners.

Each of the processes, methods, and algorithms described in the preceding sections may be embodied in, and fully or partially automated by, code components executed by one or more computer systems or computer processors comprising computer hardware. Each of the processes, methods, and algorithms described in the preceding sections may occur sequentially, partially sequentially, partially concurrently, or fully concurrently.

As described, implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically, iteratively, etc.) transform information between different formats, such as, for example, between any of: buy contracts, sell contracts, listings for sale, agreements to buy, fees, receipts, currency transfers, tokens, buy transactions, sell transactions, fiat currency, digital assets, crypto assets, invitations to claim tokens, smart contracts, sell orders, buy orders, ledger entries, ledger updates, trade proceeds, capitalization tables, capitalization table updates, fund releases, transactions, transaction settlements, license fees, models, mini models, agents, asset valuations (BOVs), Capitalization Tables (Cap Tables), Cap Table entries, Capitalization Rates (Cap Rates), Net Operating Incomes (NOI), ingested data, Cap Table files, formatted data, standardized data, validated data, user/entity profiles, user/entity accounts, notifications, messages, financial documents, financial reports, data anomalies, Cap Rate factors, Cap Rate Direction, Cap Rate Number, Cap Rate Ranges, rent growth data, GDP and unemployment data, Economic cycle data, location data, asset class (type), asset class (type) data, asset data, property listing data, asset characteristics, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, buy contracts, sell contracts, listings for sale, agreements to buy, fees, receipts, currency transfers, tokens, buy transactions, sell transactions, fiat currency, digital assets, crypto assets, invitations to claim tokens, smart contracts, sell orders, buy orders, ledger entries, ledger updates, trade proceeds, capitalization tables, capitalization table updates, fund releases, transactions, transaction settlements, license fees, models, mini models, agents, asset valuations, (BOVs), Capitalization Tables (Cap Tables), Cap Table entries, Capitalization Rates (Cap Rats), Net Operating Incomes (NOI), ingested data, Cap Table files, formatted data, standardized data, validated data, user/entity profiles, user/entity accounts, notifications, messages, financial documents, financial reports, data anomalies, Cap Rate factors, Cap Rate Direction, Cap Rate Number, Cap Rate Ranges, rent growth data, GDP and unemployment data, Economic cycle data, location data, asset class (type), asset class (type) data, asset data, property listing data, asset characteristics, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

System 100, computer architecture 1200, system and data flow 1400, system and data flow 1500, computer architecture 1600, etc. can be implemented in a cloud computing environment and/or using a cloud computing model.

The processes and algorithms may be implemented partially or wholly in application-specific circuitry. As used herein, a circuit might be implemented utilizing any form of hardware, or a combination of hardware and software. For example, one or more processors, controllers, ASICS, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits.

Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the computer system 800. In example embodiments, system 100, data retrieval and validation system 1000, computer architecture 1200, system and data flow 1400, system and data flow 1500, computer architecture 1600 can perform actions concurrently. For example, system 100 can be performing a buy/sell trade corresponding to one asset, concurrently data retrieval and validation system 1000 can be ingesting data for cap table creation for another asset, concurrently computer architecture 1600 can be deriving an asset cap rate for a further asset.

The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

In one aspect, a method may include an operation, an instruction, and/or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

The functions, acts or tasks illustrated in the Figures or described may be executed in a digital and/or analog domain and in response to one or more sets of logic or instructions stored in or on non-transitory computer readable medium or media or memory. The functions, acts or tasks are independent of the particular type of instructions set, storage media, processor or processing strategy and may be performed by software, hardware, integrated circuits, firmware, microcode and the like, operating alone or in combination. The memory may comprise a single device or multiple devices that may be disposed on one or more dedicated memory devices or disposed on a processor or other similar device. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely (anywhere a range within or a discrete number within a range of ninety-five percent and one-hundred and five percent), but not necessarily wholly, that which is specified. It encompasses all but an insignificant amount.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112(f) unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
electronically collecting, via an artificial intelligence module, valuation data into a database, the valuation data purportedly, by a user, corresponding to a private credit asset;
accessing unique identifiers corresponding to each of a one or more items within the valuation data;
automatically and subsequent to accessing the unique identifiers, utilizing the artificial intelligence module validating relevancy of the one or more items to the private credit asset, including:
electronically collecting additional valuation data into the database using the unique identifiers, the additional valuation considered as corresponding to the private credit asset based on the unique identifiers;
cross-referencing the valuation data with the additional valuation data; and
confirming relevancy of the one or more items to the private credit asset based on results of the cross-referencing;
automatically, as part of a constant training cycle, training the artificial intelligence module based on confirming the relevancy of the one or more items improving data validating performance of the artificial intelligence module; and
deriving a private credit asset valuation corresponding to the private credit asset based on the one or more items.

2. The method of claim 1, wherein electronically collecting, via an artificial intelligence module, valuation data into a database comprises electronically collecting, via an artificial intelligence module, pushed valuation data into a database; and
wherein electronically collecting additional valuation data into the database comprises electronically collecting pulled additional valuation data into the database.

3. The method of claim 1, wherein confirming relevancy of the one or more items to the private credit asset based on results of the cross-referencing comprises:
generating valuation data validation findings based on results of the cross-referencing;
electronically notifying an administrative entity of the valuation data validation findings; and
accessing a valuation data rejection/approval decision of the administrative entity.

4. The method of claim 3, further comprising:
assigning a weight to the additional valuation data; and
determining a confidence score for the valuation data validation findings based on the assigned weight.

5. The method of claim 1, further comprising verifying quality of the additional valuation data prior to cross-referencing the valuation data with the additional valuation data.

6. The method of claim 1, wherein collecting the valuation data comprises collecting the valuation data from the user and wherein collecting the additional valuation data comprises collecting the additional valuation data from at least one of: a public internet or a non-public internet.

7. The method of claim 1, further comprising electronically informing the user of the accuracy of the valuation data at a user interface.

8. The method of claim 1, further comprising deriving an additional characteristic corresponding to the private credit asset based on the one or more items.

9. The method of claim 8, wherein deriving an additional characteristic corresponding to the private credit asset comprises deriving a capitalization rate corresponding to the private credit asset.

10. The method of claim 1, wherein electronically collecting additional valuation data into the database using the unique identifiers comprises:

formulating a JSON object containing the one or more items; and sending out an asynchronous search for matches on the one or more items contained in the JSON object.

11. A system comprising:

a processor;

system memory coupled to the processor and storing instructions configured to cause the processor to:

electronically collect, via an artificial intelligence module, valuation data into a database, the valuation data purportedly, by a user, corresponding to a a private credit asset;

access unique identifiers corresponding to each of a one or more items within the valuation data;

automatically and subsequent to accessing the unique identifiers, utilize the artificial intelligence module validating relevancy of the one or more items to the private credit asset, including:

electronically collect additional valuation data into the database using the unique identifiers, the additional valuation data considered as corresponding to the private credit asset based on the unique identifiers;

cross-reference the valuation data with the additional valuation data; and confirm relevancy of the one or more items to the private credit asset based on results of the cross-referencing;

automatically, as part of a constant training cycle, train the artificial intelligence module based on confirming the relevancy of the one or more items improving data validating performance of the artificial intelligence module; and derive a private credit valuation corresponding to the private credit asset based on the one or more items.

12. The system of claim 11, wherein instructions configured to cause the processor to electronically collect, via an artificial intelligence module, valuation data into a database comprise instructions configured to cause the processor to electronically collect, via an artificial intelligence module, pushed valuation data into a database; and wherein instructions configured to cause the processor to electronically collect additional valuation data into the database comprise instructions configured to cause the processor to electronically collect pulled additional valuation data into the database.

13. The system of claim 11, wherein instructions configured to cause the processor to confirm relevancy of the one or more items to the private credit asset based on results of the cross-referencing comprises instructions configured to cause the processor to:

generate valuation data validation findings based on results of the cross-referencing;

electronically notify an administrative entity of the valuation data validation findings; and access a valuation data rejection/approval decision of the administrative entity.

14. The system of claim 13, further comprising instructions configured to cause the processor to:

assign a weight to the additional valuation data; and determine a confidence score for the valuation data validation findings based on the assigned weight.

15. The system of claim 11, further comprising instructions configured to cause the processor to verify quality of the additional valuation data prior to cross-referencing the valuation data with the additional valuation data.

16. The system of claim 11, wherein instructions configured to cause the processor to collect the valuation data comprise instructions configured to cause the processor to collect the valuation data from the user and wherein instructions configured to cause the processor to collect the additional valuation data comprise instructions configured to cause the processor to collect the additional valuation data from at least one of: a public internet or a non-public internet.

17. The system of claim 11, further comprising instructions configured to cause the processor to electronically inform the user of the accuracy of the valuation data at a user interface.

18. The system of claim 11, further comprising instructions configured to cause the processor to derive an additional characteristic corresponding to the private credit asset based on the one or more items.

19. The system of claim 18, wherein instructions configured to cause the processor to derive an additional characteristic corresponding to the private credit asset comprise instructions configured to cause the processor to derive a capitalization rate corresponding to the private credit asset.

20. The system of claim 11, wherein instructions configured to cause the processor to electronically collect additional valuation data into the database using the unique identifiers comprise instructions configured to cause the processor to:

formulate a JSON object containing the one or more items; and send out an asynchronous search for matches on the one or more items contained in the JSON object.

* * * * *